US011977971B2

(12) United States Patent
Singh et al.

(10) Patent No.: US 11,977,971 B2
(45) Date of Patent: *May 7, 2024

(54) DATA VOLUME SCULPTOR FOR DEEP LEARNING ACCELERATION

(71) Applicants: STMICROELECTRONICS S.r.l., Agrate Brianza (IT); STMICROELECTRONICS INTERNATIONAL N.V., Schiphol (NL)

(72) Inventors: Surinder Pal Singh, Noida (IN); Thomas Boesch, Rovio (CH); Giuseppe Desoli, San Fermo Della Battaglia (IT)

(73) Assignees: STMICROELECTRONICS INTERNATIONAL N.V., Schiphol (NL); STMICROELECTRONICS S.r.l, Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,366

(22) Filed: Feb. 10, 2023

(65) Prior Publication Data

US 2023/0186067 A1 Jun. 15, 2023

Related U.S. Application Data

(60) Continuation of application No. 17/194,055, filed on Mar. 5, 2021, now Pat. No. 11,610,362, which is a division of application No. 16/280,963, filed on Feb. 20, 2019, now Pat. No. 10,977,854.

(60) Provisional application No. 62/636,018, filed on Feb. 27, 2018.

(51) Int. Cl.
| | | |
|---|---|---|
| *G06T 7/62* | (2017.01) | |
| *G06F 9/38* | (2018.01) | |
| *G06F 16/901* | (2019.01) | |
| *G06F 18/22* | (2023.01) | |
| *G06N 3/045* | (2023.01) | |
| *G06N 3/063* | (2023.01) | |
| *G06N 3/08* | (2023.01) | |
| *G06T 7/11* | (2017.01) | |
| *G06T 15/08* | (2011.01) | |
| *G06V 10/82* | (2022.01) | |
| *G06V 20/00* | (2022.01) | |
| *G06V 10/75* | (2022.01) | |

(52) U.S. Cl.
CPC .......... *G06N 3/063* (2013.01); *G06F 9/3877* (2013.01); *G06F 16/9024* (2019.01); *G06F 18/22* (2023.01); *G06N 3/045* (2023.01); *G06N 3/08* (2013.01); *G06T 7/11* (2017.01); *G06T 7/62* (2017.01); *G06T 15/08* (2013.01); *G06V 10/82* (2022.01); *G06V 20/00* (2022.01); *G06V 10/759* (2022.01)

(58) Field of Classification Search
CPC ..... G06T 7/10; G06T 7/11; G06T 7/60; G06T 7/62; G06T 7/70; G06V 10/22; G06V 10/25; G06F 16/5854; G06F 16/587; G06F 16/90; G06F 16/9024; G06F 16/909
See application file for complete search history.

(56) References Cited

U.S. PATENT DOCUMENTS

| | | |
|---|---|---|
| 5,768,613 A | 6/1998 | Asghar |
| 9,436,637 B2 | 9/2016 | Kommanaboyina |
| 9,779,786 B1 | 10/2017 | Wu et al. |
| 9,978,014 B2 | 5/2018 | Lupon et al. |
| 10,366,050 B2 | 7/2019 | Henry et al. |
| 10,372,456 B2 | 8/2019 | Fowers et al. |
| 10,402,527 B2 | 9/2019 | Boesch et al. |
| 10,657,668 B2 | 5/2020 | Hassan et al. |
| 10,949,736 B2 | 3/2021 | Deisher et al. |

(Continued)

FOREIGN PATENT DOCUMENTS

| | | |
|---|---|---|
| CN | 101739241 A | 6/2010 |
| CN | 101819679 A | 9/2010 |

(Continued)

OTHER PUBLICATIONS

Bhatele et al (Ed)., *Programming and Performance Visualization Tools*, Springer Publishing, New York, New York, 2018, pp. 74-89, Pradelle et al., "Polyhedral Optimization of TensorFlow Computation Graphs," 7 pages.
Blanc-Talon et al (Ed)., *Advanced Concepts for Intelligent Vision Systems*, Springer International Publishing, New York, New York, 2016, pp. 217-227, Desoli et al., "The Orlando Project: A 28nm FD-SOI Low Memory Embedded Neural Network ASIC".
Brownlee, "A Gentle Introduction to Pooling Layers for Convolutional Neural Networks," published online Apr. 22, 2019, downloaded on Dec. 11, 2019, from https://machinelearningmastery.com/pooling-layers-for-convolutional-neural-networks/, 19 pages.

(Continued)

*Primary Examiner* — Andrew W Johns
(74) *Attorney, Agent, or Firm* — Seed IP Law Group LLP

(57) ABSTRACT

A device include on-board memory, an applications processor, a digital signal processor (DSP) cluster, a configurable accelerator framework (CAF), and a communication bus architecture. The communication bus communicatively couples the applications processor, the DSP cluster, and the CAF to the on-board memory. The CAF includes a reconfigurable stream switch and data volume sculpting circuitry, which has an input and an output coupled to the reconfigurable stream switch. The data volume sculpting circuitry receives a series of frames, each frame formed as a two dimensional (2D) data structure, and determines a first dimension and a second dimension of each frame of the series of frames. Based on the first and second dimensions, the data volume sculpting circuitry determines for each frame a position and a size of a region-of-interest to be extracted from the respective frame, and extracts from each frame, data in the frame that is within the region-of-interest.

20 Claims, 23 Drawing Sheets

(56) References Cited

U.S. PATENT DOCUMENTS

| | | | |
|---|---|---|---|
| 11,227,086 | B2 | 1/2022 | Boesch et al. |
| 11,270,201 | B2 | 3/2022 | Sridharan et al. |
| 11,610,362 | B2* | 3/2023 | Singh et al. ............ G06V 20/00 |
| 2012/0303932 | A1 | 11/2012 | Farabet et al. |
| 2014/0032465 | A1 | 1/2014 | Modha |
| 2014/0281005 | A1 | 9/2014 | Bhamidipati et al. |
| 2015/0170021 | A1 | 6/2015 | Lupon et al. |
| 2015/0212955 | A1 | 7/2015 | Easwaran |
| 2015/0278596 | A1 | 10/2015 | Kilty et al. |
| 2016/0379109 | A1 | 12/2016 | Chung et al. |
| 2017/0169315 | A1 | 6/2017 | Vaca Castano et al. |
| 2018/0046458 | A1 | 2/2018 | Kuramoto |
| 2018/0046485 | A1 | 2/2018 | Maity et al. |
| 2018/0121796 | A1 | 5/2018 | Deisher et al. |
| 2018/0144214 | A1 | 5/2018 | Hsieh et al. |
| 2018/0189229 | A1 | 7/2018 | Desoli et al. |
| 2018/0189641 | A1 | 7/2018 | Boesch et al. |
| 2018/0189642 | A1 | 7/2018 | Boesch et al. |
| 2018/0315155 | A1 | 11/2018 | Park et al. |
| 2019/0042868 | A1 | 2/2019 | Oesterreicher et al. |
| 2019/0155575 | A1 | 5/2019 | Langhammer et al. |
| 2019/0205746 | A1 | 7/2019 | Nurvitadhi et al. |
| 2019/0205758 | A1 | 7/2019 | Zhu et al. |
| 2019/0251429 | A1 | 8/2019 | Du et al. |
| 2019/0266479 | A1 | 8/2019 | Singh et al. |
| 2019/0266485 | A1 | 8/2019 | Singh et al. |
| 2019/0266784 | A1 | 8/2019 | Singh et al. |
| 2019/0354846 | A1 | 11/2019 | Mellempudi et al. |
| 2019/0370631 | A1 | 12/2019 | Fais et al. |
| 2020/0133989 | A1 | 4/2020 | Song et al. |
| 2020/0234137 | A1 | 7/2020 | Chen et al. |
| 2020/0272779 | A1 | 8/2020 | Boesch et al. |
| 2021/0073450 | A1 | 3/2021 | Boesch et al. |
| 2021/0073569 | A1 | 3/2021 | Gao et al. |
| 2021/0192833 | A1 | 6/2021 | Singh et al. |
| 2021/0240440 | A1 | 8/2021 | Langhammer et al. |
| 2021/0256346 | A1 | 8/2021 | Desoli et al. |
| 2021/0264250 | A1 | 8/2021 | Singh et al. |
| 2022/0121928 | A1 | 4/2022 | Dong et al. |
| 2022/0188072 | A1 | 6/2022 | Langhammer et al. |
| 2023/0062910 | A1 | 3/2023 | Desoli et al. |
| 2023/0153621 | A1 | 5/2023 | Singh et al. |

FOREIGN PATENT DOCUMENTS

| | | |
|---|---|---|
| CN | 104484703 A | 4/2015 |
| CN | 105488565 A | 4/2016 |
| CN | 105518784 A | 4/2016 |
| CN | 106650655 A | 5/2017 |
| CN | 106779059 A | 5/2017 |
| CN | 107016521 A | 8/2017 |
| CN | 110214309 A | 9/2019 |
| CN | 209560950 U | 10/2019 |
| CN | 210428520 U | 4/2020 |
| DE | 10159331 A1 | 6/2002 |
| EP | 3346423 A1 | 7/2018 |
| EP | 3346424 A1 | 7/2018 |
| EP | 3346427 A1 | 7/2018 |
| EP | 3480740 A1 | 5/2019 |
| JP | 2002183111 A | 6/2002 |
| KR | 101947782 B1 | 2/2019 |
| WO | WO 2017017371 A1 | 2/2017 |
| WO | WO 2019227322 A1 | 5/2019 |
| WO | WO 2020249085 A1 | 12/2020 |

OTHER PUBLICATIONS

Chen et al., "14.5: Eyeriss: An Energy-Efficient Reconfigurable Accelerator for Deep Convolutional Neural Networks," IEEE International Solid-State Circuits Conference, San Francisco, California, Jan. 31-Feb. 4, 2016, pp. 262-264.

Chen et al., "A High-Throughput Neural Network Accelerator," IEEE Micro, 35:24-32, 2015.

Chen et al., "DaDianNao: A Machine-Learning Supercomputer," 47th Annual IEEE/ACM International Symposium on Microarchitecture, Cambridge, United Kingdom, Dec. 13-17, 2014, pp. 609-622.

Choudhary et al., "NETRA: A Hierarchical and Partitionable Architecture for Computer Vision Systems," *IEEE Transactions on Parallel and Distributed Systems* 4(10):1092-1104, 1993.

Cook, "Global Average Pooling Layers for Object Localization," published online Apr. 9, 2019, downloaded on Dec. 11, 2019, from https://alexisbcook.github.io/2017/global-average-pooling-layers-for-object-localization/, 14 pages.

Dai et al., "Deformable Convolutional Networks," PowerPoint Presentation, International Conference on Computer Vision, Venice, Italy, Oct. 22-Oct. 29, 2017, 17 pages.

Dai et al., "Deformable Convolutional Networks," Proceedings of the IEEE International Conference on Computer Vision :764-773, 2017.

Desoli et al., "14.1: A 2.9TOPS/W Deep Convolutional Neural Network SoC in FD-SOI 28nm for Intelligent Embedded Systems," *IEEE International Solid-State Circuits Conference (ISSCC)*, San Francisco, California, Feb. 5-9, 2017, pp. 238-239. (3 pages).

Du et al., "ShiDianNao: Shifting Vision Processing Closer To The Sensor," *2015 ACM/IEEE 42nd Annual International Symposium on Computer Architecture (ISCA)*, Portland, Oregon, Jun. 13-17, 2015, pp. 92-104.

Erdem et al., "Design Space Exploration for Orlando Ultra Low-Power Convolutional Neural Network SoC," IEEE 29th International Conference on Application-specific Systems, Architectures and Processors, Milan, Italy, Jul. 10-12, 2018, 7 pages.

GitHub, "Building a quantization paradigm from first principles," URL=https://github.com/google/gemmlowp/blob/master/doc/quantization.md, download date Jul. 29, 2021, 7 pages.

GitHub, "The low-precision paradigm in gemmlowp, and how it's implemented," URL=https://github.com/google/gemmlowp/blob/master/doc/low-precision.md#efficient-handling-of-offsets, download date Jul. 29, 2021, 4 pages.

Gokhale et al., "A 240 G-ops/s Mobile Coprocessor for Deep Neural Networks (Invited Paper)," *The IEEE Conference on Computer Vision and Pattern Recognition (CVPR)* Workshop, Columbus, Ohio, Jun. 23-28, 2014, pp. 696-701.

Graf et al., "A Massively Parallel Digital Learning Processor," *Advances in Neural Information Processing Syste (NIPS)*, pp. 529-536, 2009.

Han et al., "Deep Compression: Compressing Deep Neural Networks with Pruning, Trained Quantization and Huffman Coding," International Conference on Learning Representations, San Juan, Puerto Rico, May 2-4, 2016, 14 pages.

Hara et al., "Analysis of Function of Rectified Linear Unit Used in Deep learning," European Union Conference Paper, Jul. 2015. (9 pages).

Hou et al., "An End-to-end 3D Convolutional Neural Network for Action Detection and Segmentation in Videos," *Journal of Latex Class Files* 14(8):2015, 15 pages.

Hou et al., "Tube Convolutional Neural Network (T-CNN) for Action Detection in Videos," International Conference on Computer Vision, Venice Italy, Oct. 22-29, 2017, pp. 5822-5831.

Hu et al., "MaskRNN: Instance Level Video Object Segmentation," 31st Conference on Neural Information Processing Systems, Long Beach, California, Dec. 4-9, 2017, 10 pages.

Jagannathan et al., "Optimizing Convolutional Neural Network on DSP," IEEE International Conference on Consumer Electronics, Jan. 7-11, 2016, Las Vegas, Nevada, pp. 371-372.

Jouppi et al., "In-Datacenter Performance Analysis of a Tensor Processing Unit," 44th International Symposium on Computer Architecture, Toronto, Canada, Jun. 26, 2017, 17 pages.

Kang et al., "T-CNN: Tubelets with Convolutional Neural Networks for Object Detection from Videos," *arXiv:1604.02532*: Aug. 2017, 12 pages.

Kiningham, K. et al., "Design and Analysis of a Hardware CNN Accelerator," Stanford University, 2017, 8 pages.

Krizhevsky et al., "ImageNet Classification with Deep Convolutional Neural Networks," Proceedings of the 25th International Conference on Neural Information Processing Systems 1:1097-1105, 2012 (9 pages).

(56) References Cited

OTHER PUBLICATIONS

Lascorz et al., "Tartan: Accelerating Fully-Connected and Convolutional Layers in Deep Learning Networks by Exploiting Numerical Precision Variability," arXiv:1707.09068v1: Jul. 2017, 12 pages.
LeCun et al., "Gradient-Based Learning Applied to Document Recognition," Proceedings of the IEEE 86(1):2278 2324, 1998.
Lin et al., "A Digital Circuit of Hyperbolic Tangent Sigmoid Function for Neural Networks," *IEEE International Symposium on Circuits and Systems*, Seattle, Washington, May 18-21, 2008, pp. 856-859.
Lin et al., "Network In Network," arXiv:1312.4400v3 [cs.NE], Mar. 4, 2014, 10 pages.
Lozito et al. "Microcontroller Based Maximum Power Point Tracking Through FCC and MLP Neural Networks," *Proceedings of the 6th European Embedded Design in Education and Research*, 2014. (5 pages).
Lozito et al., "FPGA Implementations of Feed Forward Neural Network by Using Floating Point Hardware Accelerators," *Theoretical and Applied Electrical Engineering*, 12(1):30-39, Mar. 2014.
Meloni et al., "A High-Efficiency Runtime Reconfigurable IP for CNN Acceleration on a Mid-Range All-Programmable SoC," International Conference on ReConFigurable Computing and FPGAs (ReConFig), Nov. 30-Dec. 2, 2016, Cancun, Mexico, 8 pages.
Merritt, "AI Silicon Gets Mixed Report Card," EE Times, published online Jan. 4, 2018, downloaded on Jan. 15, 2018, from https://www.eetimes.com/document.asp?doc_id=1332799&print=yes, 3 pages.
Moctar et al., "Routing Algorithms for FPGAS with Sparse Intra-Cluster Routing Crossbars," 22nd International Conference on Field Programmable Logic and Applications (FPL), Aug. 29-31, 2012, Oslo, Norway, pp. 91-98.
NVIDIA Deep Learning Accelerator, "NVDLA," downloaded on Dec. 12, from http://nvdla.org/, 2019, 5 pages.
Redmon, "YOLO: Real-Time Object Detection," archived on Jan. 9, 2018, downloaded on Jul. 23, 2019, https://web.archive.org/web/20180109074144/https://pjreddie.com/darknet/yolo/, 11 pages.
Ren et al., "Faster R-CNN: Towards Real-Time Object Detection with Region Proposal Networks," arXiv:1506.01497v3, Jan. 2016, 14 pages.
Salakhutdinov et al., "A Better Way to Pretrain Deep Boltzmann Machines," Advances in Neural Processing Systems 25, Lake Tahoe, Nevada, Dec. 3-8, 2012, 9 pages.
Scardapane et al., "Kafnets: kernel-based non-parametric activation functions for neural networks," arXiv:1707.04035v2, Nov. 2017, 35 pages.
Sim et al., "14.6: A 1.42TOPS/W Deep Convolutional Neural Network Recognition Processor for Intelligent IoE Systems," International Solid-State Circuits Conference, San Francisco, Californai, Jan. 31-Feb. 4, 2016, pp. 264-266.
Simonyan et al., "Very Deep Convolutional Networks for Large-Scale Image Recognition," International Conference on Learning Representations, San Diego, California, May 7-9, 2015, 14 pages.
Sodre, "Fast-Track to Second Order Polynomials," PowerPoint, UT—Austin, Aug. 2011. (12 pages).
Stenström, "Reducing Contention in Shared-Memory Multiprocessors," *Computer* 21(11):26-37, 1988.
Stoutchinin et al., "Optimally Scheduling CNN Convolutions for Efficient Memory Access," *IEEE Transactions on Computer-Aided Design of Integrated Circuits And Systems*, Feb. 4, 2019, 14 pages.
TensorFlow "How to Quantize Neural Networks with TensorFlow," archived on Sep. 25, 2017, downloaded on Jul. 23, 2019 from https://web.archive.org/web/20170925162122/https://www.tensorflow.org/performance/quantization, 10 pages.
Tsang, "Review: DeconvNet—Unpooling Layer (Semantic Segmentation)," published online Oct. 8, 2018, downloaded on Dec. 12, 2019, from https://towardsdatascience.com/review-deconvnet-unpooling-layer semantic-segmentation-55cf8a6e380e, 7 pages.
UFLDL Tutorial, "Pooling," downloaded from http://deeplearning.stanford.edu/tutorial/supervised/Pooling/ on Dec. 12, 2019, 2 pages.
Vassiliadis et al., "Elementary Function Generators for Neural-Network Emulators," *IEEE Transactions on Neural Networks* 11(6):1438-1449, 2000.
Venieris et al., "fpgaConvNet: A Framework for Mapping Convolutional Neural Networks on FPGAs," *2016 IEEE 24th Annual International Symposium on Field-Programmable Custom Computing Machines*, 2014, pp. 40-47.
Vu et al., "Tube-CNN: Modeling temporal evolution of appearance for object detection in video," arXiv:1812.02619v1, Dec. 2018, 14 pages.
Wang et al.(Ed)., *Advances in Neural Networks*, Springer Verlag, Berlin, Germany, 2006, pp. 1319-1327, Larkin et al., "An Efficient Hardware Architecture for a Neural Network Activation Fucntion Generator".
Wang et al., "DLAU: A Scalable Deep Learning Accelerator Unit on FPGA," *IEEE Transactions on Computer-Aided Design of Integrated Circuits and Systems* 36(3):2017, 5 pages.
Wikipedia, "Convolutional neural network," downloaded from https://en.wikipedia.org/wiki/Computer_vision on Dec. 12, 2019, 29 pages.
Xu et al., "R-C3D: Region Convolutional 3D Network for Temporal Activity Detection," arXiv:1703.07814v2, Aug. 2017, 10 pages.
Zhong, K. et al., "Exploring the Potential of Low-bit Training of Convolutional Neural Networks," *IEEE Transactions on Computer-Aided Design of Intergrated Circuits and Systems*, arXiv:2006.02804, version 4, p. 1-13.
Milletari et al., "Hough-CNN: Deep Learning for Segmentation of Deep Brain Regions in MRI and Ultrasound," arXiv:1601.07014v3 [cs.CV], Jan. 31, 2016. (34 pages).
Tian et al., "Automated localization of body part in CT images," *Computer Engineering and Design* 38(1):247-252, Jan. 2017. (with English Abstract).
Wang et al., "3D Facial Reconstruction Based on 2.5D Carve System," p. 165-167, 193, 2005. (with English Abstract).
Yang et al., "Research on Deep Learning Acceleration Technique," URL=http://www.c-s-a.org.cn, Special Issue, Sep. 25, 2016. (9 pages) (with English Abstract).

* cited by examiner

DATA VOLUME SCULPTOR FOR DEEP LEARNING ACCELERATION

BACKGROUND

Technical Field

The present disclosure generally relates to structures that improve flexibility, data locality, and faster execution of deep machine learning systems, for example in convolutional neural networks (CNN). More particularly, but not exclusively, the present disclosure relates to a data volume sculptor for a deep learning acceleration engine.

Description of the Related Art

Known computer vision, speech recognition, and signal processing applications benefit from the use of learning machines. Learning machines discussed in this disclosure may fall under the technological titles of machine learning, artificial intelligence, neural networks, probabilistic inference engines, accelerators, and the like. Such machines are arranged to quickly perform hundreds, thousands, and millions of concurrent operations. Conventional learning machines can deliver hundreds of TeraFlops (i.e., one million millions ($10^{12}$) floating-point operations per second) of computing power.

In some cases, learning machines are organized as deep convolutional neural networks (DCNN). A seminal work in the DCNN arts is "Gradient-Based Learning Applied To Document Recognition," by Y. LeCun et al., Proceedings of the IEEE, vol. 86, no. 11, pp. 2278-2324, 1998, which led to winning the 2012 ImageNet Large Scale Visual Recognition Challenge with "AlexNet." AlexNet, as described in "ImageNet Classification With Deep Convolutional Neural Networks," by Krizhevsky, A., Sutskever, I., and Hinton, G., NIPS, pp. 1-9, Lake Tahoe, NV (2012), is a DCNN that significantly outperformed classical approaches for the first time.

A DCNN is a computer-based tool that processes large quantities of data and adaptively "learns" by conflating proximally related features within the data, making broad predictions about the data, and refining the predictions based on reliable conclusions and new conflations. The DCNN is arranged in a plurality of "layers," and different types of predictions are made at each layer.

For example, if a plurality of two-dimensional pictures of faces is provided as input to a DCNN, the DCNN will learn a variety of characteristics of faces such as edges, curves, angles, dots, color contrasts, bright spots, dark spots, etc. These one or more features are learned at one or more first layers of the DCNN. Then, in one or more second layers, the DCNN will learn a variety of recognizable features of faces such as eyes, eyebrows, foreheads, hair, noses, mouths, cheeks, etc.; each of which is distinguishable from all of the other features. That is, the DCNN learns to recognize and distinguish an eye from an eyebrow or any other facial feature. In one or more third and then subsequent layers, the DCNN learns entire faces and higher order characteristics such as race, gender, age, emotional state, etc. The DCNN is even taught in some cases to recognize the specific identity of a person. For example, a random image can be identified as a face, and the face can be recognized as Orlando Bloom, Andrea Bocelli, or some other identity.

In other examples, a DCNN can be provided with a plurality of pictures of animals, and the DCNN can be taught to identify lions, tigers, and bears; a DCNN can be provided with a plurality of pictures of automobiles, and the DCNN can be taught to identify and distinguish different types of vehicles; and many other DCNNs can also be formed. DCNNs can be used to learn word patterns in sentences, to identify music, to analyze individual shopping patterns, to play video games, to create traffic routes, and DCNNs can be used for many other learning-based tasks too.

Figure 1E:
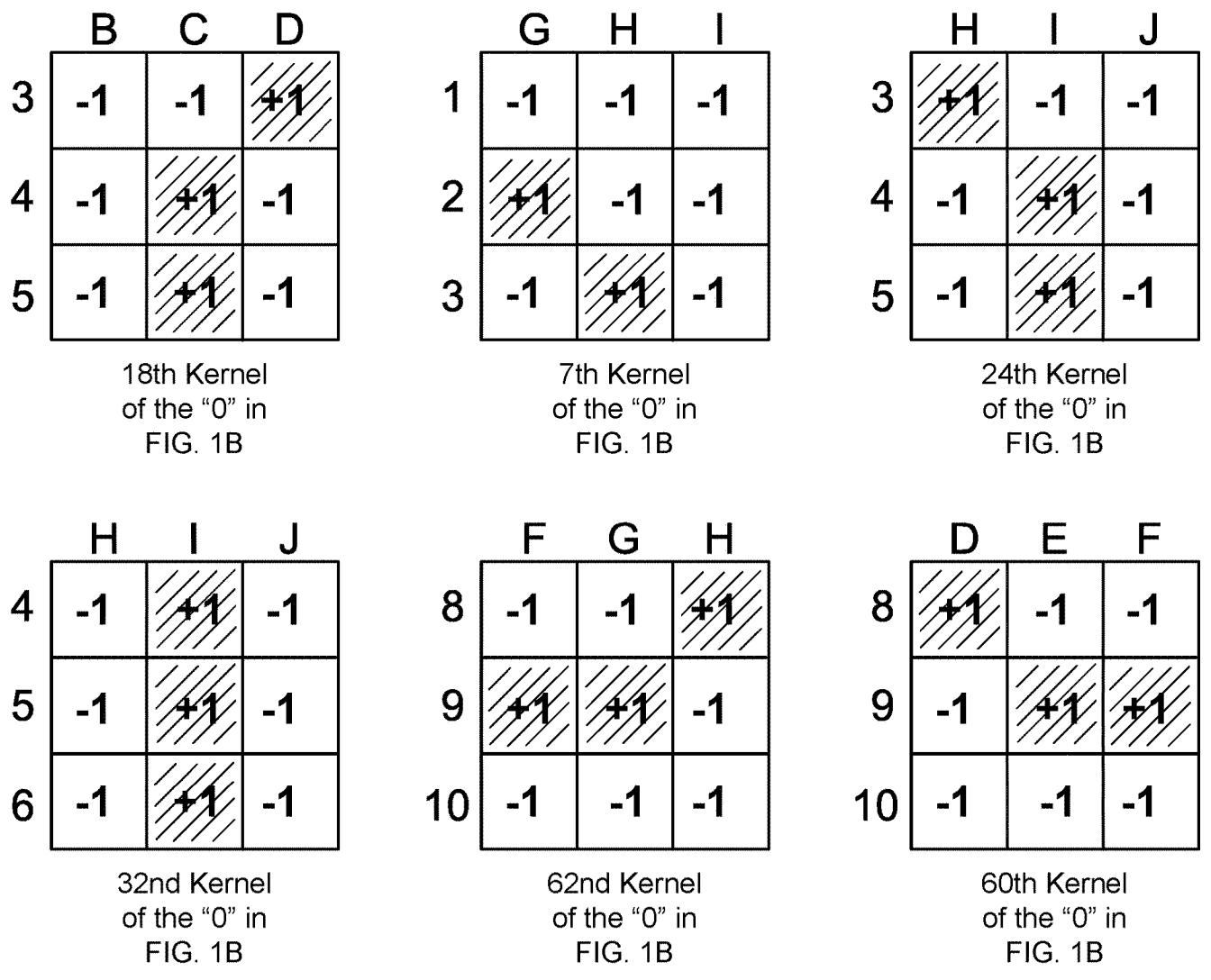
Figure 1I:
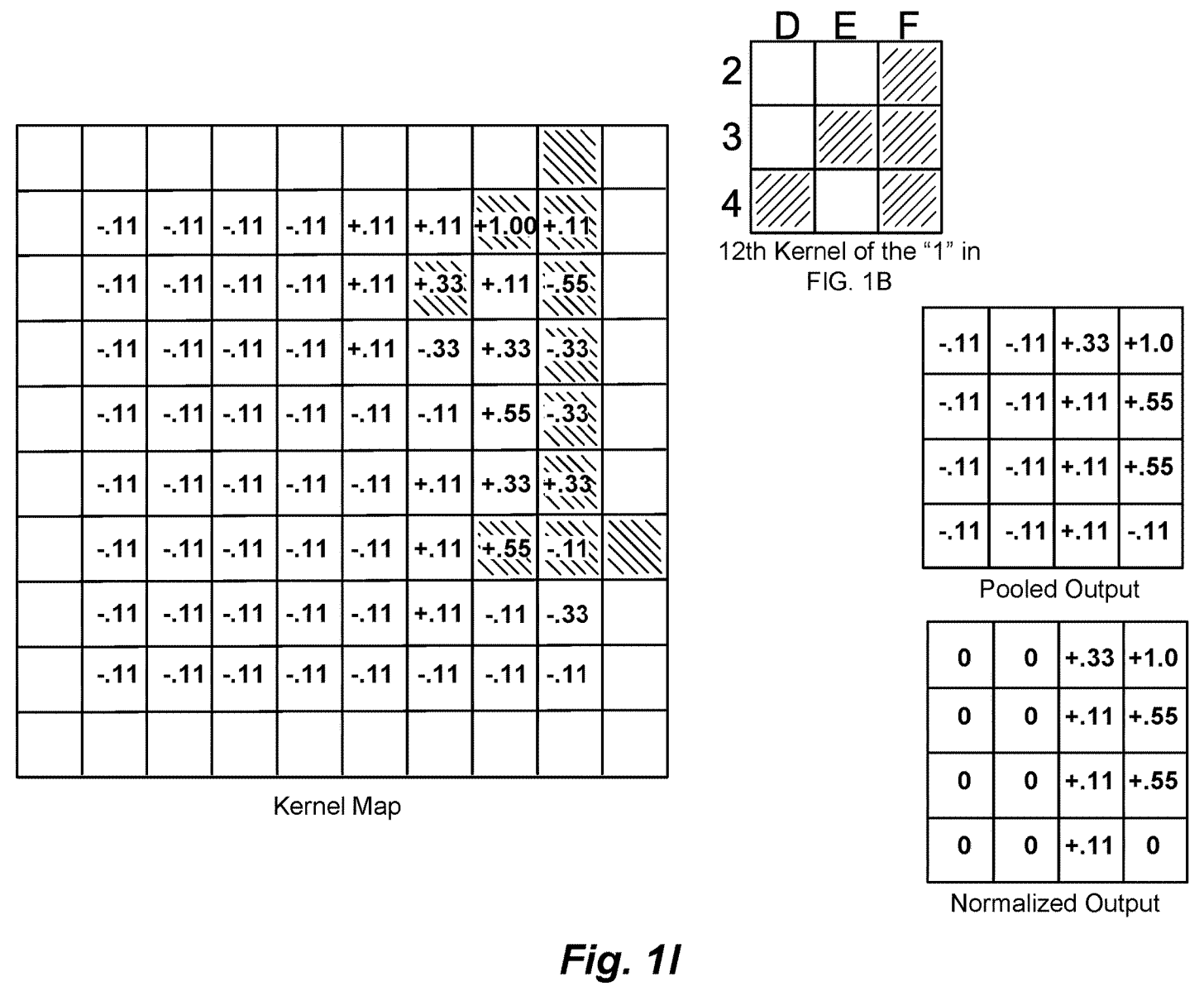

FIGS. 1A-1J may collectively be referred to herein as FIG. 1.

FIG. 1A is a simplified illustration of a convolutional neural network (CNN) system 10. In the CNN system, a two-dimensional array of pixels is processed by the CNN. The CNN analyzes a 10×10 input object plane to determine if a "1" is represented in the plane, if a "0" is represented in the plane, or if neither a "1" nor a "0" is implemented in the plane.

In the 10×10 input object plane, each pixel is either illuminated or not illuminated. For the sake of simplicity in illustration, illuminated pixels are filled in (e.g., dark color) and unilluminated pixels are not filled in (e.g., light color).

FIG. 1B illustrates the CNN system 10 of FIG. 1A determining that a first pixel pattern illustrates a "1" and that a second pixel pattern illustrates a "0." In the real world, however, images do not always align cleanly as illustrated in FIG. 1B.

In FIG. 1C, several variations of different forms of ones and zeroes are shown. In these images, the average human viewer would easily recognize that the particular numeral is translated or scaled, but the viewer would also correctly determine if the image represented a "1" or a "0." Along these lines, without conscious thought, the human viewer looks beyond image rotation, various weighting of numerals, sizing of numerals, shifting, inversion, overlapping, fragmentation, multiple numerals in the same image, and other such characteristics. Programmatically, however, in traditional computing systems, such analysis is very difficult. A variety of image matching techniques are known, but this type of analysis quickly overwhelms the available computational resources even with very small image sizes. In contrast, however, a CNN system 10 can correctly identify ones, zeroes, both ones and zeroes, or neither a one nor a zero in each processed image with an acceptable degree of accuracy even if the CNN system 10 has never previously "seen" the exact image.

FIG. 1D represents a CNN operation that analyzes (e.g., mathematically combines) portions of an unknown image with corresponding portions of a known image. For example, a 3-pixel portion of the left-side, unknown image B5-C6-D7 may be recognized as matching a corresponding 3-pixel portion of the right-side, known image C7-D8-E9. In these and other cases, a variety of other corresponding pixel arrangements may also be recognized. Some other correspondences are illustrated in Table 1.

TABLE 1

| Corresponding known to unknown images segments | |
|---|---|
| FIG. 1D<br>Left-side, unknown image | FIG. 1D<br>Right-side, known image |
| C3-B4-B5<br>C6-D7-E7-F7-G6<br>E1-F2<br>G2-H3-H4-H5 | D3-C4-C5<br>D8-E9-F9-G9-H8<br>G2-H3<br>H3-I4-I5-I6 |

Recognizing that segments or portions of a known image may be matched to corresponding segments or portions of an unknown image, it is further recognized that by unifying the portion matching operation, entire images may be processed in the exact same way while achieving previously uncalculated results. Stated differently, a particular portion size may be selected, and a known image may then be analyzed portion-by-portion. When a pattern within any given portion of a known image is mathematically combined with a similarly sized portion of an unknown image, information is generated that represents the similarity between the portions.

FIG. 1E illustrates six portions of the right-side, known image of FIG. 1D. Each portion, also called a "kernel," is arranged as a 3-pixel-by-3-pixel array. Computationally, pixels that are illuminated are represented mathematically as a positive "1" (i.e., +1); and pixels that are not illuminated are represented mathematically as a negative "1" (i.e., −1). For the sake of simplifying the illustration in FIG. 1E, each illustrated kernel is also shown with the column and row reference of FIG. 1D.

The six kernels shown in FIG. 1E are representative and selected for ease of understanding the operations of CNN system 10. It is clear that a known image can be represented with a finite set of overlapping or non-overlapping kernels. For example, considering a 3-pixel-by-3-pixel kernel size and a system of overlapping kernels having a stride of one (1), each 10×10 pixel image may have 64 corresponding kernels.

A first kernel spans the 9 pixels in columns A, B, C, and rows 1, 2, 3.

A second kernel spans the 9 pixels in columns B, C, D, and rows 1, 2, 3.

A third kernel spans the 9 pixels in columns C, D, E, and rows 1, 2, 3.

This pattern of kernels continues until an eighth kernel spans the 9 pixels in columns H, I, J, and rows 1, 2, 3.

Kernel alignment continues in this way until a 57th kernel spans columns A, B, C, and rows 8, 9, 10, and so on until a 64th kernel spans columns H, I, J, and rows 8, 9, 10.

In other CNN systems, kernels may be overlapping or not overlapping, and kernels may have strides of 2, 3, or some other number. The different strategies for selecting kernel sizes, strides, positions, and the like are chosen by a CNN system designer based on past results, analytical study, or in some other way.

Returning to the example of FIGS. 1D and 1E, a total of 64 kernels are formed using information in the known image. The first kernel starts with the upper-most, left-most 9 pixels in a 3×3 array. The next seven kernels are sequentially shifted right by one column each. The ninth kernel returns back to the first three columns and drops down to the second row, similar to the carriage return operation of a text-based document, which concept is derived from a twentieth-century manual typewriter. In following this pattern, FIG. 1E shows the $7^{th}$, $18^{th}$, $24^{th}$, $32^{nd}$, $60^{th}$, and $62^{nd}$ kernels of the 10×10 image in FIG. 1D(b).

Sequentially, or in some other known pattern, each kernel of the known image is aligned with a correspondingly sized set of pixels of the image under analysis. In a fully analyzed system, for example, the first kernel of the known image is conceptually overlaid on the unknown image in each of the kernel positions. Considering FIGS. 1D and 1E, the first kernel is conceptually overlaid on the unknown image in the position of Kernel No. 1 (left-most, top-most portion of the image), then the first kernel is conceptually overlaid on the unknown image in the position of Kernel No. 2, and so on, until the first kernel is conceptually overlaid on the unknown image in the position of Kernel No. 64 (bottom-most, right-most portion of the image). The procedure is repeated for each of the 64 kernels, and a total of 4096 operations are performed (i.e., 64 kernels in each of 64 positions). In this way, it is also shown that when other CNN systems select different kernel sizes, different strides, and different patterns of conceptual overlay, then the number of operations will change.

In the CNN system 10, the conceptual overlay of each kernel on each portion of an unknown image under analysis is carried out as a mathematical process called convolution. Each of the nine pixels in a kernel is given a value of positive "1" (+1) or negative "1" (−1) based on whether the pixel is illuminated or unilluminated, and when the kernel is overlaid on the portion of the image under analysis, the value of each pixel in the kernel is multiplied by the value of the corresponding pixel in the image. Since each pixel has a value of +1 (i.e., illuminated) or −1 (i.e., unilluminated), the multiplication will always result in either a +1 or a −1. Additionally, since each of the 4096 kernel operations is processed using a 9-pixel kernel, a total of 36,864 mathematical operations (i.e., 9×4096) are performed at this first stage of a single unknown image analysis in a very simple CNN. Clearly, even simple CNN systems require tremendous computational resources, and the computational requirements for more complex CNN systems grow exponentially.

As just described, each of the 9 pixels in a kernel is multiplied by a corresponding pixel in the image under analysis. An unilluminated pixel (−1) in the kernel, when multiplied by an unilluminated pixel (−1) in the subject unknown image will result in a +1 indicated a "match" at that pixel position (i.e., both the kernel and the image have an unilluminated pixel). Similarly, an illuminated pixel (+1) in the kernel multiplied by an illuminated pixel (+1) in the unknown image also results in a match (+1). On the other hand, when an unilluminated pixel (−1) in the kernel is multiplied by an illuminated pixel (+1) in the image, the result indicates no match (−1) at that pixel position. And when an illuminated pixel (+1) in the kernel is multiplied by an unilluminated pixel (−1) in the image, the result also indicates no match (−1) at that pixel position.

After the nine multiplication operations of a single kernel are performed, the product results will include nine values; each of the nine values being either a positive one (+1) or a negative one (−1). If each pixel in the kernel matches each pixel in the corresponding portion of the unknown image, then the product result will include nine positive one (+1) values. Alternatively, if one or more pixels in the kernel do not match a corresponding pixel in the portion of the unknown image under analysis, then the product result will have at least some negative one (−1) values. If every pixel in the kernel fails to match the corresponding pixel in the corresponding portion of the unknown image under analysis, then the product result will include nine negative one (−1) values.

Considering the mathematical combination (i.e., the multiplication operations) of pixels, it is recognized that the number of positive one (+1) values and the number of negative one (−1) values in a product result represents the degree to which the feature in the kernel matches the portion of the image where the kernel is conceptually overlaid. Thus, by summing all of the products (e.g., summing the nine values) and dividing by the number of pixels (e.g., nine), a single "quality value" is determined. The quality value represents the degree of match between the kernel and the portion of the unknown image under analysis. The quality value can range from negative one (−1) when no kernel pixels match and positive one (+1) when every pixel in the kernel has the same illuminated/unilluminated status as its corresponding pixel in the unknown image.

The acts described herein with respect to FIG. 1E may also collectively be referred to as a first convolutional process in an operation called "filtering." In a filter operation, a particular portion of interest in a known image is searched for in an unknown image. The purpose of the filter is to identify if and where the feature of interest is found in the unknown image with a corresponding prediction of likelihood.

FIG. 1F illustrates twelve acts of convolution in a filtering process. FIG. 1G shows the results of the twelve convolutional acts of FIG. 1F. In each act, a different portion of the unknown image is processed with a selected kernel. The selected kernel may be recognized as the twelfth kernel in the representative numeral one ("1") of FIG. 1B. The representative "1" is formed in FIG. 1B as a set of illuminated pixels in a 10-pixel-by-10-pixel image. Starting in the top-most, left-most corner, the first kernel covers a 3-pixel-by-3-pixel portion. The second through eighth kernels sequentially move one column rightward. In the manner of a carriage return, the ninth kernel begins in the second row, left-most column. Kernels 10-16 sequentially move one column rightward for each kernel. Kernels 17-64 may be similarly formed such that each feature of the numeral "1" in FIG. 1B is represented in at least one kernel.

In FIG. 1F(a), a selected kernel of 3-pixels by 3-pixels is conceptually overlaid on a left-most, top-most section of an unknown image. The selected kernel in this case is the twelfth kernel of the numeral "1" of FIG. 1B. The unknown image in FIG. 1F(a) may appear to a human observer as a shifted, poorly formed numeral one (i.e., "1"). In the convolutional process, the value of each pixel in the selected kernel, which is "+1" for illuminated pixels and "−1" for unilluminated pixels, is multiplied by each corresponding pixel in the unknown image. In FIG. 1F(a), five kernel pixels are illuminated, and four kernel pixels are unilluminated. Every pixel in the unknown image is unilluminated. Accordingly, when all nine multiplications are performed, five products are calculated to be "−1," and four products are calculated to be "+1." The nine products are summed, and the resulting value of "−1" is divided by nine. For this reason, the corresponding image of FIG. 1G(a) shows a resulting kernel value of "−0.11" for the kernel in the left-most, top-most section of the unknown image.

In FIGS. 1F(b), 1F(c), and 1F(d), the kernel pixel is sequentially moved rightward across the columns of the image. Since each pixel in the area of the first six columns and first three rows spanning the first six columns is also unilluminated, FIGS. 1G(b), 1G(c), and 1G(d) each show a calculated kernel value of "−0.11."

FIGS. 1F(e) and 1G(e) show a different calculated kernel value from the earlier calculated kernel values of "−0.11." In FIG. 1F(e), one of the illuminated kernel pixels matches one of the illuminated pixels in the unknown image. This match is shown by a darkened pixel in FIG. 1F(e). Since FIG. 1F(e) now has a different set of matched/unmatched characteristics, and further, since another one of the kernel pixels matches a corresponding pixel in the unknown image, it is expected that the resulting kernel value will increase. Indeed, as shown in FIG. 1G(e), when the nine multiplication operations are carried out, four unilluminated pixels in the kernel match four unilluminated pixels in the unknown image, one illuminated pixel in the kernel matches one illuminated pixel in the unknown image, and four other illuminated pixels in the kernel do not match the unilluminated four pixels in the unknown image. When the nine products are summed, the result of "+1" is divided by nine for a calculated kernel value of "+0.11" in the fifth kernel position.

As the kernel is moved further rightward in FIG. 1F(f), a different one of the illuminated kernel pixels matches a corresponding illuminated pixel in the unknown image. FIG. 1G(f) represents the set of matched and unmatched pixels as a kernel value of "+0.11."

In FIG. 1F(g), the kernel is moved one more column to the right, and in this position, every pixel in the kernel matches every pixel in the unknown image. Since the nine multiplications performed when each pixel of the kernel is multiplied by its corresponding pixel in the unknown image results in a "+1.0," the sum of the nine products is calculated to be "+9.0," and the final kernel value for the particular position is calculated (i.e., 9.0/9) to be "+1.0," which represents a perfect match.

In FIG. 1F(h), the kernel is moved rightward again, which results in a single illuminated pixel match, four unilluminated pixel matches, and a kernel value of "+0.11," as illustrated in FIG. 1G(h).

The kernel continues to be moved as shown in FIGS. 1F(i), 1F(j), 1F(k), and 1F(l), and in each position, a kernel value is mathematically calculated. Since no illuminated pixels of the kernel are overlaid on illuminated pixels of the unknown image in in FIGS. 1F(i) to 1F(l), the calculated kernel value for each of these positions is "−0.11." The kernel values are shown in FIGS. 1G(i), 1G(j), 1G(k), and 1G(l) as "−0.11" in the respective four kernel positions.

FIG. 1H illustrates a stack of maps of kernel values. The topmost kernel map in FIG. 1H is formed when the twelfth kernel of the numeral "1" in FIG. 1B is moved into each position of the unknown image. The twelfth kernel will be recognized as the kernel used in each of FIGS. 1F(a) to 1F(l) and FIGS. 1G(a) to 1G(l). For each position where the selected kernel is conceptually overlaid on the unknown image, a kernel value is calculated, and the kernel value is stored in its respective position on the kernel map.

Also in FIG. 1H, other filters (i.e., kernels) are also applied to the unknown image. For simplicity in the discussion, the 29th kernel of the numeral "1" in FIG. 1B is selected, and the 61st kernel of the numeral "1" in FIG. 1B is selected. For each kernel, a distinct kernel map is created. The plurality of created kernel maps may be envisioned as a stack of kernel maps having a depth equal to the number of filters (i.e., kernels) that are applied. The stack of kernel maps may also be called a stack of filtered images.

In the convolutional process of the CNN system 10, a single unknown image is convolved to create a stack of filtered images. The depth of the stack is the same as, or is otherwise based on, the number of filters (i.e., kernels) that are applied to the unknown image. The convolutional process in which a filter is applied to an image is also referred to as a "layer" because they can be stacked together.

As evident in FIG. 1H, a large quantity of data is generated during the convolutional layering process. In addition, each kernel map (i.e., each filtered image) has nearly as many values in it as the original image. In the examples presented in FIG. 1H, the original unknown input image is formed by 100 pixels (10×10), and the generated filter map has 64 values (8×8). The simple reduction in size of the kernel map is only realized because the applied 9-pixel kernel values (3×3) cannot fully process the outermost pixels at the edge of the image.

FIG. 1I shows a pooling feature that significantly reduces the quantity of data produced by the convolutional processes. A pooling process may be performed on one, some, or all of the filtered images. The kernel map in FIG. 1I is recognized as the top-most filter map of FIG. 1H, which is formed with the 12th kernel of the numeral "1" in FIG. 1B.

The pooling process introduces the concepts of "window size" and "stride." The window size is the dimensions of a window such that a single, maximum value within the window will be selected in the pooling process. A window may be formed having dimensions of m-pixels by n-pixels wherein "m" and "n" are integers, but in most cases, "m" and "n" are equal. In the pooling operation shown in FIG. 1I, each window is formed as a 2-pixel-by-2-pixel window. In the pooling operation, a 4-pixel window is conceptually overlaid onto a selected portion of the kernel map, and within the window, the highest value is selected.

In the pooling operation, in a manner similar to conceptually overlaying a kernel on an unknown image, the pooling window is conceptually overlaid onto each portion of the kernel map. The "stride" represents how much the pooling window is moved after each pooling act. If the stride is set to "two," then the pooling window is moved by two pixels after each pooling act. If the stride is set to "three," then the pooling window is moved by three pixels after each pooling act.

In the pooling operation of FIG. 1I, the pooling window size is set to 2×2, and the stride is also set to two. A first pooling operation is performed by selecting the four pixels in the top-most, left-most corner of the kernel map. Since each kernel value in the window has been calculated to be "−0.11," the value from the pooling calculation is also "−0.11." The value of "−0.11" is placed in the top-most, left-most corner of the pooled output map in FIG. 1I.

The pooling window is then moved rightward by the selected stride of two pixels, and the second pooling act is performed. Once again, since each kernel value in the second pooling window is calculated to be "−0.11," the value from the pooling calculation is also "−0.11." The value of "−0.11" is placed in the second entry of the top row of the pooled output map in FIG. 1I.

The pooling window is moved rightward by a stride of two pixels, and the four values in the window are evaluated. The four values in the third pooling act are "+0.11," "+0.11," "+0.11," and "+0.33." Here, in this group of four kernel values, "+0.33" is the highest value. Therefore, the value of "+0.33" is placed in the third entry of the top row of the pooled output map in FIG. 1I. The pooling operation does not care where in the window the highest value is found, the pooling operation simply selects the highest (i.e., the greatest) value that falls within the boundaries of the window.

The remaining 13 pooling operations are also performed in a like manner so as to fill the remainder of the pooled output map of FIG. 1I. Similar pooling operations may also be performed for some or all of the other generated kernel maps (i.e., filtered images). Further considering the pooled output of FIG. 1I, and further considering the selected kernel (i.e., the twelfth kernel of the numeral "1" in FIG. 1B) and the unknown image, it is recognized that the highest values are found in the upper right-hand corner of the pooled output. This is so because when the kernel feature is applied to the unknown image, the highest correlations between the pixels of the selected feature of interest (i.e., the kernel) and the similarly arranged pixels in the unknown image are also found in the upper right-hand corner. It is also recognized that the pooled output has values captured in it that loosely represent the values in the un-pooled, larger-sized kernel map. If a particular pattern in an unknown image is being searched for, then the approximate position of the pattern can be learned from the pooled output map. Even if the actual position of the feature is not known with certainty, an observer can recognize that the feature was detected in the pooled output. The actual feature may be moved a little bit left or a little bit right in the unknown image, or the actual feature may be rotated or otherwise not identical to the kernel feature, but nevertheless, the occurrence of the feature and its general position may be recognized.

An optional normalization operation is also illustrated in FIG. 1I. The normalization operation is typically performed by a Rectified Linear Unit (ReLU). The ReLU identifies every negative number in the pooled output map and replaces the negative number with the value of zero (i.e., "0") in a normalized output map. The optional normalization process by one or more ReLU circuits helps to reduce the computational resource workload that may otherwise be required by calculations performed with negative numbers.

After processing in the ReLU layer, data in the normalized output map may be averaged in order to predict whether or not the feature of interest characterized by the kernel is found or is not found in the unknown image. In this way, each value in a normalized output map is used as a weighted "vote" that indicates whether or not the feature is present in the image. In some cases, several features (i.e., kernels) are convolved, and the predictions are further combined to characterize the image more broadly. For example, as illustrated in FIG. 1H, three kernels of interest derived from a known image of a numeral "1" are convolved with an unknown image. After processing each kernel through the various layers, a prediction is made as to whether or not the unknown image includes one or more pixel patterns that show a numeral "1."

Summarizing FIGS. 1A-1I, kernels are selected from a known image. Not every kernel of the known image needs to be used by the CNN. Instead, kernels that are determined to be "important" features may be selected. After the convolution process produces a kernel map (i.e., a feature image), the kernel map is passed through a pooling layer, and a normalization (i.e., ReLU) layer. All of the values in the output maps are averaged (i.e., sum and divide), and the output value from the averaging is used as a prediction of whether or not the unknown image contains the particular feature found in the known image. In the exemplary case, the output value is used to predict whether the unknown image contains a numeral "1." In some cases, the "list of votes" may also be used as input to subsequent stacked layers. This manner of processing reinforces strongly identified features and reduces the influence of weakly identified (or unidentified) features. Considering the entire CNN, a two-dimensional image is input to the CNN and produces a set of votes at its output. The set of votes at the output are used to predict whether the input image either does or does not contain the object of interest that is characterized by the features.

The CNN system 10 of FIG. 1A may be implemented as a series of operational layers. One or more convolutional layers may be followed by one or more pooling layers, and the one or more pooling layers may be optionally followed by one or more normalization layers. The convolutional layers create a plurality of kernel maps, which are otherwise called filtered images, from a single unknown image. The large quantity of data in the plurality of filtered images is reduced with one or more pooling layers, and the quantity of data is reduced further by one or more ReLU layers that normalize the data by removing all negative numbers.

FIG. 1J shows the CNN system 10 of FIG. 1A in more detail. In FIG. 1J(a), the CNN system 10 accepts a 10-pixel-by-10-pixel input image into a CNN. The CNN includes a convolutional layer, a pooling layer, a rectified linear unit (ReLU) layer, and a voting layer. One or more kernel values are convolved in cooperation with the unknown 10×10 image, and the output from the convolutional layer is passed to the pooling layer. One or more max pooling operations are performed on each kernel map provided by the convolutional layer. Pooled output maps from the pooling layer are used as input to a ReLU layer that produces normalized output maps, and the data contained in the normalized output maps is summed and divided to determine a prediction as to whether or not the input image includes a numeral "1" or a numeral "0."

In FIG. 1J(b), another CNN system 10a is illustrated. The CNN in the CNN system 10a includes a plurality of layers, which may include convolutional layers, pooling layers, normalization layers, and voting layers. The output from one layer is used as the input to a next layer. In each pass through a convolutional layer, the data is filtered. Accordingly, both image data and other types data may be convolved to search for (i.e., filter) any particular feature. When passing through pooling layers, the input data generally retains its predictive information, but the quantity of data is reduced. Since the CNN system 10a of FIG. 1J(b) includes many layers, the CNN is arranged to predict that the input image contains any one of many different features.

One other characteristic of a CNN is the use of back propagation to reduce errors and improve the quality of the neural network to recognize particular features in the midst of vast quantities of input data. For example, if the CNN arrives at a prediction that is less than 1.0, and the prediction is later determined to be accurate, then the difference between the predicted value and 1.0 is considered an error rate. Since the goal of the neural network is to accurately predict whether or not a particular feature is included in an input data set, the CNN can be further directed to automatically adjust weighting values that are applied in a voting layer.

Back propagation mechanisms are arranged to implement a feature of gradient descent. Gradient descent may be applied on a two-dimensional map wherein one axis of the map represents "error rate," and the other axis of the map represents "weight." In this way, such a gradient-descent map will preferably take on a parabolic shape such that if an error rate is high, then the weight of that derived value will be low. As error rate drops, then the weight of the derived value will increase. Accordingly, when a CNN that implements back propagation continues to operate, the accuracy of the CNN has the potential to continue improving itself automatically.

The performance of known object recognition techniques that use machine learning methods is improved by applying more powerful models to larger datasets, and implementing better techniques to prevent overfitting. Two known large datasets include LabelMe and ImageNet. LabelMe includes hundreds of thousands of fully segmented images, and more than 15 million high-resolution, labeled images in over 22,000 categories are included in ImageNet.

To learn about thousands of objects from millions of images, the model that is applied to the images requires a large learning capacity. One type of model that has sufficient learning capacity is a convolutional neural network (CNN) model. In order to compensate for an absence of specific information about the huge pool of data, the CNN model is arranged with at least some prior knowledge of the data set (e.g., statistical stationarity/non-stationarity, spatiality, temporality, locality of pixel dependencies, and the like). The CNN model is further arranged with a designer selectable set of features such as capacity, depth, breadth, number of layers, and the like.

Early CNN's were implemented with large, specialized super-computers. Conventional CNN's are implemented with customized, powerful graphic processing units (GPUs). As described by Krizhevsky, "current GPUs, paired with a highly optimized implementation of 2D convolution, are powerful enough to facilitate the training of interestingly large CNNs, and recent datasets such as ImageNet contain enough labeled examples to train such models without severe overfitting."

FIGS. 2A-2C may collectively be referred to herein as FIG. 2.

FIG. 2A is an illustration of the known AlexNet DCNN architecture. As described by Krizhevsky, FIG. 1 shows the "delineation of responsibilities between [the] two GPUs. One GPU runs the layer-parts at the top of the figure while the other runs the layer-parts at the bottom. The GPUs communicate only at certain layers. The network's input is 150,528-dimensional, and the number of neurons in the network's remaining layers is given by 253,440-186,624-64,896-64,896-43,264-4096-4096-1000."

Krizhevsky's two GPUs implement a highly optimized two-dimensional (2D) convolution framework. The final network contains eight learned layers with weights. The eight layers consist of five convolutional layers CL1-CL5, some of which are followed by max-pooling layers, and three fully connected layers FC with a final 1000-way softmax, which produces a distribution over 1000 class labels.

In FIG. 2A, kernels of convolutional layers CL2, CL4, CL5 are connected only to kernel maps of the previous layer that are processed on the same GPU. In contrast, kernels of convolutional layer CL3 are connected to all kernel maps in convolutional layer CL2. Neurons in the fully connected layers FC are connected to all neurons in the previous layer.

Response-normalization layers follow the convolutional layers CL1, CL2. Max-pooling layers follow both the response-normalization layers as well as convolutional layer CL5. The max-pooling layers summarize the outputs of neighboring groups of neurons in the same kernel map. Rectified Linear Unit (ReLU) non-linearity is applied to the output of every convolutional and fully connected layer.

The first convolutional layer CL1 in the AlexNet architecture of FIG. 1A filters a 224×224×3 input image with 96 kernels of size 11×11×3 with a stride of 4 pixels. This stride is the distance between the receptive field centers of neighboring neurons in a kernel map. The second convolutional layer CL2 takes as input the response-normalized and pooled output of the first convolutional layer CL1 and filters the output of the first convolutional layer with 256 kernels of size 5×5×48. The third, fourth, and fifth convolutional layers CL3, CL4, CL5 are connected to one another without any intervening pooling or normalization layers. The third convolutional layer CL3 has 384 kernels of size 3×3×256 connected to the normalized, pooled outputs of the second convolutional layer CL2. The fourth convolutional layer CL4 has 384 kernels of size 3×3×192, and the fifth convolutional layer CL5 has 256 kernels of size 3×3×192. The fully connected layers have 4096 neurons each.

The eight layer depth of the AlexNet architecture seems to be important because particular testing revealed that removing any convolutional layer resulted in unacceptably diminished performance. The network's size is limited by the amount of memory available on the implemented GPUs and by the amount of training time that is deemed tolerable. The AlexNet DCNN architecture of FIG. 1A takes between five and six days to train on two NVIDIA GEFORCE GTX 580 3 GB GPUs.

FIG. 2B is a block diagram of a known GPU such as the NVIDIA GEFORCE GTX 580 GPU. The GPU is a streaming multiprocessor containing 32 unified device architecture processors that employ a flexible scalar architecture. The GPU is arranged for texture processing, shadow map processing, and other graphics-centric processing. Each of the 32 processors in the GPU includes a fully pipelined integer arithmetic logic unit (ALU) and floating point unit (FPU). The FPU complies with the IEEE 754-2008 industry standard for floating-point arithmetic. The GPU in this case is particularly configured for desktop applications.

Processing in the GPU is scheduled in groups of 32 threads called warps. Each of the 32 threads executes the same instructions simultaneously. The GPU includes two warp schedulers and two instruction dispatch units. In this arrangement, two independent warps can be issued and executed at the same time.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which in and of itself may also be inventive.

BRIEF SUMMARY

An integrated circuit may be summarized as including on-board memory (e.g., random access memory (RAM)); an applications processor; a digital signal processor (DSP) cluster; a configurable accelerator framework (CAF); and at least one communication bus architecture communicatively coupling the applications processor, the DSP cluster, and the CAF to the on-board memory, wherein the CAF includes: a reconfigurable stream switch; and a data volume sculpting unit having at least one input coupled to the reconfigurable stream switch and an output coupled to the reconfigurable stream switch, the data volume sculpting unit having a counter, a comparator, and a controller, the data volume sculpting unit arranged to: receive, via the at least one input, a stream of feature map data, the stream of feature map data forming a three-dimensional (3D) feature map, the 3D feature map formed as a plurality of two-dimensional (2D) data planes; identify a 3D volume within the 3D feature map, the 3D volume being dimensionally smaller than the 3D feature map; isolate data from the 3D feature map that is within the 3D volume for processing in a deep learning algorithm; and provide the isolated data via the output.

The data volume sculpting unit may be further arranged to receive, via the at least one input, input information defining a region-of-interest in a first 2D data plane, the input information including at least one first coordinate of the region-of-interest and further information sufficient to form an enclosed 2D volume in the first 2D data plane; load and sequence the counter so that each datum in the first 2D data plane is analyzed in a selected order; and determine, using the comparator, whether or not each datum analyzed is within the enclosed 2D volume, wherein providing the isolated data output includes providing each datum that is determined to be within the enclosed 2D volume.

The data volume sculpting unit may be further arranged to receive, via the at least one input, input information defining a region-of-interest in a first 2D data plane, the input information including at least one first coordinate of the region-of-interest and further information sufficient to form an enclosed 2D volume in the first 2D data plane; load and sequence the counter so that each datum in the first 2D data plane is analyzed in a selected order; determine, using the comparator, whether or not each datum analyzed is within the enclosed 2D volume; and generate an ordered data structure that includes each datum that is determined to be within the enclosed 2D volume.

The data volume sculpting unit may be further arranged to include in the ordered data structure, data within a plurality of enclosed 2D volumes of the 3D feature map, wherein each 2D data plane of the plurality of 2D data planes has a respective enclosed 2D volume, and wherein each respective enclosed 2D volume is associated with at least one other enclosed 2D volume defined in an adjacent 2D data plane. Each 2D data plane of the plurality of 2D data planes may have defined therein a plurality of enclosed 2D volumes. Individual ones of the plurality of enclosed 2D volumes on a selected 2D data plane may be non-overlapping. The integrated circuit may be formed as a system on chip.

A method may be summarized as including receiving information at an input stream interface of a data volume sculpting unit, the information including a series of frames, each frame formed as a two dimensional (2D) data structure; determining a first dimension and a second dimension of each frame of the series of frames; based on the first and second dimensions, determining for each frame a position and a size of a region-of-interest to be extracted from the respective frame; and extracting from each frame, data in the frame that is within the region-of-interest, the extracting including: for each datum in each frame that is outside the respective region-of-interest to be extracted from the respective frame, passing a null datum through an output interface of the data volume sculpting unit; and for each datum in each frame that is within the respective region-of-interest to be extracted from the respective frame, passing the datum through the output interface of the data volume sculpting unit. The series of frames may include image frames composed of single pixel values. At least some of the frames of the series of 2D data structures may include non-image feature data structures, which may be within a convolutional neural network. The series of frames may be received as a raw data stream having a start tag and a stop tag. The series of frames may be received as a raster scan structure, wherein each individual line of the raster scan structure is staged with a start tag, a stop tag, and a type identifier.

The method may include determining a plurality of regions-of-interest to be extracted from each frame. Ones of the plurality of regions-of-interest to be extracted from each frame may be overlapping. Ones of the plurality of regions-of-interest to be extracted from each frame may be non-overlapping.

The method may include automatically extracting the position and the size of the region-of-interest from each frame using the information received at the input stream interface. The method may include retrieving the position and the size of the region-of-interest to be extracted from each frame from a parameter repository. At least one of the position and the size of the region-of-interest to be extracted from a first frame may be different from a corresponding position or size of the region-of-interest to be extracted from a second frame.

The method may include analyzing a pair of two-dimensional coordinates to determine the position and the size of the region-of-interest to be extracted from the respective frame. The pair of two-dimensional coordinates may include a top-left coordinate and a bottom-right coordinate of the region-of-interest to be extracted from the respective frame. Determining the position and the size of the region-of-interest to be extracted from the respective frame may include analyzing a single point and a radius about the single point. Determining the position and the size of the region-of-interest to be extracted from the respective frame may include analyzing a plurality of points that define a polygon. Determining the position and the size of the region-of-interest to be extracted from the respective frame may include analyzing a plurality of points and a distance between at least two of the plurality of points.

The method may include determining for each frame a plurality of regions-of-interest to be extracted from the respective frame, wherein the extracting includes concurrently passing separate and distinct null data or frame data out from the data volume sculpting unit for each one of the plurality of regions-of-interest. Passing the null datum through the output interface of the data volume sculpting unit may be performed by passing the datum from the frame and asserting a signal indicating that the datum is outside the respective region-of-interest to be extracted from the respective frame.

The extracting may include initializing a first counter and a second counter, the first and second counters arranged to track a position of each datum of a frame received at the input stream interface, wherein tracking the position of each datum includes using count values from the first and second counters as coordinates of the datum within the frame; comparing the coordinates of the datum to limit values defining the region-of-interest; and determining from the comparing whether or not the datum is outside or within the region-of-interest.

A data volume sculpting method may be summarized as including configuring a reconfigurable stream switch formed in an integrated circuit to pass streaming data into a data sculptor unit, the streaming data defining a three-dimensional (3D) feature map formed as a series of two-dimensional (2D) data planes; generating, with the data sculptor unit, an ordered data structure defining a 3D volume within the 3D feature map, the 3D volume being dimensionally smaller than the 3D feature map; and passing the ordered data structure through the reconfigurable stream switch. The integrated circuit may be arranged for convolutional neural network operations. The 3D feature map may include image data under analysis in a convolutional neural network. The 3D feature map may be arranged having a height, width, and depth (H, W, D) geometry. The sculpted 3D volume may be arranged having a height, width, and depth (h, w, d) geometry.

Generating the ordered data structure may include forming at least one linked list with a series of values corresponding to coordinates of a two-dimensional (2D) region-of-interest. Generating the ordered data structure may include forming at least one tuple, the at least one tuple including a region-of-interest identifier and at least one linked list or portions thereof that correspond to the 2D region-of-interest.

Generating the ordered data structure may include selecting a start index, the start index corresponding to a first 2D data plane of the feature map; selecting an end index, the end index corresponding to a last 2D data plane of the feature map; and including with the at least one linked list in the ordered data structure, the selected start and end indices, wherein the 3D volume is defined between the first and last 2D data planes of the feature map.

Generating the ordered data structure may include based on a common region-of-interest identifier, associating together a series of the 2D data planes between the start index and the end index. The coordinates may include a top-left coordinate and a bottom-right coordinate of the 2D region-of-interest. The 2D region-of-interest may be circular and the coordinates of the 2D region-of-interest may include coordinates corresponding to a single point and a radius about the single point. The 2D region-of-interest may be a polygon and the coordinates of the 2D region-of-interest may include point coordinates corresponding to a plurality of points that define the polygon. The 2D region-of-interest may include as least one curve and the coordinates of the 2D region-of-interest may include coordinates corresponding to a plurality of points and a distance between at least two of the plurality of points.

This Brief Summary has been provided to introduce certain concepts in a simplified form that are further described in detail below in the Detailed Description. Except where otherwise expressly stated, the Brief Summary does not identify key or essential features of the claimed subject matter, nor is it intended to limit the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIG. 1E illustrates six portions of the right-side, known image of FIG. 1D;

FIG. 1I shows a pooling feature that significantly reduces the quantity of data produced by the convolutional processes;

DETAILED DESCRIPTION

Figure 1A:
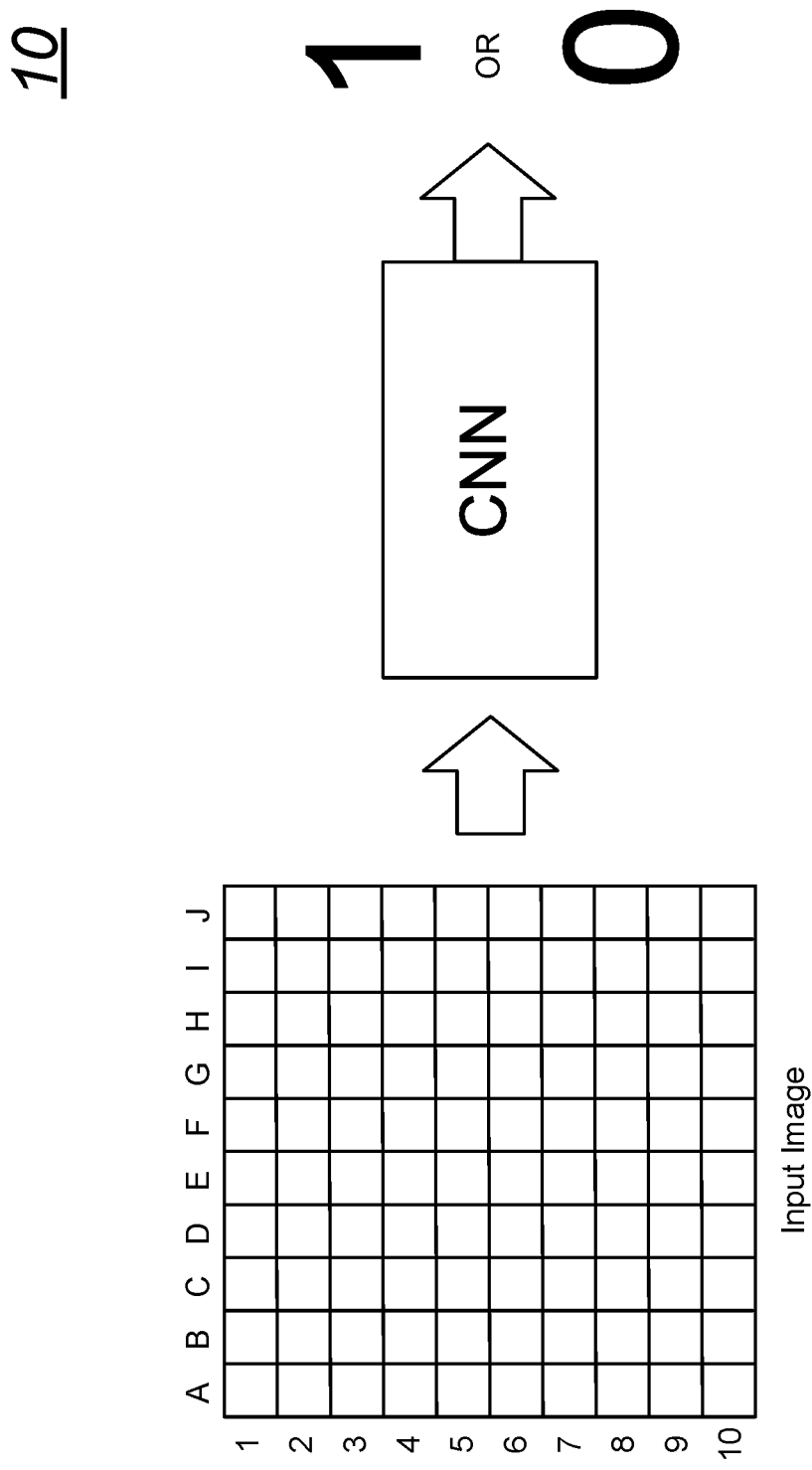
FIG. 1A is a simplified illustration of a convolutional neural network (CNN) system.
Figure 1B:
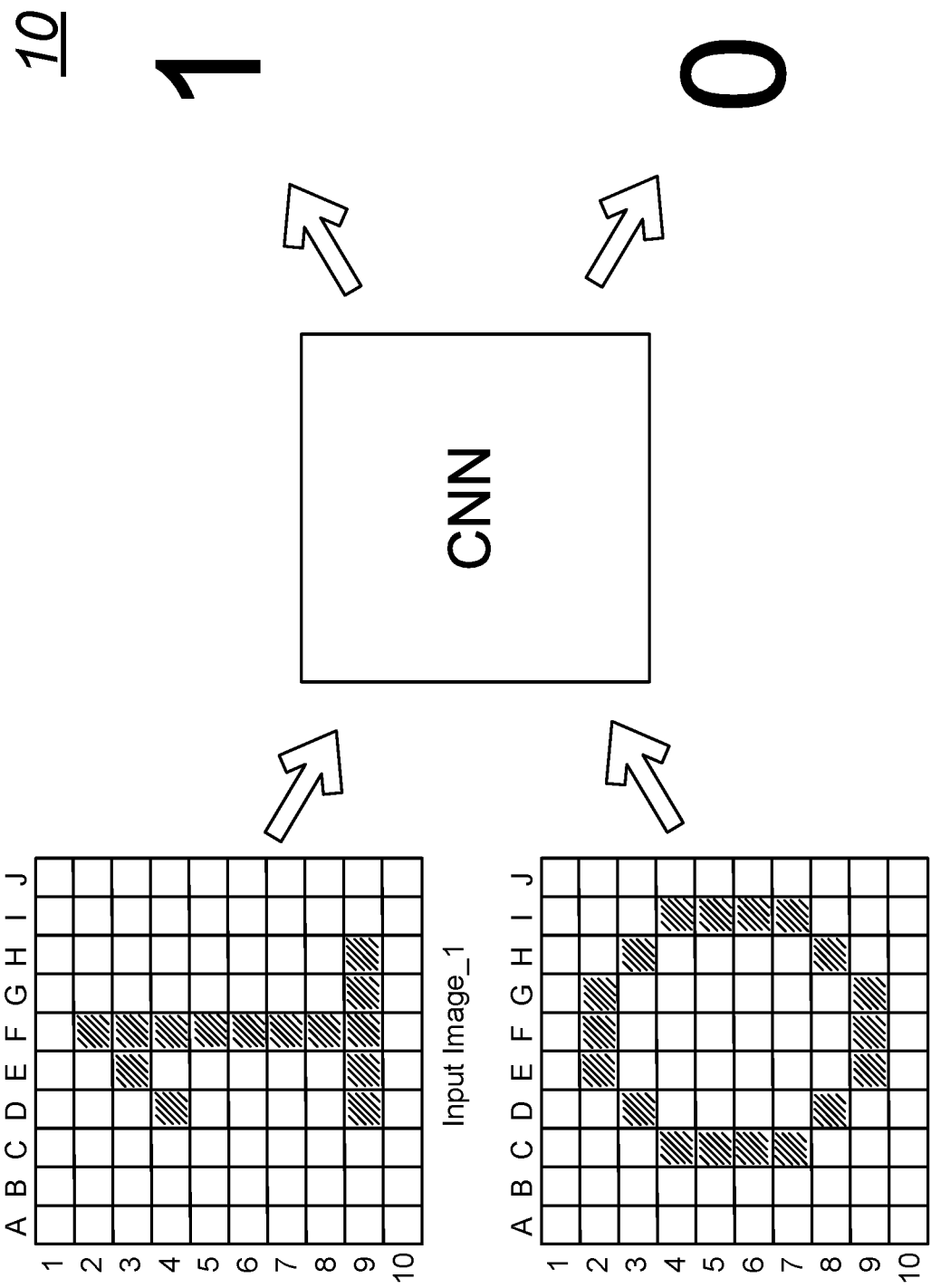
FIG. 1B illustrates the CNN system of FIG. 1A determining that a first pixel pattern illustrates a "1" and that a second pixel pattern illustrates a "0"
Figure 1C:
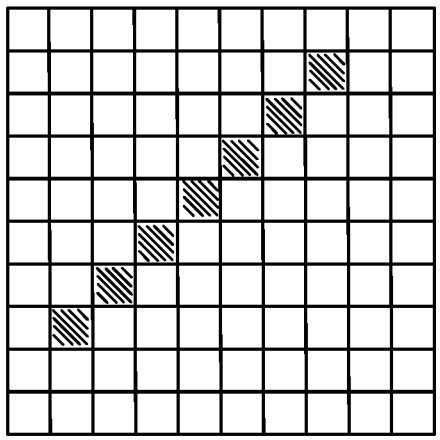
FIG. 1C shows several variations of different forms of ones and zeroes.
Figure 1C:
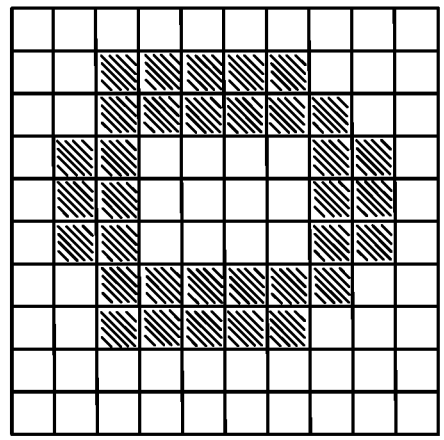
Figure 1C:
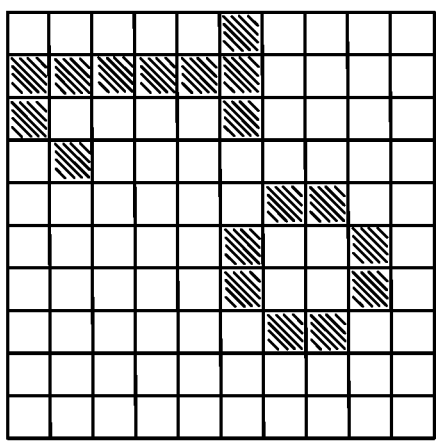
Figure 1C:
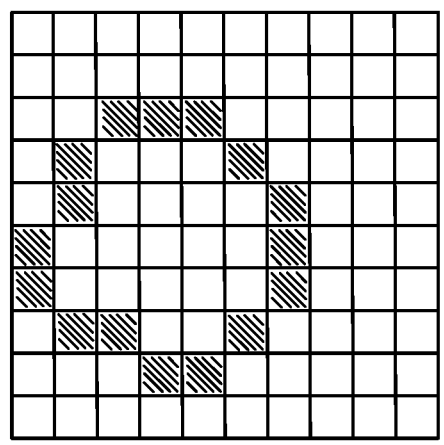
Figure 1C:
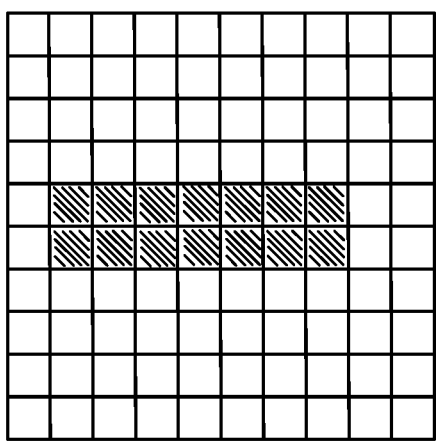
Figure 1C:
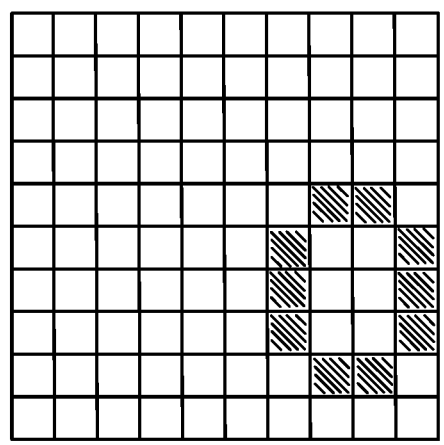
Figure 1D:
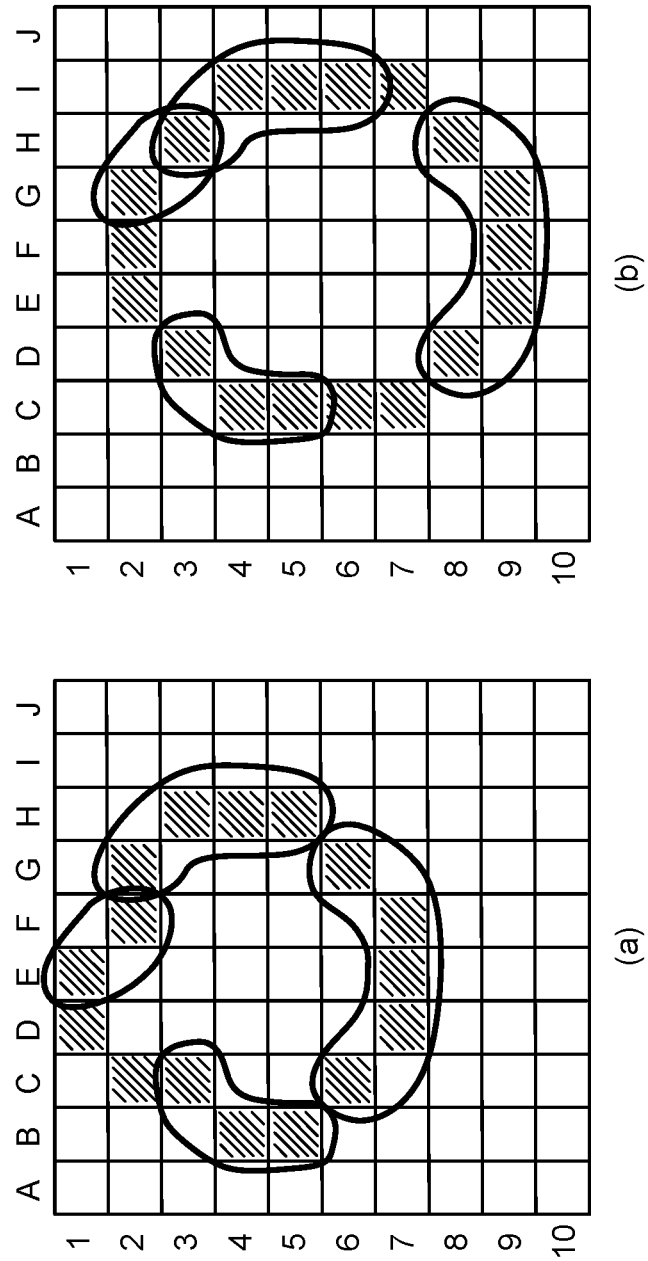
FIG. 1D represents a CNN operation that analyzes (e.g., mathematically combines) portions of an unknown image with corresponding portions of a known image.
Figure 1F:
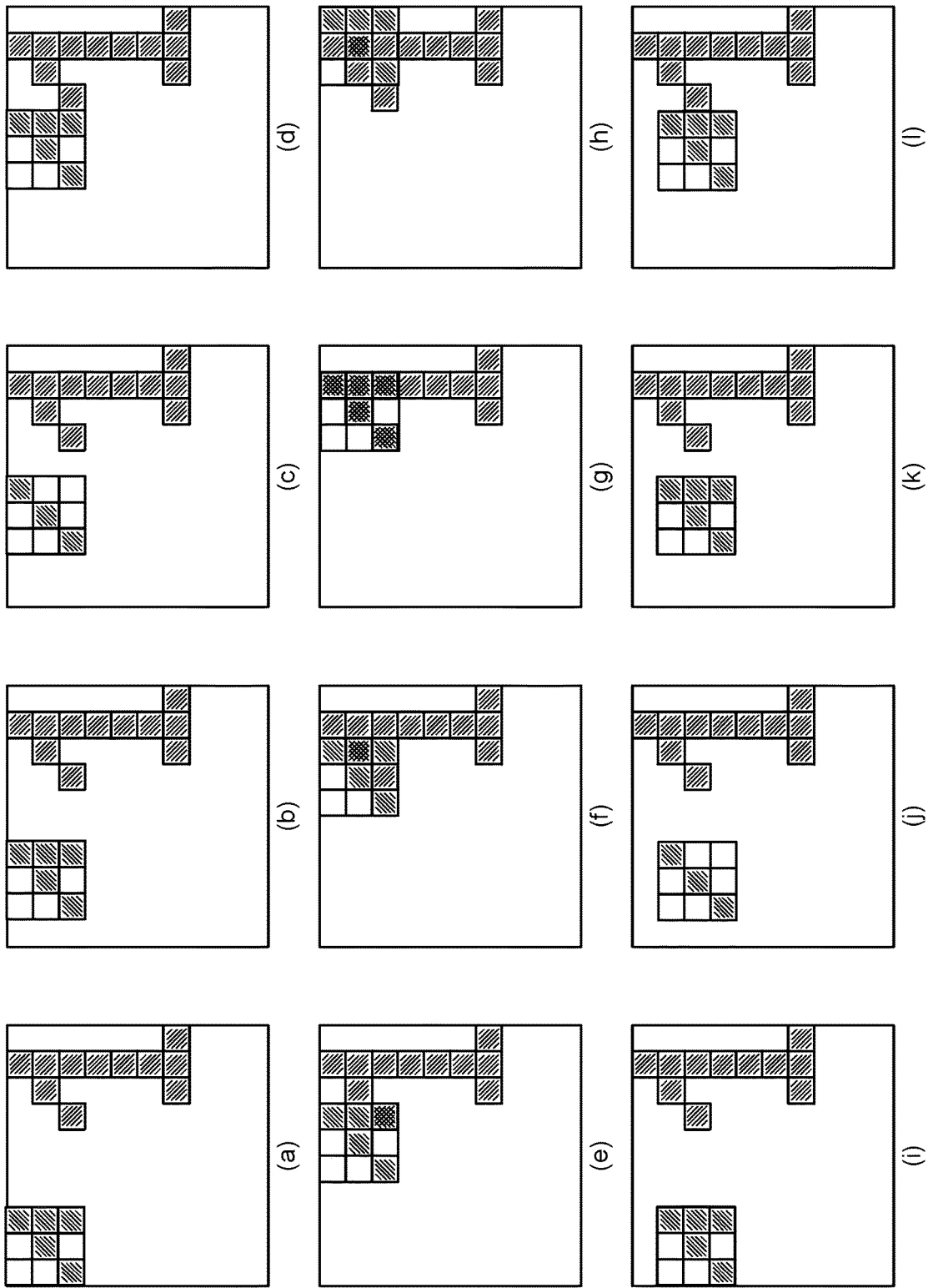
FIG. 1F illustrates 12 acts of convolution in a filtering process.
Figure 1G:
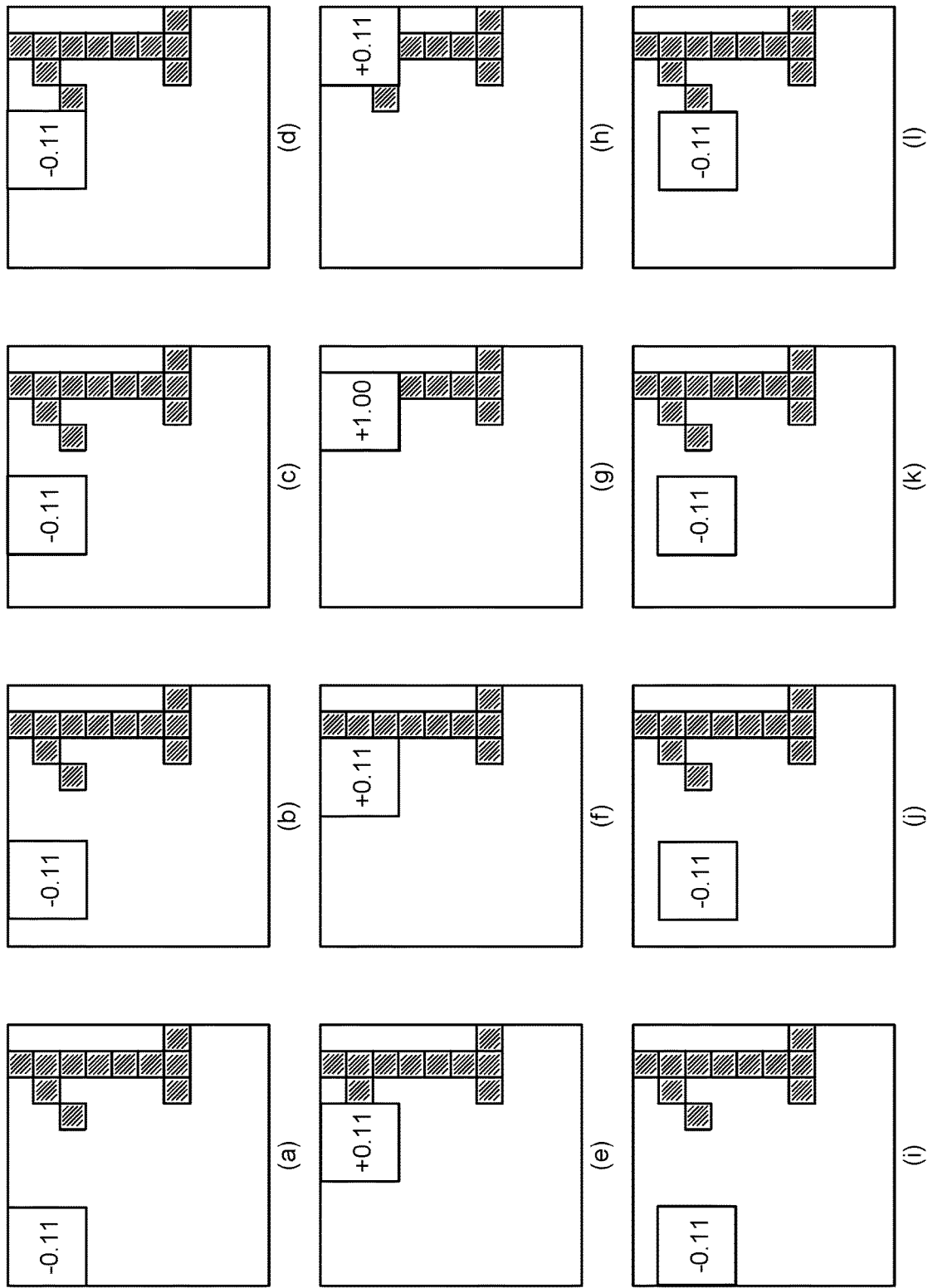
FIG. 1G shows the results of the 12 convolutional acts of FIG. 1F.
Figure 1H:
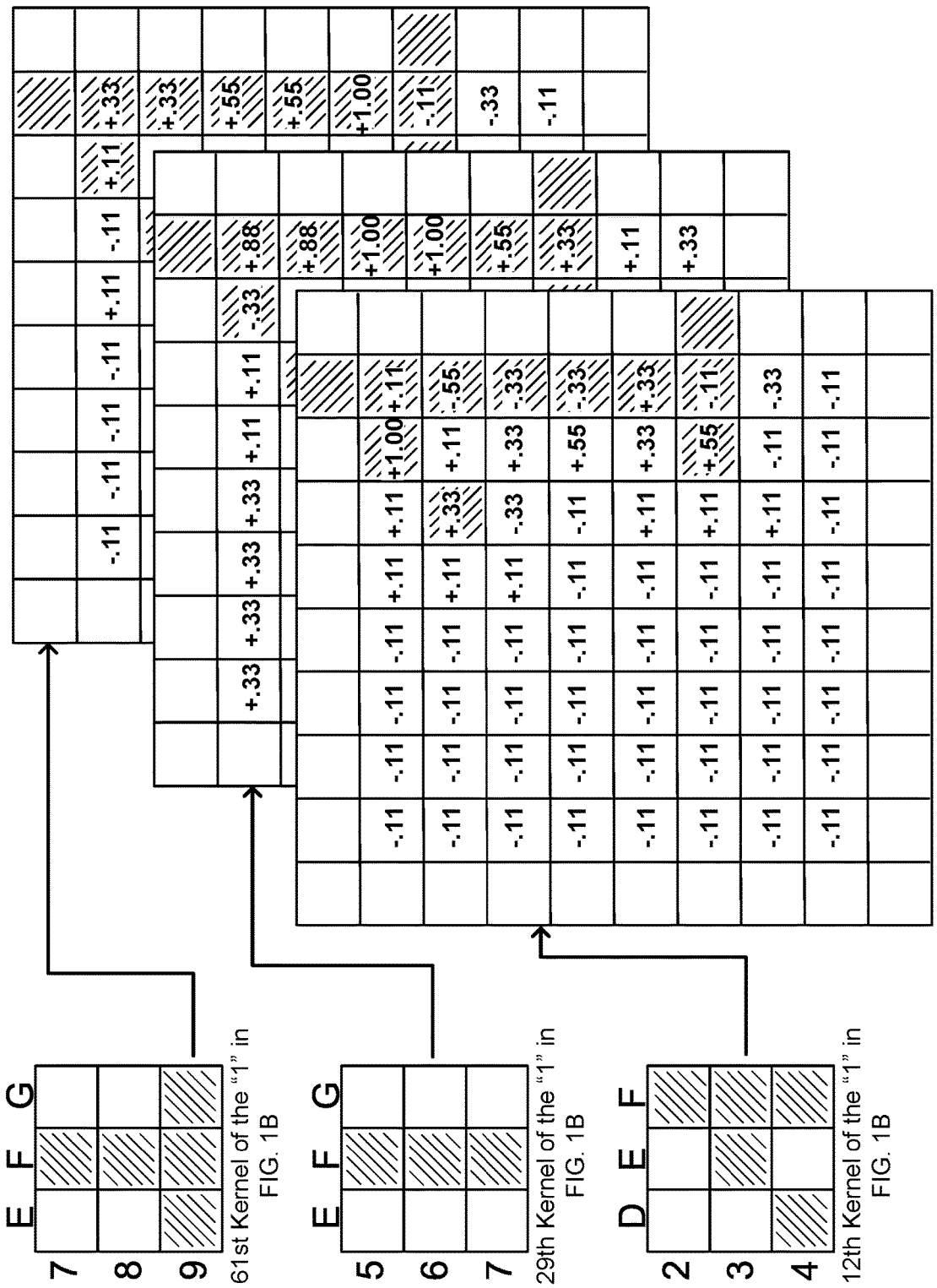
FIG. 1H illustrates a stack of maps of kernel values.
Figure 1J:
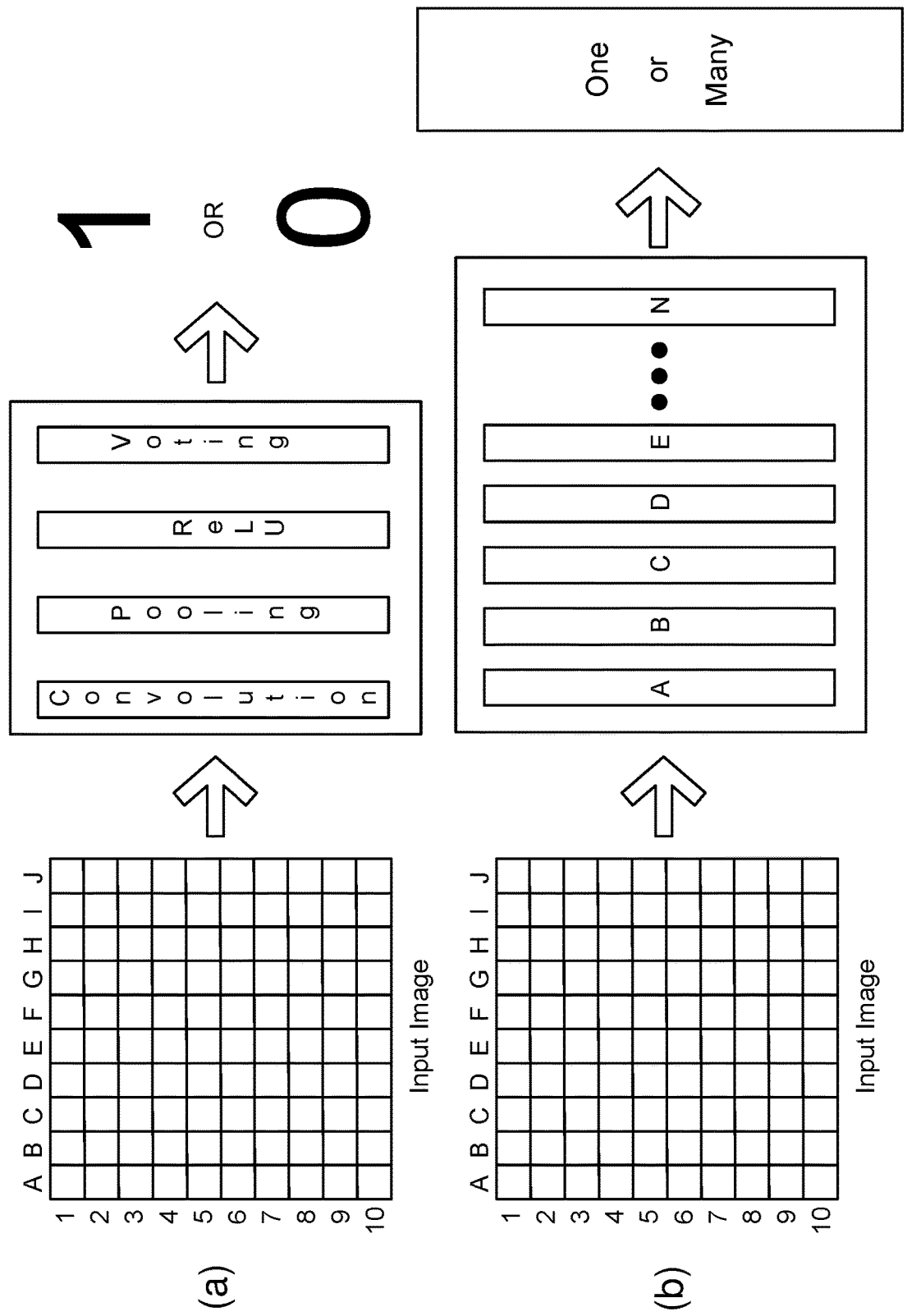
FIG. 1J shows the CNN system of FIG. 1A in more detail.

The present invention may be understood more readily by reference to the following detailed description of the preferred embodiments of the invention. It is to be understood that the terminology used herein is for the purpose of describing specific embodiments only and is not intended to be limiting. It is further to be understood that unless specifically defined herein, the terminology used herein is to be given its traditional meaning as known in the relevant art.

It is known that deep convolutional processing in a neural network produced excellent results when performing acts like object classification in an image. Less developed, however, are processes to efficiently detect and classify objects, scenes, action, or other points of interest in a video stream. Because video data is complex, and because videos lack the annotation that is so easily attached to image data, the means to detect points of interest within a video has not received as much attention. Where attempts have been made to address the problems, the main approach has been to apply convolutional neural network techniques in two major phases. A first phase attempts to identify "action" in a single frame, and then a second phase attempts to associate the suspected action across several frames. These methods create one stream in a convolution neural network to spatially identify the feature and create a second, separate stream in the network to temporally identify the feature.

One proposal to advance video classification technology is presented in the paper, "Tube Convolutional Neural Network (T-CNN) for Action Detection in Videos," by Rui Hou and others from the Center for Research in Computer Vision (CRCV), University of Central Florida (UCF). In this paper, referred to herein as the T-CNN paper, Hou suggests creation of an end-to-end deep network called Tube Convolutional Neural Network (T-CNN) for action detection in videos. The essence of the T-CNN includes a unified deep network that is able to recognize and localize action based on three-dimensional (3D) convolution features. A video is divided into equal length clips, and for each clip, a set of tube proposals are generated based on 3D convolutional network features. Subsequently, the tube proposals of different clips are linked together as a network flow of data, and spatio-temporal action detection is performed using the linked video proposals.

The T-CNN paper describes an approach where video clips are fed into a Tube Proposal Network (TPN) to obtain a set of tube proposals. Tube proposals from each video clip are linked according to their "actionness scores," and overlap between adjacent proposals is analyzed to form a complete tube proposal for spatio-temporal action localization in the video. Then, tube-of-interest pooling is applied to the tube proposal to generate a fixed length feature vector for action label prediction. Essential to the T-CNN paper is the TPN that creates the temporally adjacent frames having specifically isolated spatial information linked across each frame, i.e., the "tube proposals."

Figure 2A:
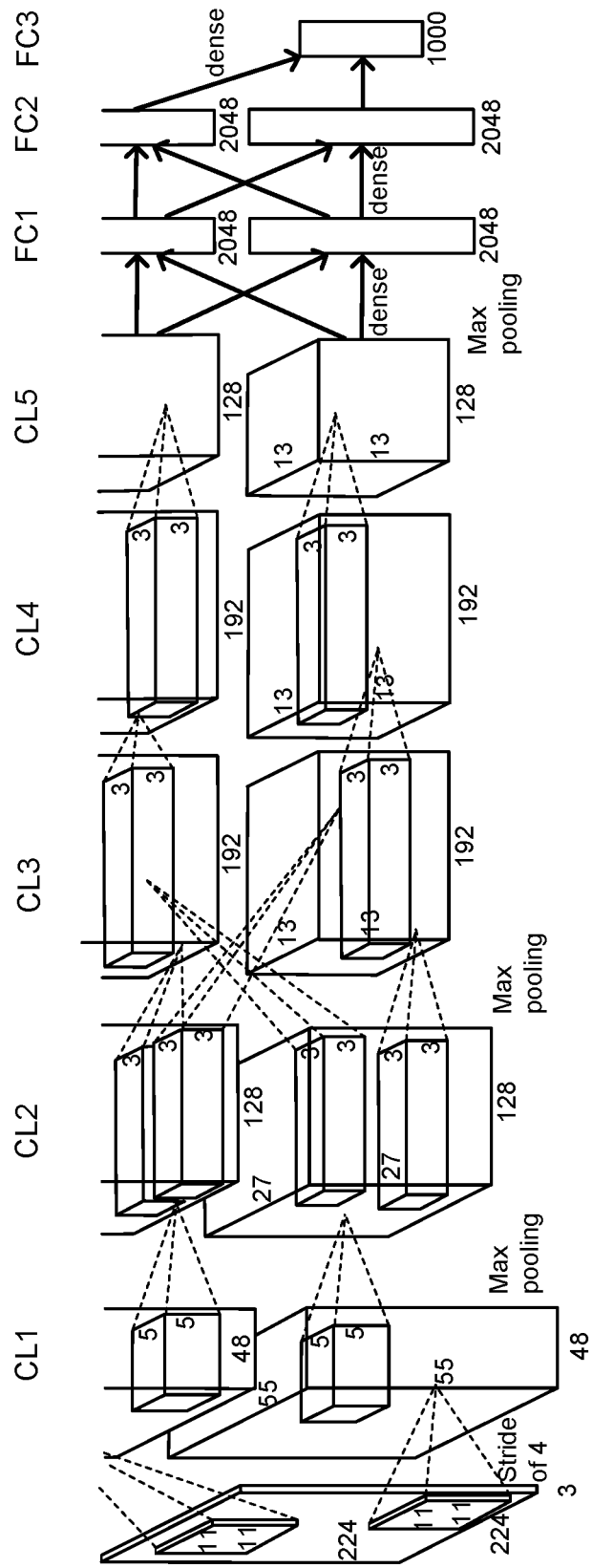
FIG. 2A is an illustration of the known AlexNet DCNN architecture.
Figure 2B:
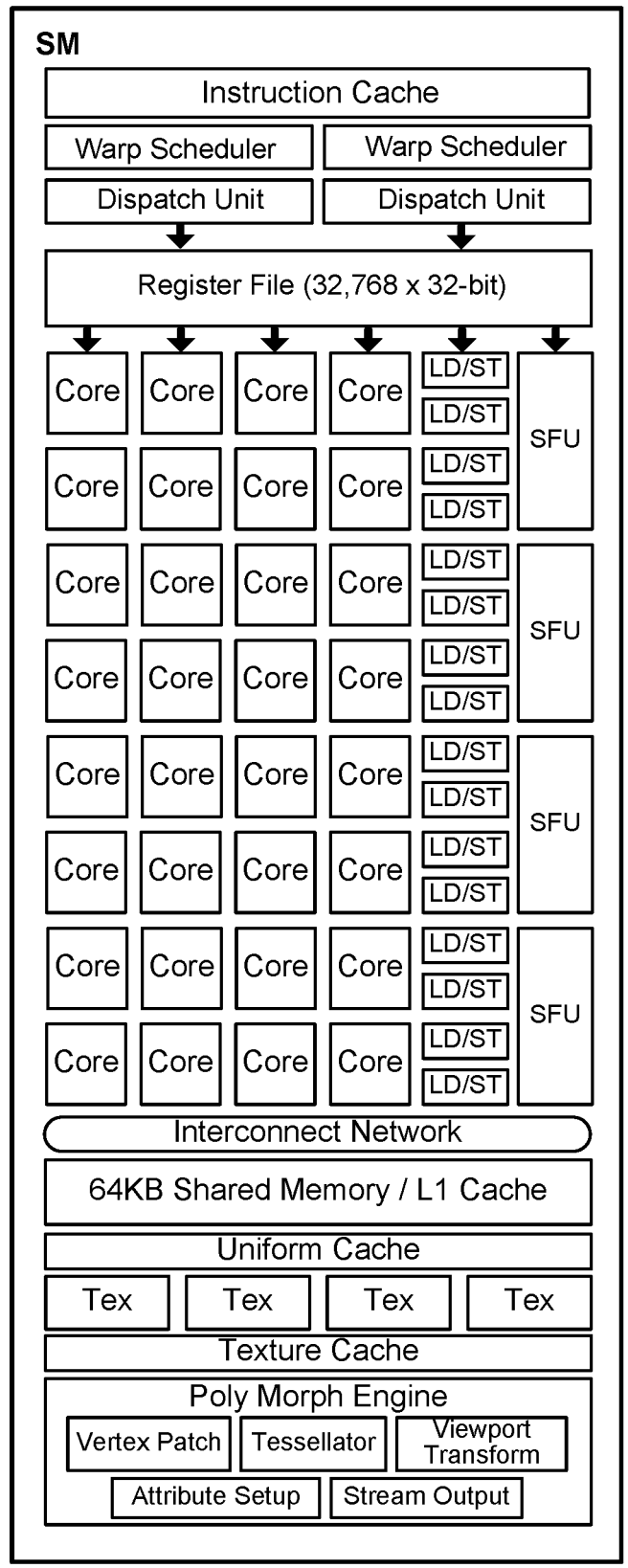
FIG. 2B is a block diagram of a known GPU.
Figure 2C:
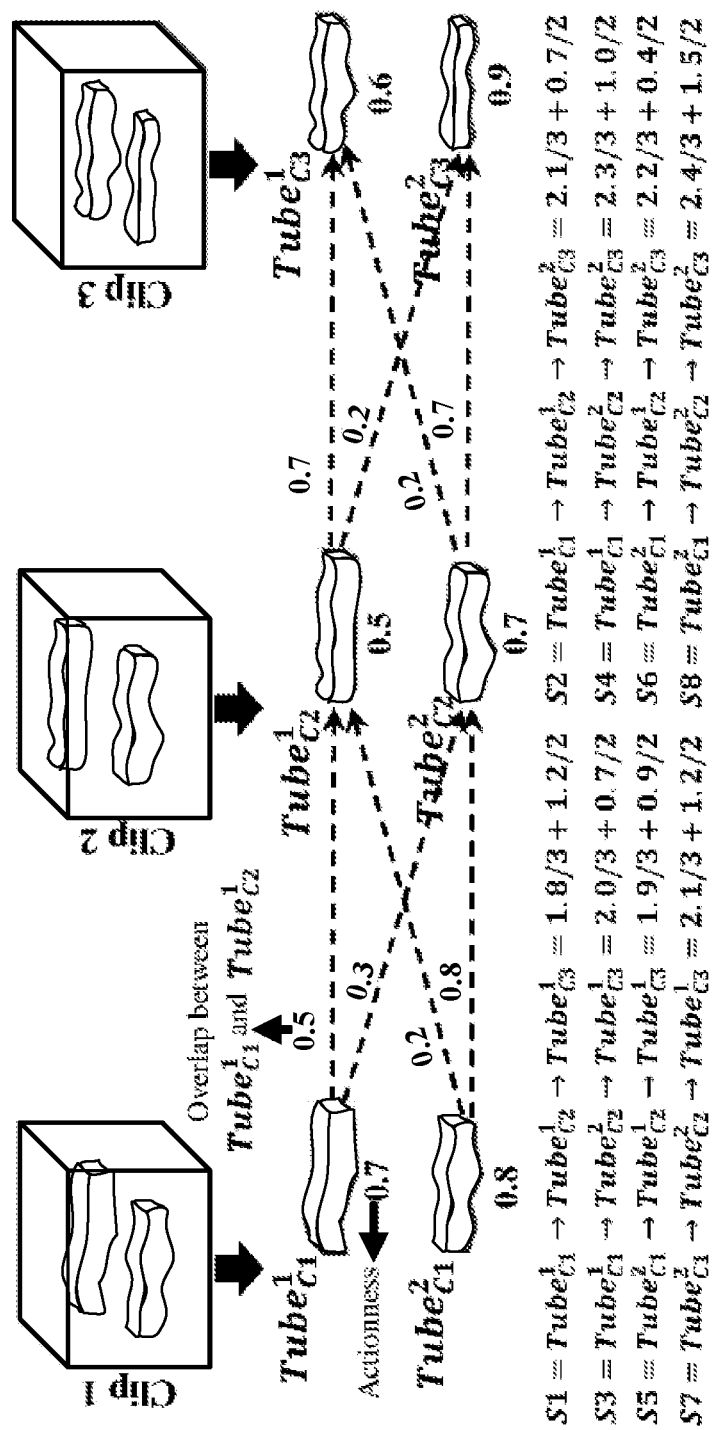
FIG. 2C is an example from the T-CNN paper of linking tube proposals in a plurality of video clips using network flow.

FIG. 2C is an example from the T-CNN paper of linking tube proposals in a plurality of video clips using network flow. In the figure, two tube proposals are identified in three separate video clips. The tube proposals are identified by superscript and subscript identifiers. A first tube proposal bears the superscript, "1," ($Tube^1$), the second tube proposal bears the superscript, "2," ($Tube^2$). Subscript information (C1, C2, C3) is used to identify the clip from which the respective tube proposal is drawn (e.g., $Tube^1_{C1}$, $Tube^2_{C3}$, etc.).

The benefits and success of the tube-based processing proposed in the T-CNN paper are not discussed in the present disclosure. Instead, the present disclosure illustrates and describes an improved mechanism to identify and isolate a three-dimensional (3D) volume within a 3D feature map for processing in a deep learning algorithm. Hence, the present disclosure is an advancement over the T-CNN paper and similar works via systems, devices, and methods that integrate hardware-based data volume sculptor structures with other deep convolutional neural network structures. In addition to other things, the present disclosure therefore teaches new, faster, more efficient, and lower-power devices and methods for producing "tube proposals" that are processed in a convolutional neural network.

Fundamentally, it has been recognized by the inventors that learning machines can be improved if additional dedicated hardware structures are integrated with, or otherwise made available, to the architectures that implement the learning machine. One such improvement that can be made includes structures and acts that implement one or more data volume sculptor 900 units (FIG. 9) as described herein. The inventive data volume sculptor 900 units are a particular type of hardware-based data parser described in the present disclosure, which may be implemented on a wide variety of learning machines. For brevity, however, the present disclosure includes implementations of the inventive data volume sculptor 900 units in a particular deep convolutional neural network disclosed in U.S. patent application Ser. No. 15/423,272 to DESOLI et al., and entitled DEEP CONVOLUTIONAL NETWORK HETEROGENEOUS ARCHITECTURE, which application is incorporated by reference into the present application. This particular deep convolutional network heterogeneous architecture learning machine discloses a system on chip (SoC) having a system bus, a plurality of addressable memory arrays coupled to the system bus, at least one applications processor core coupled to the system bus, and a configurable accelerator framework coupled to the system bus. The configurable accelerator framework is an image and deep convolutional neural network (DCNN) co-processing system. The SoC also includes a plurality of digital signal processors (DSPs) coupled to the system bus, wherein the plurality of DSPs coordinate functionality with the configurable accelerator framework to execute the DCNN.

Figure 7:
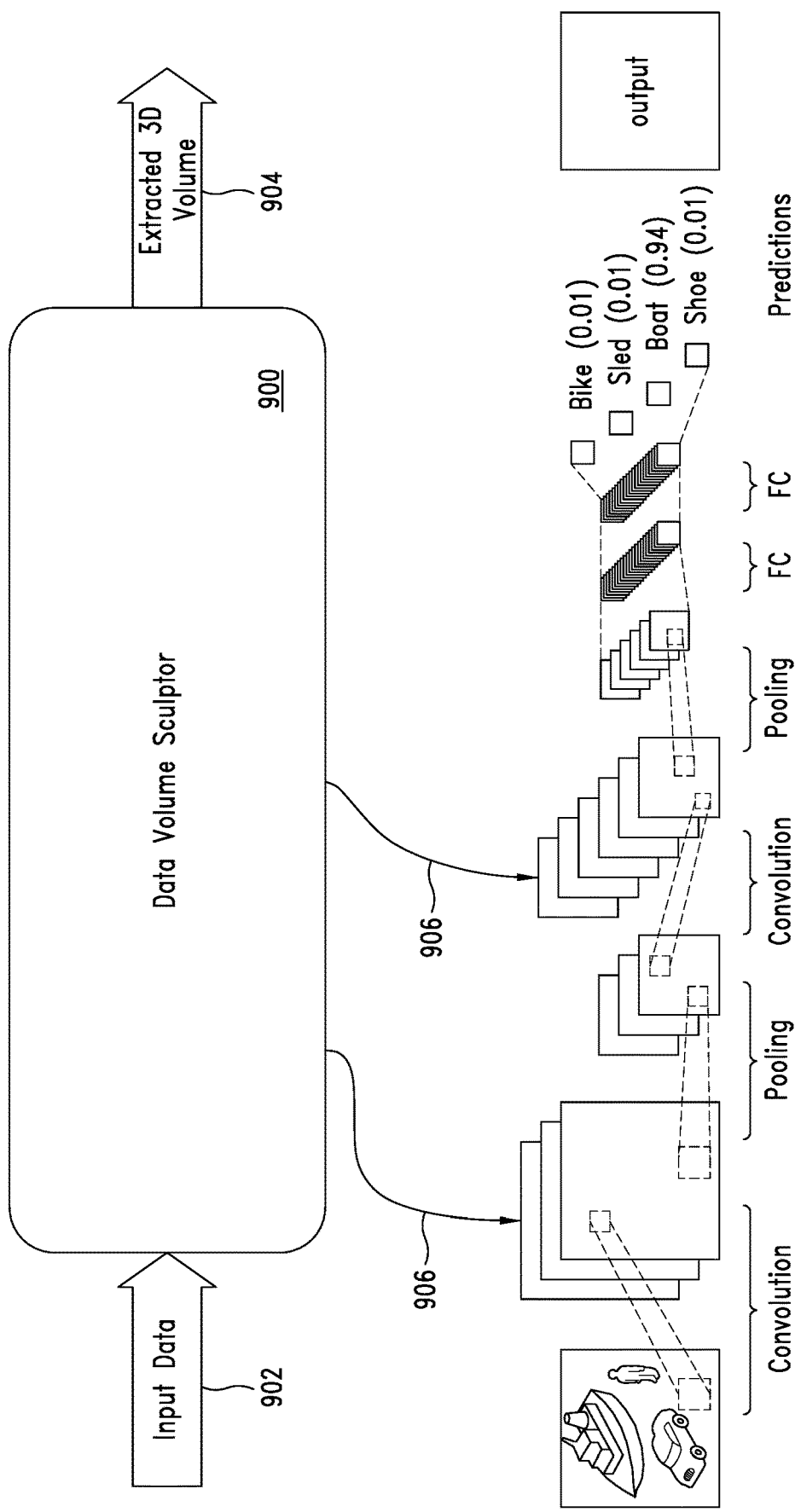
FIG. 7 is a high level block diagram illustrating a data path supported by the data volume sculptor 900 units within a convolution neural network algorithm.
Figure 8A:
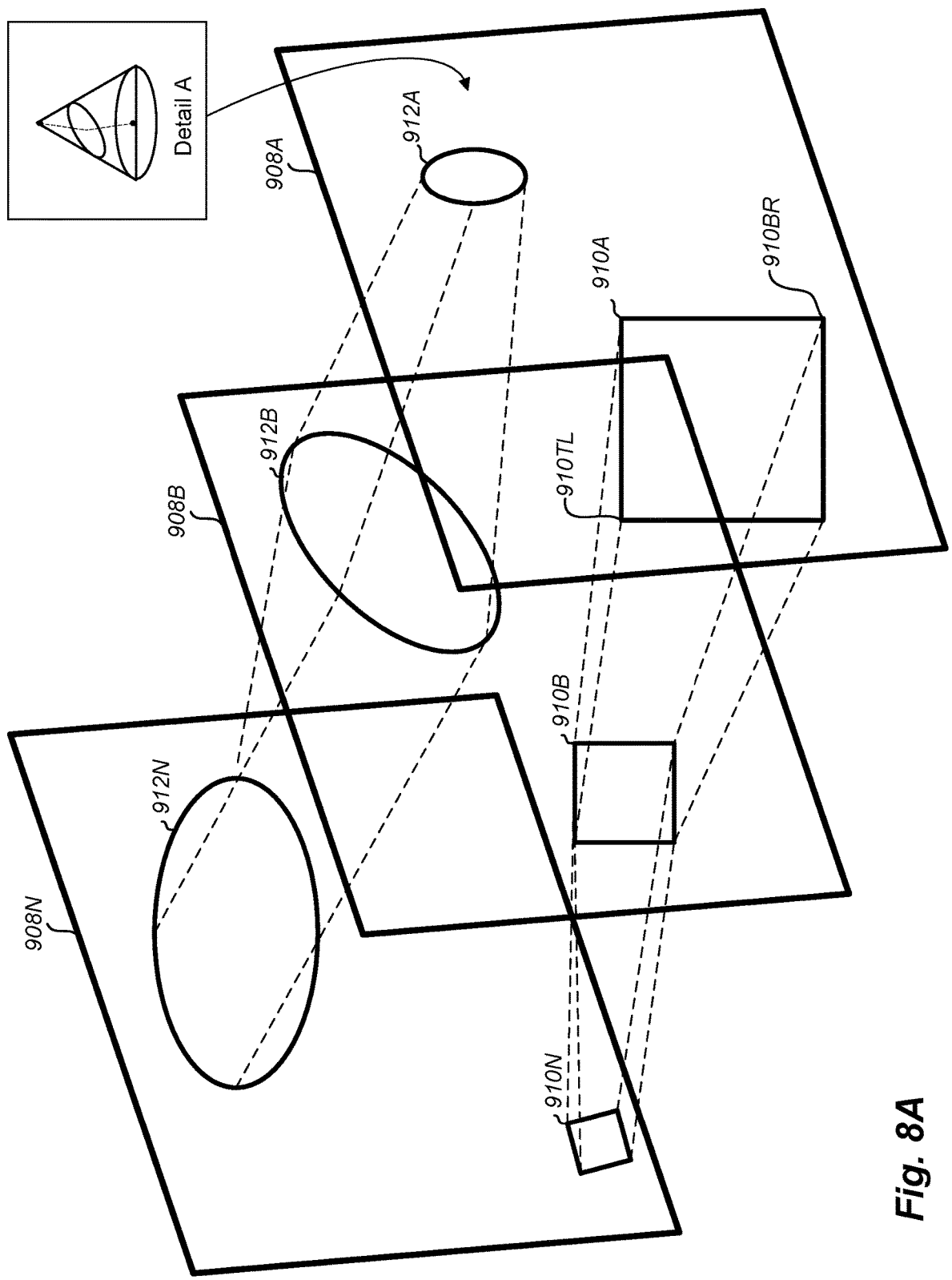
FIGS. 8A-8C illustrate and present various sculpted three-dimensional (3D) volumes within a region-of-interest, which are used in a machine learning algorithm such as one that predicts or classifies a selected action or scene in a video stream.
Figure 8B:
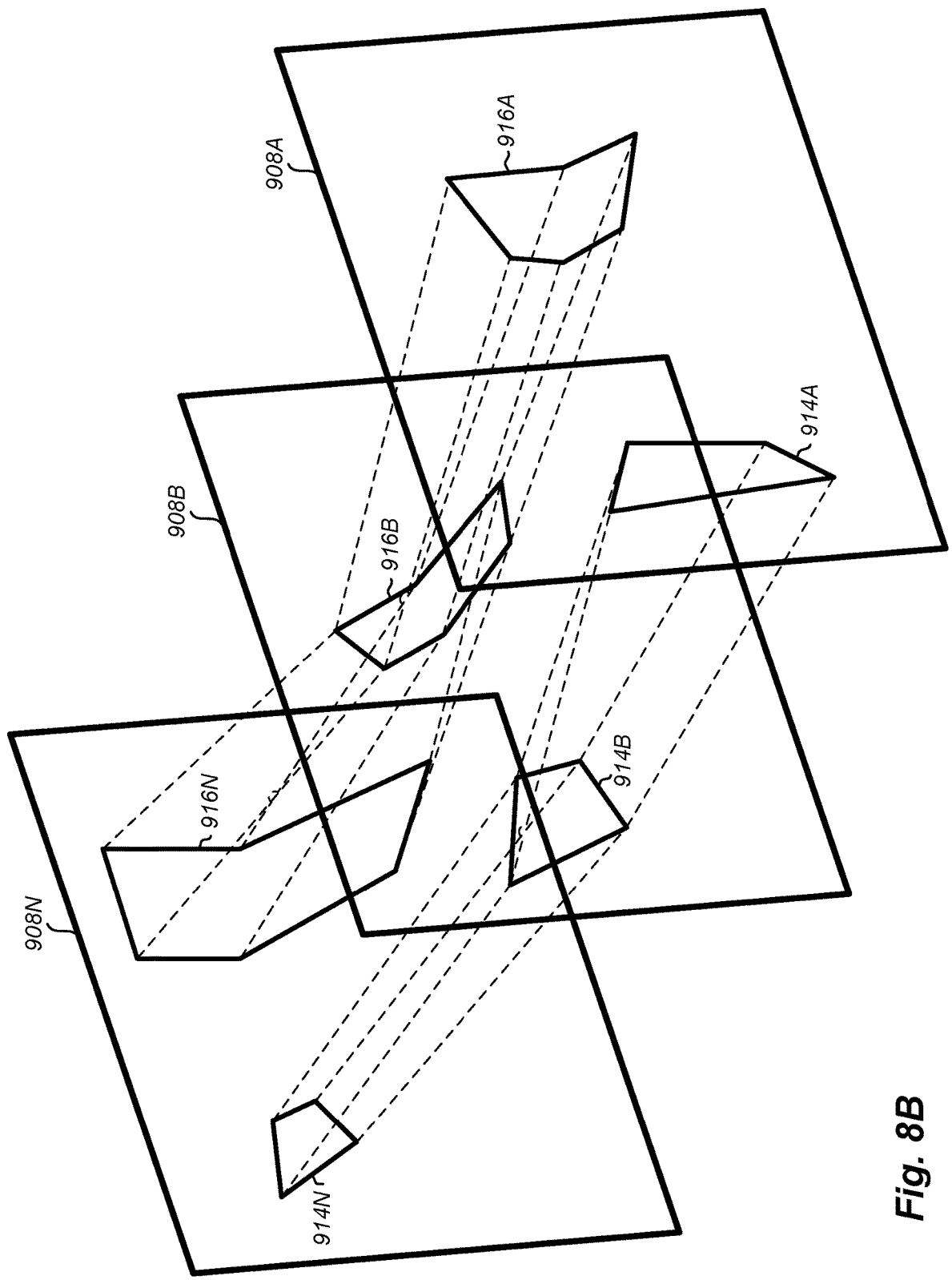
Figure 8C:
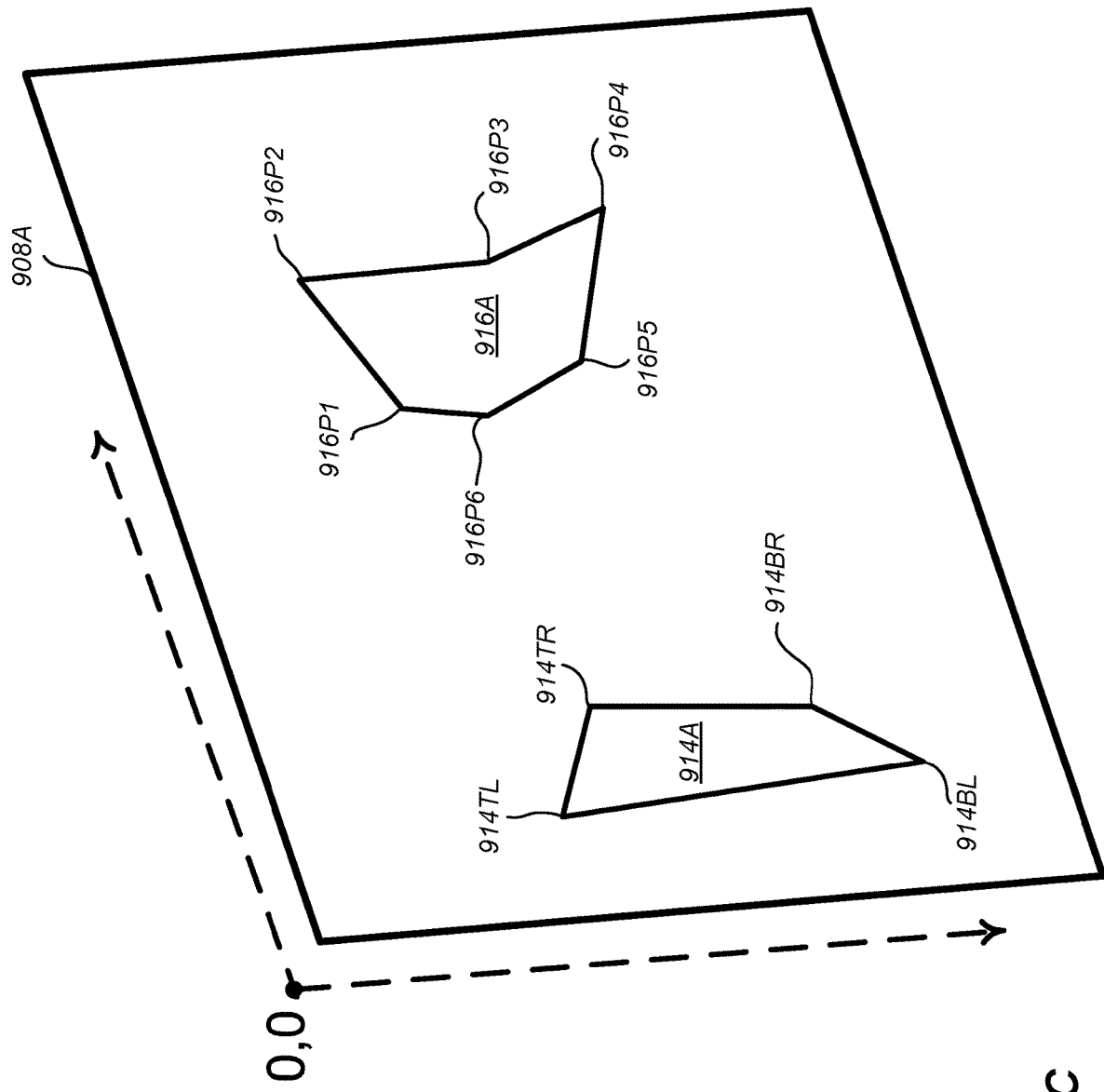
Figure 9:
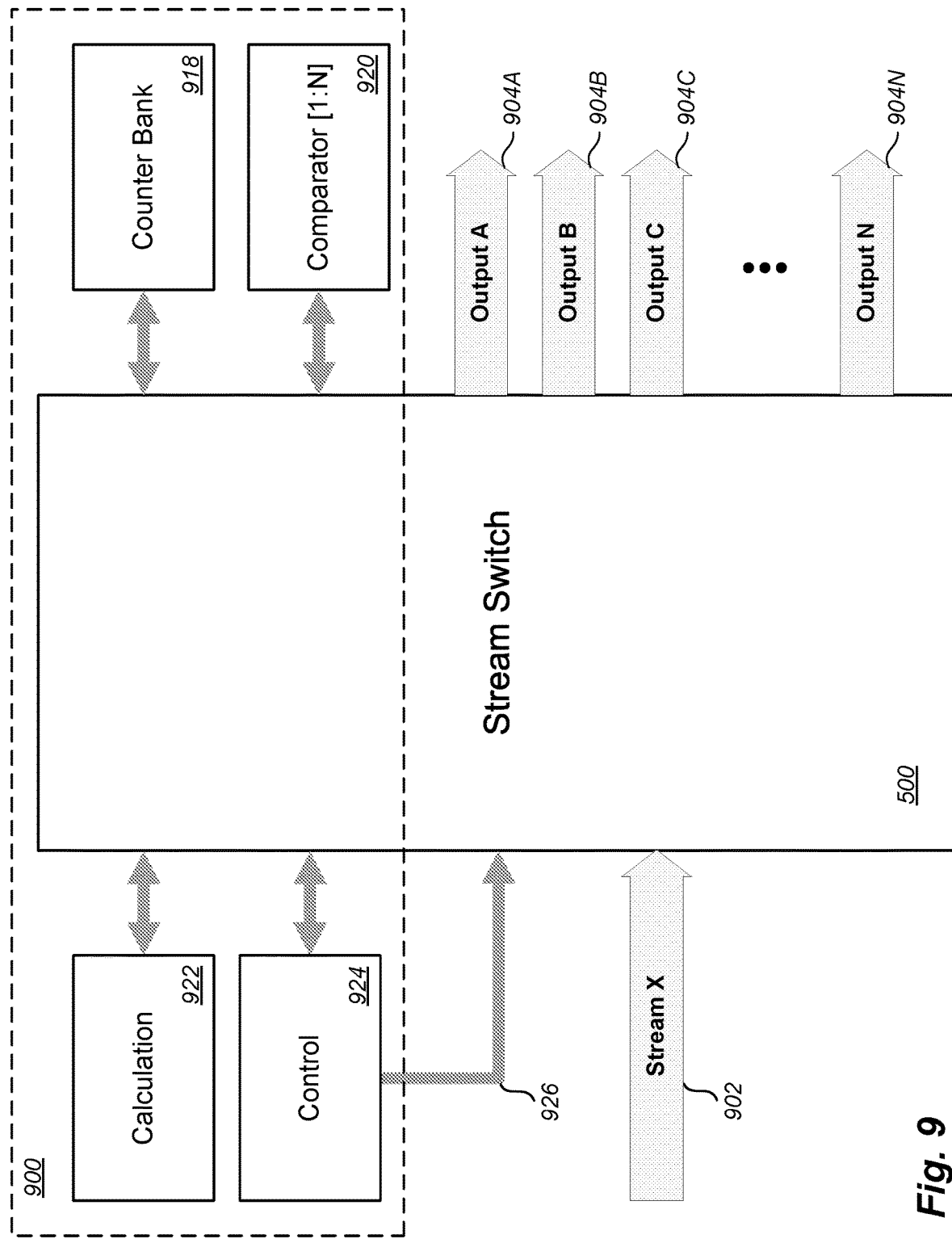
FIG. 9 is an embodiment of a data volume sculptor unit integrated with the hardware accelerated DCNN processor of FIGS. 3-6.

FIGS. 3-6 and the accompanying detailed description thereof illustrate and present elements of an exemplary system on chip (SoC) 110 configurable as a high-performance, energy efficient hardware accelerated DCNN processor. FIG. 7 is a high level block diagram illustrating a data path supported by the data volume sculptor 900 units within a convolution neural network algorithm. FIGS. 8A-8C and the accompanying detailed description thereof illustrate and present various sculpted three-dimensional (3D) volumes within a region-of-interest, which are used in a machine learning algorithm such as one that predicts or classifies a selected action or scene in a video stream. FIG. 9 is an embodiment of a data volume sculptor 900 unit integrated with the hardware accelerated DCNN processor of FIGS. 3-6, and FIG. 10 is a data flow diagram illustrating at least one data volume sculpting method 1000 arranged to generate an ordered data structure defining a 3D volume within a 3D feature map.

Figure 3:
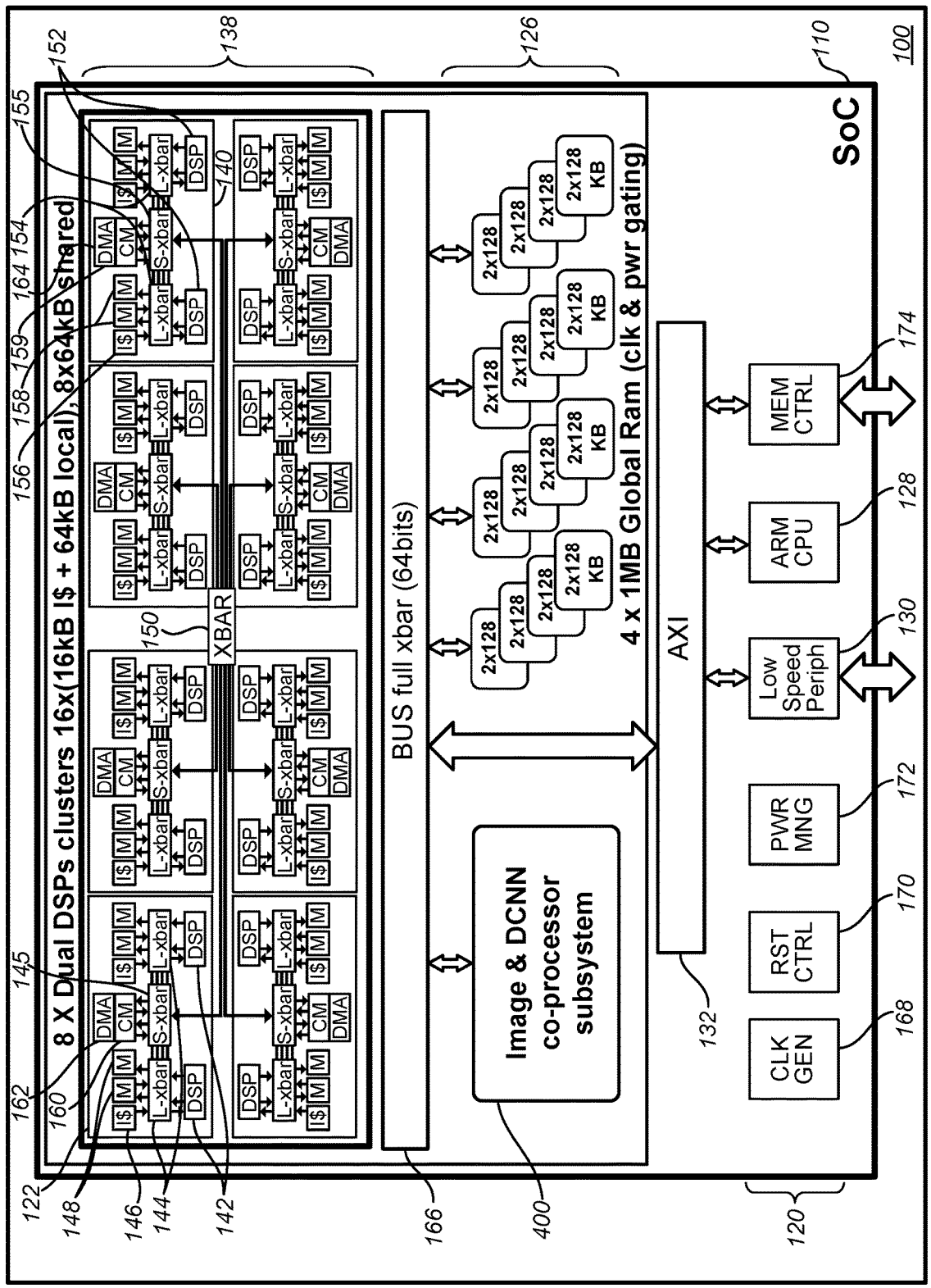
FIG. 3 is an exemplary mobile device having integrated therein a DCNN processor embodiment illustrated as a block diagram.

The exemplary SoC 110 of FIG. 3, which is particularly useful for machine learning applications, implements an image and DCNN co-processor subsystem 400 (FIG. 4), which may interchangeably be referred to as a configurable accelerator framework; an architecturally efficient stream switch 500 (FIG. 5), which creates data locality at previously unprecedented levels; a set of convolution accelerators 600 (FIG. 6), which perform a convolution of input feature data with kernel data derived from the training of the neural network; and a set of data volume sculptor 900 units particularly arranged for a deep learning engine (FIG. 9).

FIG. 3 is an exemplary mobile device 100 having integrated therein a DCNN processor embodiment illustrated as a block diagram. The mobile DCNN processor is arranged as a system on chip (SoC) 110, however other arrangements are also contemplated (e.g., multiple chips, several chip die in a single integrated circuit, and the like). The illustrated SoC 110 includes a plurality of SoC controllers 120, a configurable accelerator framework (CAF) 400 (e.g., an image and DCNN co-processor subsystem), an SoC global memory 126, an applications (e.g., a host) processor 128, and a plurality of DSPs 138, each of which are communicatively coupled, directly or indirectly, to a primary (e.g., system) communication bus 132 and a secondary communications (e.g., DSP) bus 166.

The configurable accelerator framework (CAF) 400 is communicatively coupled to the system bus 166, which provides a mechanism for convolution accelerators of the CAF 400 to access the SoC global memory 126 as needed and to communicate with the DSPs 138 as needed. The CAF 400 is illustrated in more detail in FIG. 4.

The SoC 110 includes various SoC controllers 120, some of which control the SoC 110, and others of which control one or more peripheral devices. SoC controllers 120 include an applications (e.g., a host) processor 128 (e.g., an ARM processor or some other host processor), a clock generator 168 (e.g., a clock manager), a reset controller 170, and a power manager 172 to provide additional support, control, and management of various timing, power consumption, and other aspects of the SoC 110 and other components. Other SoC controllers 120 that control peripherals include a low speed peripheral I/O interface 130 and an external memory controller 174 to communicate with or otherwise access external chips, components, or memory of the exemplary device 100 in which the SoC 110 is embedded.

The applications processor 128 may act as an intermediate module or as an interface to other programs or components of the exemplary electronic device 100 with which the SoC 110 is integrated. In some embodiments, the applications processor 128 may be referred to as an applications processor core. In various embodiments, the applications processor 128 loads an SoC configuration file at boot time and configures DSPs 138 and the CAF 400 according to the configuration file. As the SoC 110 processes one or more batches of input data (e.g., an image), the applications processor 128 may coordinate the reconfiguration of the CAF 400 or DSPs 138 based on the configuration file, which itself may be based on the DCNN layers and topology.

The SoC 110 also includes a primary communications bus 132 (e.g., an AXI—Advanced eXtensible Interface) that facilitates communications between the SoC controllers 120 and the DSPs 138 and between the SoC controllers 120 and the CAF 400. For example, the DSPs 138 or the CAF 400 can communicate, via the primary communications bus 132 with the applications processor 128, one or more peripheral controllers/peripheral communications interface (low speed peripheral I/O) 130, an external memory (not shown) via an external memory controller 174, or other components. The SoC controllers 120 may also include other supporting and cooperative devices such as a clock manager (e.g., a clock generator) 168, a reset controller 170, a power manager 172 to provide additional timing and power management to the SoC 110, and other components.

In some embodiments, and as illustrated in FIG. 3, the plurality of DSPs 138 are arranged in a plurality of DSP clusters, such as a first DSP cluster 122, a second DSP cluster 140, and several other DSP clusters that are not referenced for simplification of the illustration.

Each DSP cluster 122, 140 includes a plurality (e.g., two) of DSPs 142, 152, a plurality (e.g., two) of local DSP crossbar switches 144, 154, and a DSP cluster crossbar switch 145, 155. Each DSP 142, 152 in a particular cluster is capable of communicating with other DSP's 142, 152 via the DSP cluster crossbar switch 145, 155. Each DSP 142, 152 has access to a corresponding instruction cache 146, 156, and local DSP memory 148, 158 via its corresponding local DSP crossbar switch 144, 154. In one non-limiting embodiment, each instruction cache 146, 156 is a 4-way 16 kB instruction cache and each local DSP memory 148, 158 is 64 kB of local RAM storage for its corresponding DSP. Each DSP cluster 122, 140 also includes a shared DSP cluster memory 160, 159 and a cluster DMA 162, 164 for accessing the SoC global memory 160, 159.

Each DSP cluster 122, 140 is communicatively coupled to a global DSP cluster crossbar switch 150 via the DSP cluster crossbar switch 145, 155 to enable each DSP 142, 152 in each DSP cluster 122, 140 to communicate with one another and other components on the SoC 110. The global DSP cluster crossbar switch 150 enables each DSP to communicate with other DSPs in the plurality of DSP clusters 138.

Additionally, the global DSP cluster crossbar switch 150 is communicatively coupled to a system bus 166 (e.g., secondary communications bus, xbar-SoC crossbar switch, or the like), which enables each DSP to communicate with other components of the SoC 110. For example, each DSP 142, 152 can communicate with one or more components (e.g., one or more convolution accelerators) of the CAF 400 or access an SoC global memory 126 via the system bus 166. In some embodiments, each DSP 142, 152 can communicate with the SoC memory 126 via the DMA 162, 164 of its corresponding DSP cluster 122, 140. Moreover, DSP 142, 152 may communicate with the controllers 120 or other modules of the SoC 110 as needed via the system bus 166. Each DSP accesses the system bus 166 via its local DSP crossbar switch 144, 154, its DSP cluster crossbar switch 145, 155, and the global DSP cluster crossbar switch 150.

The plurality of DSPs 138 can be assigned or allocated to perform specific instructions to accelerate other operations of the DCNN. These other operations may include non-convolutional operations performed during a DCNN process, which are in some cases primarily performed by the CAF 400. Examples of these non-convolutional operations include, but are not limited to, max or average pooling, nonlinear activation, cross-channel response normalization, classification representing a small fraction of the total DCNN computation but more amenable to future algorithmic evolutions, or other operations, e.g., Min, Max, Sqrt, Mac, Butterfly, Average, 2-4 SIMD ALU. In some cases, operations that previously have been performed using one or more of the DSPs 138 are now performed using the arithmetic unit for deep learning acceleration structures described herein with reference to FIG. 7. Accordingly, improved operations of the processors and their associated computing devices described herein may be realized by the arithmetic unit structures described herein.

DSPs 138 can operate concurrently (e.g., in parallel) with the operations of CA' sin the CAF 400 and concurrently (e.g., in parallel) with data transfers, which may be synchronized by way of interrupts, mailboxes, or some other synchronization mechanism for concurrent execution.

In various embodiments, the SoC memory 126 includes a plurality of memory components for storing data that is accessible to the components of the CAF 400 or the DSPs 138. In at least one embodiment, the SoC memory 126 is configured in a hierarchical-type memory structure. In one non-limiting example, the SoC memory 126 includes four SRAM banks each with 1 Mbyte of storage space.

In at least one embodiment, the configurable accelerator framework (CAF) 400 may be organized as an image and DCNN co-processor subsystem of the SoC 110. As described herein, the CAF 400 includes a reconfigurable dataflow accelerator fabric connecting high-speed camera interfaces with any one or more of arithmetic units for deep learning acceleration (FIG. 6), sensor processing pipelines, croppers, color converters, feature detectors, video encoders, eight channel digital microphone interface, streaming DMAs, and a plurality of convolution accelerators.

Figure 4:
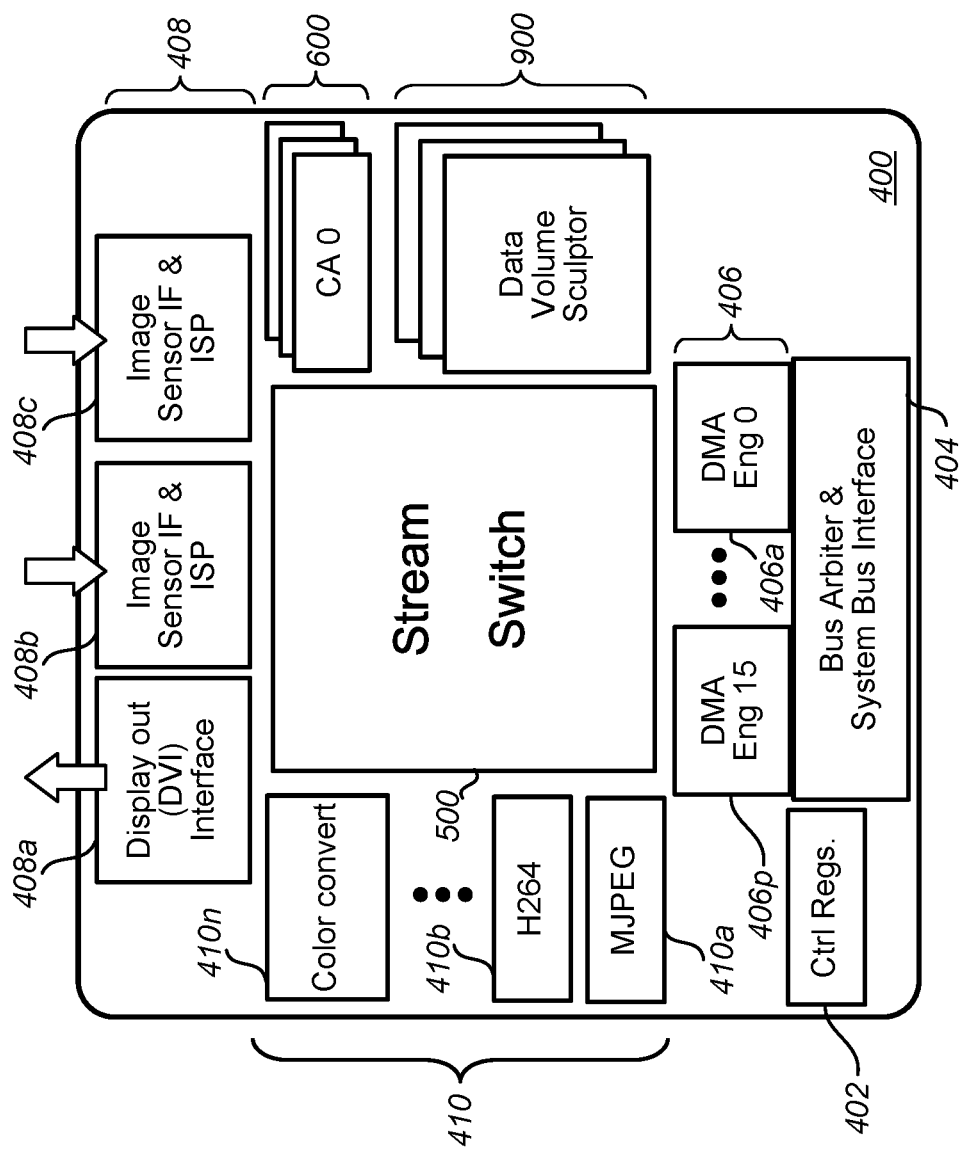
FIG. 4 is an embodiment depicting a configurable accelerator framework (CAF), such as the image and deep convolutional neural network (DCNN) co-processor subsystem of FIG. 3.

Additional details regarding the CAF 400 are described in conjunction with FIG. 4. Briefly, the CAF 400 receives incoming data (e.g., image data in FIG. 4, but other types of streaming data in different embodiments), such as from the camera interface, or other sensors, and distributes the incoming data to the various components of the CAF 400 (e.g., convolution accelerators described in more detail in conjunction with FIG. 6, data volume sculptor 900 units described in more detail in conjunction with FIGS. 7-10, and the like) and/or one or more of the plurality of DSPs 138 to employ the DCNN and recognize objects in the incoming images.

The CAF 400 utilizes unidirectional links to transport data streams via a configurable, fully connected switch to or from different kinds of source or sink components. For example, the configurable fully connected switch, which is described in more detail in conjunction with FIG. 5, can transport data via direct memory accesses (DMAs) to the SoC global memory 126, I/O interfaces (e.g., cameras), and various types of accelerators (e.g., convolution accelerator (CA) 600, data volume sculptor 900 units, etc.). In some cases, the CAF 400 is configured at boot time based on information received from a particular SoC configuration tool, and the CAF 400 is re-configured during run time based on defined DCNN layers and topology or information received from one or more DSPs 138, applications processor 128, or the like.

The CAF 400 allows for the definition of a selectable number of concurrent, virtual processing chains at run time. The CAF 400 also includes a full featured back pressure mechanism to control data flow to the various components of the framework. The CAF 400 is arranged for stream multicasting operations, which enable the reuse of a data stream at multiple block instances. Linked lists control the fully autonomous processing of an entire convolution layer. Multiple accelerators, grouped or chained together, handle varying sizes for feature map data and multiple kernels in parallel. Grouping the convolutional accelerators (CA's) 600 to achieve larger computational entities enables choosing an acceptably optimal balancing of the available data bandwidth, budget power, and available processing resources. Each CA 600 includes a line buffer to fetch up to a predetermined number (e.g., 12) of feature map data words in parallel with a single memory access. Further supporting the CA 600 structures are the data volume sculptor 900 units, which isolate and deliver three-dimensional (3D) volumes representing a 3D region-of-interest in a feature map. Rather than determining one or more proposed 3D volumes from outside of the CAF 400 as would be done by other devices, data is retained within the CAF 400 architecture thereby achieving significant speed and data throughput gains.

In each CA (600), a register-based kernel buffer provides multiple read ports (e.g., 36 read ports), while multiple fixed-point multiply-accumulate (MAC) units (e.g., 36 16-bit MAC units) perform multiple MAC operations per clock cycle (e.g., up to 36 operations per clock cycle). An adder tree accumulates MAC results for each kernel column. The overlapping, column based calculation of the MAC operations allows an acceptably optimal reuse of the feature maps data for multiple MACs, thereby reducing power consumption associated with redundant memory accesses.

Kernel sets are partitioned in batches processed sequentially and intermediate results can be stored in the SoC global memory 126. Various kernel sizes (e.g., up to 12×12), various batch sizes (e.g., up to 16), and parallel kernels (e.g., up to 4) can be handled by a single CA 600 instance but any size kernel can be accommodated with the accumulator input.

The configurable batch size and a variable number of parallel kernels enable acceptably optimal trade-offs for the available input and output bandwidth sharing across different units and the available computing logic resources.

A different acceptably optimal configuration of CA's 600 in the CAF 400 is determined for each DCNN layer. These configurations may be determined or adjusted using a holistic tool that starts with a DCNN description format, such as Caffe' or TensorFlow. The CA 600 supports on-the-fly kernel decompression and rounding when the kernel is quantized nonlinearly with 8 or fewer bits per weight with top-1 error rate increases up to 0.3% for 8 bits.

FIG. 4 is an embodiment depicting a configurable accelerator framework (CAF) 400, such as the image and deep convolutional neural network (DCNN) co-processor subsystem 400 of FIG. 3. The CAF 400 may be configured for image processing, audio processing, prediction analysis (e.g., games of skill, marketing data, crowd behavior prediction, weather analysis and prediction, genetic mapping, disease diagnosis, and other scientific, commercial, consumer, and such processing) or some other type of processing; particularly processing that includes convolutional operations.

The CAF 400 is also arranged with a number of configurable modules. Some modules are optional, and some modules are required. Many optional modules are commonly included in embodiments of a CAF 400. One required module of a CAF 400 is, for example, the stream switch 500. The stream switch 500 provides a design time parametric, run-time reconfigurable accelerator interconnect framework to support dataflow based processing chains. Another required module is, for example, a set of CAF control registers 402. Other modules may be required as well. Optional modules of the CAF 400 include a system bus interface module 404, a selected number of DMA engines 406 (e.g., DMA controllers), a selected number of external device interfaces 408, a selected number of processing modules 410, a selected number of convolution accelerators (CA's) 600, and a selected number of data volume sculptor 900 units (e.g., 1, 2, 4, 8, or another number).

The stream switch 500 is a reconfigurable unidirectional interconnection structure formed with a plurality of unidirectional "stream links." The stream links are arranged to transport multibit data streams from accelerators, interfaces, and other logic modules to the stream switch 500 and from the stream switch 500 to accelerators, interfaces, and other logic modules.

In addition to the stream switch 500, the CAF 400 may also include a system bus interface module 404. The system bus interface module 404 provides an interface to other modules of SoC 110. As shown in the exemplary embodiment of FIG. 3, the CAF 400 is coupled to the secondary communication bus 166. In other cases, the CAF 400 may be coupled to the primary communication bus 132 or some other communication mechanism. Control information may be passed unidirectionally or bidirectionally through the system bus interface module 404 of the CAF 400. Such interface is used to provide a host processor (e.g., DSP of DSP cluster 130, applications processor 128, or another processor) access to all of the CAF control registers 402, which are used to control, operate, or otherwise direct particular features of the framework. In some embodiments, each DMA engine 406, external device interface 408, processing module 410, convolution accelerator 600, and data volume sculptor 900 has an interface to the configuration network with a defined set of configuration registers (e.g., formed in CAF control registers 402).

The CAF 400 includes a plurality of DMA engines 406. In FIG. 4, sixteen DMA engines 406a to 406p are illustrated, but some other number of DMA engines may be included in other embodiments of SoC 110 according to one or more choices made by a semiconductor practitioner at design time. The DMA engines 406 are arranged to provide bidirectional channels for input data flow, output data flow, or input and output data flow. In these cases, substantial quantities of data are passed into the CAF 400, out from the CAF 400, or into and out from the CAF 400. For example, in some cases, one or more DMA engines 406 are used to pass streaming video data from memory or from a data source device (e.g., a high-definition (HD) video camera) that produces substantial quantities of video data. Some or all of the video may be passed in from the source device, in from or out to SoC global memory 126, and the like.

Figure 5:
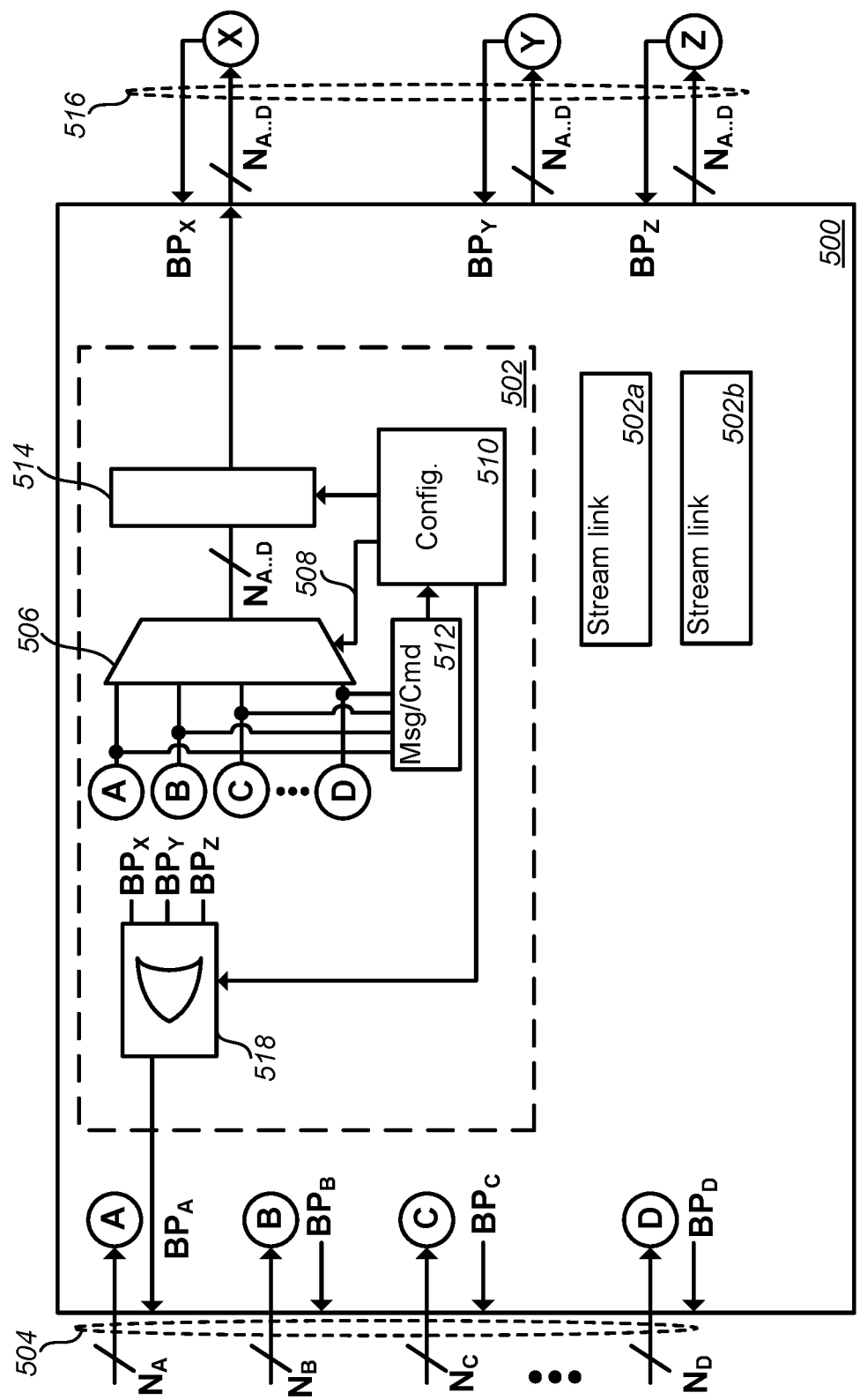
FIG. 5 is a stream switch embodiment in more detail.

In one exemplary embodiment, one or more DMA engines 406 are connected to the stream switch 500 with one input port 504 (FIG. 5) and one output stream port 516 (FIG. 5). The DMA engines 406 can be configured in either input or output mode. The DMA engines 406 can be configured to pack and send data to any address location accessible on the primary communication bus 132, the secondary communication bus 166, or some other address location. The DMA engines 406 can also additionally or alternatively be configured to unpack fetched data and translate the unpacked data into a data stream.

The CAF 400 of FIG. 4 includes a design-time selectable, run-time configurable plurality of external device interfaces 408. The external device interfaces 408 provide a connection to external devices which produce (i.e., source devices) or consume (i.e., sink devices) data. In some cases, the data that passes through an external device interface 408 includes streaming data. The amount of streaming data that is passed through an external device interface 408 may be predetermined in some cases. Alternatively, the amount of streaming data passed through an external device interface 408 may be indeterminate, and in such cases, the external device may simply produce or consume data whenever the particular external device is enabled and so directed. External devices coupled through the external device interfaces 408 may include image sensors, digital microphones, display monitors, or other source and sink devices. In FIG. 4, external device interface 408 includes a digital visual interface (DVI) external device interface 408a, a first image sensor interface and image signal processor (ISP) external device interface 408b, and a second image sensor interface and ISP external device interface 408c. Other interfaces are also contemplated, though for simplicity in illustration, only three external device interfaces 408 are shown.

A plurality of processing modules 410 are integrated in the CAF 400. Three processing modules 410 are illustrated for simplicity, but another selected number (e.g., two, four, eight, sixteen) of processing modules 410 may also be integrated in a CAF 400 at design time by a semiconductor practitioner. A first processing module 410 is an MPEG/JPEG processing module 410a arranged to perform certain video (i.e., MPEG) processing and certain image (i.e., JPEG) processing. A second processing module 410 is an H264 processing module 410b, which is arranged to perform particular video encoding/decoding operations. A third processing module 410 is a color converter processing module 410n, which is arranged to perform color-based operations on certain multimedia data.

In many cases, the DMA controllers 406, the external device interfaces 408, the processing modules 410, the convolution accelerators 600, the data volume sculptor 900 units, and other modules integrated in a CAF 400 are IP modules selected from a library by a semiconductor practitioner at design time. The semiconductor practitioner may specify the number of modules, features of particular modules, bus widths, power parameters, layout, memory availability, bus access, and many other parameters.

Table 2 is a non-exhaustive exemplary list of IP modules in a library; any of which may be incorporated into CAF 400 by a semiconductor practitioner. In many cases, as new modules are designed, and as existing modules are modified, the new IPs will be added to a library such as the library of Table 2.

TABLE 2

CAF Library of IP modules

| Functional Unit | Application |
| --- | --- |
| RGB/YUV Sensor Interface | Interface |
| Bayer Sensor Interface | Interface |
| Video Out Interface (DVI) | Interface |
| Enhanced I/O (Sensor Interface, Video Out, Overlay) | Interface |
| ISP (Image Signal Processor) | Signal Processing |
| Mini ISP (Image Signal Processor) | Signal Processing (Bayer -> RGB) |
| GP Color Converter Unit | General Purpose |
| Image Cropper and Resizer Unit | General Purpose |
| Morph Filter Unit | General Purpose |
| Background Remove Unit (+shadow remove) | Background/Foreground segmentation |
| Reference Frame Update Unit | Background/Foreground segmentation |
| JPEG Encoder | Encoder |
| JPEG Decoder | Decoder |
| H264 Encoder | Encoder |
| H264 Encoder | Encoder (Baseline, Intra Only) |
| Rectification and Lens Distortion Correction | Stereo Vision |
| Census Transformation Unit (BRIEF) | Stereo Vision |
| Stereo Vision Depth Map Generator | Stereo Vision |
| Feature Point Detector (FAST) | Feature Detection |
| Feature Detection (Viola Jones) | Face Detection (e.g., Integral Image, ISA Extension) |
| Feature Detection (Optical Flow) | Facial Tracking |
| Feature Point Extractor (DoG + SIFT) | Feature Detection – Difference of Gaussian plus Scale Invariant Feature Transform |
| Feature Extraction | Edge Extraction (Sobel, Canny) |
| Clock and Interrupt Manager | System Control |
| Debug Support Unit | Debug |
| GP IO Unit | General Purpose |
| 3D convolution accelerator for neural networks | Processing |
| data volume sculptor | Isolate selected 3D feature volume |

In the configurable accelerator framework (CAF) 400 of FIG. 4, eight convolution accelerators 600 are represented, CA0 to CA7. In other CAF 400 embodiments, a different number of convolution accelerators are formed. The number of convolution accelerators 600 and the particular features available in each convolution accelerator 600 are, in some cases, based on parameter values selected by a semiconductor practitioner at design time.

The convolution accelerators (CA's) 600 are data processing units with a selected number (e.g., one, two, four, eight) of input and output stream link ports. One or more configuration registers (e.g., a set of configuration registers) are arranged to control operations of the CA 600. In some cases, configuration registers are included in the CAF control registers 402, and in these or other cases, certain configuration registers are formed as part of the CA 600.

One or more convolution accelerator template modules may be included in an IP modules library such as the library described with respect to Table 2. In these cases, data stored in the IP modules library includes relevant building blocks that reduce the work required to build a new accelerator that implements an accelerator's core functionality. A predefined set of configuration registers can be extended. Configurable FIFOs formed or otherwise located at the stream link ports can be used to absorb data rate fluctuations and provide some buffering margin required to relax certain flow control constraints in a processing chain.

Typically, each CA 600 either consumes data, generates data, or both consumes data and generates data. Data that is consumed passes through a first stream link of the reconfigurable stream switch 500, and data that is streamed passes through a second stream link of the stream switch 500. In at least some embodiments, CA's have no direct access to memory address space accessible by the primary communications bus 132 (FIG. 3), the secondary communications bus 166 (FIG. 3), or other bus addresses. However, if random memory access to data passed on a system bus is required, a CA 600 may also use an optional bus port interface, which may be along the lines of the system bus interface module 404 of FIG. 4, which is used for several things including permitting DMA engines to access memory locations on the system bus. As discussed above, some CA 600 implementations are part of a library, which can be used in other CAF 400 embodiments to simply instantiate the CA 600 in a global system definition file.

One or more data volume sculptor template modules may also be included in the IP modules library such as the library described with respect to Table 2. Here, the predefined set of configuration registers can be further extended to provide parameter storage for configuration of the included data volume sculptor units. The parameters are associated with configuration of any desirable number of counters, comparators, control units, calculation units, data repositories, multiplexor circuits, temporary storage circuits, and other circuits.

Each data volume sculptor 900 receives information at an input stream interface that includes a series of frames; each frame formed as a two dimensional (2D) data structure. The data volume sculptor 900 will determine a first dimension and a second dimension of each one of the frames, and based on the first and second dimensions, the data volume sculptor 900 will further determine for each frame a position and a size of a region-of-interest to be extracted from the respective frame. The data passed into the data volume sculptor 900 units may be sourced from a reconfigurable stream switch 500, a memory inside or outside of the CAF 400 framework, a sensor or particular interface, or from some other source. Along these lines, each of these types of data sources may, in some cases, consume the data generated by the data volume sculptor 900. As discussed herein, some data volume sculptor 900 implementations are part of a library, which can be used in other CAF 400 embodiments to simply instantiate the data volume sculptor in a global system definition file.

System level programmers of machine learning systems desire flexibility to choose a desirable programming model for their particular implementation. To support this high level of flexibility, the CAF 400 is arranged with a reconfigurable stream switch 500. As described in the present disclosure, the stream switch 500 acts as a data transfer fabric to improve logic block (IP) reuse, data reuse, and the reuse of other components and logic, which in turn allows a reduction of on-chip and off-chip memory traffic, and which provides a much greater flexibility to leverage the same logic blocks in different application use cases. Integrated in the stream switch 500 is a plurality of unidirectional links arranged to transport data streams via a configurable fully connected switch to, from, and to and from different kinds of data sources, data sinks, and data sources and data sinks such as direct memory access (DMA) controllers, I/O interfaces (e.g., cameras), and various types of accelerators.

The transported data may take any desired format such as a stream of raster scan image frames, a stream of macroblock oriented images, audio streams, raw data blocks, a stream of input or data volume sculptor values, or any other format. The stream switch 500 can also transport messages, commands, or other like control information along a processing chain forwarded by each unit to one or more or more targeted units where the control information is processed. The control information may be used to signal events, to reconfigure the processing chain itself, or to direct other operations.

FIG. 5 is a stream switch embodiment 500 in more detail. The stream switch 500 includes a user-selectable, design-time configurable first number of stream link input ports 504 and a user-selectable, design-time configurable second number of stream link output ports 516. In some cases, there is the same number of input ports as there are output ports. In other cases, there are more input ports than output ports, and in still other cases, there are more output ports than input ports. The number of input ports and the number of output ports are defined at design time.

In the stream switch 500 embodiment of FIG. 5, one stream link 502 embodiment is shown in detail. Other stream links 502a, 502b, are also illustrated without detail for simplicity in the illustration. The stream links 502a, 502b are generally arranged along the lines of the stream link 502, and for the sake of clarity in the disclosure any of the illustrated stream links may be identified as stream link 502.

At run-time, stream switch 500 communicatively couples input stream link ports to output stream link ports through a stream link 502 according to configuration data written to certain ones of the CAF control registers 402 (FIG. 4). In the embodiment, one or more of the input stream link ports 504 may be desirably arranged to concurrently forward received data streams to one or multiple (multicast) output ports 516 on the same clock cycle. Thus, one input stream link port can be communicatively coupled (e.g., electrically connected for the passage of data) to one or more output stream link interfaces, which results in a physical replication of the input data stream. The stream link 502 provides a straightforward, unidirectional interface to transport data streams and control information associated with the data streams. In such embodiments, a single control signal, which may, in some cases, be propagated on a single dedicated or shared data path, provides flow control.

Some conductors of the stream link are used to pass data; some other conductors may include a data validity indicator, a first pixel indicator, a last pixel indicator, a line type definition, and a stall signal. The stall signal is used as a back pressure (e.g., flow control) mechanism. In some embodiments of the stream link, image data, command data, control information, messages, and the like are passed in a frame-based protocol along the processing chain though the stream switch 500.

In the stream switch 500, each output port 516 is associated with a particular stream link 502. In FIG. 5, for example, output port X is associated with stream link 502. In addition, one or more input ports 504 are associated with each stream link. In some cases, for example, each and every input port 504 is associated with each and every stream link 502. In this way, each input port 504 may pass data to any and all output ports 516 at the same time or at different times.

Individual communication path conduits of the stream link are unidirectional. That is, signals on each communication path conduit flow in only one direction. In some cases, a plurality of communication path conduits unidirectionally accept data received from an input port and pass the data to one or more output ports. In these cases, and in other cases, a single communication path conduit unidirectionally receives command information (e.g., flow control information) from an output port and passes the command information to one or more input ports. In some other cases, the command information received from an output port and passed to one or more input ports is passed on two or more communication path conduits.

As shown in the detailed stream link 502 of FIG. 5, the set of unidirectional communication path conduits from a plurality of input ports 504 are passed into a data switch 506. In some cases, the set of unidirectional communication path conduits from every input port 504 are passed into the data switch 506. In other cases, the unidirectional communication path conduits of one or more, but less then all, input ports 504 are passed into a data switch 506 of a particular stream link 502. The data switch 506 may include multiplexor logic, demultiplexor logic, or some other form of switching logic.

As shown in FIG. 5, data passed into stream link 502 from a plurality of input ports 504 may be concurrently present at input nodes of the data switch 506. A selection mechanism 508 is arranged to determine which input data is passed through the data switch 506. That is, based on the selection mechanism 508, the input data from one of input ports A, B, C, D is passed through the data switch 506 to an output of the data switch 506. The output data will be passed on $N_{A \ldots D}$ unidirectional communication path conduits, which will match the number of unidirectional communication path conduits of the selected input port.

The selection mechanism 508 is directed according to stream switch configuration logic 510. The stream switch configuration logic 510 determines at run time which input port 504 shall supply data to the associated output port, and based on the determination, the stream switch configuration logic 510 forms an appropriate selection signal that is passed to the data switch 506. The stream switch configuration logic 510 operates at run time and in real time. The stream switch 510 may take direction from CAF control registers, from a DSP of the DSP cluster 122 (FIG. 3), from the application processor 128, or from some other control device. In addition, the stream switch configuration logic 510 may also take direction from message/command logic 512.

In some embodiments, data is passed uniformly through each particular stream link 502. That is, in some cases, one stream link 502 is configured (e.g. stream switch configuration logic 510, CAF control registers, or the like) to cooperatively pass any number N of first datums (e.g., bits, bytes, words, nibbles, tuples, or some other data samples, etc.), and one or more other stream links 502 are similarly configured to pass corresponding second datums. In this configuration, for each datum passed through the first stream link 502, there is a corresponding datum passed through each of the other one or more stream links 502.

In other embodiments, data is not passed uniformly through each particular stream link 502. Data may be interleaved, for example, or passed in another non-uniform way. In an interleaved embodiment, the various stream links 502 may be configured to interleave data. In one such interleaved example, a first stream link 502 may be arranged to pass "M" datums from a first source (e.g., input port 504), and then the first stream link 502 may be arranged to pass "N" datums from a second source (e.g., a different input port 504).

Alternatively, in yet one more interleaving embodiment, two stream links 502 may be arranged to pass different numbers of datums in a non-uniform way. That is, while a first stream link 502 is passing "M" datums, a second stream link 502 is simultaneously or concurrently passing "N" datums. In the examples, described herein, "M" and "N" are integers. In some cases, "M" and "N" are different integers.

In some stream switch 500 embodiments, certain specific messages that are passed through an input port 504, for example by an interface or an accelerator, are recognized by command logic 512 in one or more stream links 502 of the stream switch 500 and used to reprogram one or more stream links 502 in real time. In these or in other embodiments, the stream switch 500 is configured to merge data streams according to fixed patterns. For example, in at least one case, a stream switch 500 may be arranged to select and pass data to an output port 516 by switching between input streams passed on two or more input ports 504. For example, after each line, each frame, each N transactions, or by some other measure, the stream switch 500 may be configured to pass data from a different input port 504 to a selected output port 516.

Data passed from the data switch 506 may, in some cases, pass through one or more optional output synchronization logic stages 514. The output synchronization logic stages 514 may be used to store or otherwise buffer a selected amount (e.g., one or more bits, a few or many bytes, etc.) of data passed from a data source coupled to an input port 504 toward a data sink device coupled to an output port 516. Such buffering, synchronizing, and other such operations may be implemented when data source devices and data sink devices operate at different rates, different phases, using different clock sources, or in other manners that may be asynchronous to each other.

The stream switch 500 includes a back pressure stall signal mechanism, which is used to pass flow control information from a sink device to a source device. The flow control information is passed from a sink device to inform a data stream source device to lower its data rate. Lowering the data rate will help to avoid a data overflow in the sink device.

One portion of the back pressure stall signal mechanism includes a back pressure stall signal path that is included in each input port. The back pressure stall signal path is arranged as a back pressure unidirectional communication path conduit. In FIG. 5, four back pressure input port mechanisms are illustrated, $BP_A$, $BP_B$, $BP_C$, $BP_D$; one each for each of the illustrated input ports. In other embodiments, the back pressure mechanism of each input port may include one or more unidirectional communication path conduits. In some embodiments, the back pressure mechanism of each input port has the same number of unidirectional communication path conduits, which may be, for example, a single conduit. In these cases, for example, when a data source device coupled to the particular input port detects that a signal on the back pressure mechanism is asserted, the particular data source device will slow or stop the amount of data passed to the associated input port.

Each output port 516 includes another portion of a back pressure mechanism. One output port back pressure mechanism for each of the three illustrated output ports X, Y, Z, of FIG. 5 are illustrated, $BP_X$, $BP_Y$, $BP_Z$. In some cases, each output port back pressure mechanism includes a same number of unidirectional communication path conduits (e.g., one). In other cases, at least one output port has a back pressure mechanism with a different number of unidirectional communication path conduits than another back pressure mechanism of another output port.

The output port back pressure mechanism conduits are passed to combinatorial back pressure logic 518 in each stream link 502. In FIG. 5, back pressure logic 518 receives back pressure control signals $BP_X$, $BP_Y$, $BP_Z$. The combinatorial back pressure logic 518 also receives control information from the stream switch configuration logic 510. The combinatorial back pressure logic 518 is arranged to pass relevant flow control information back through the input port back pressure mechanism of an input port 504 to a particular data source device.

Figure 6:
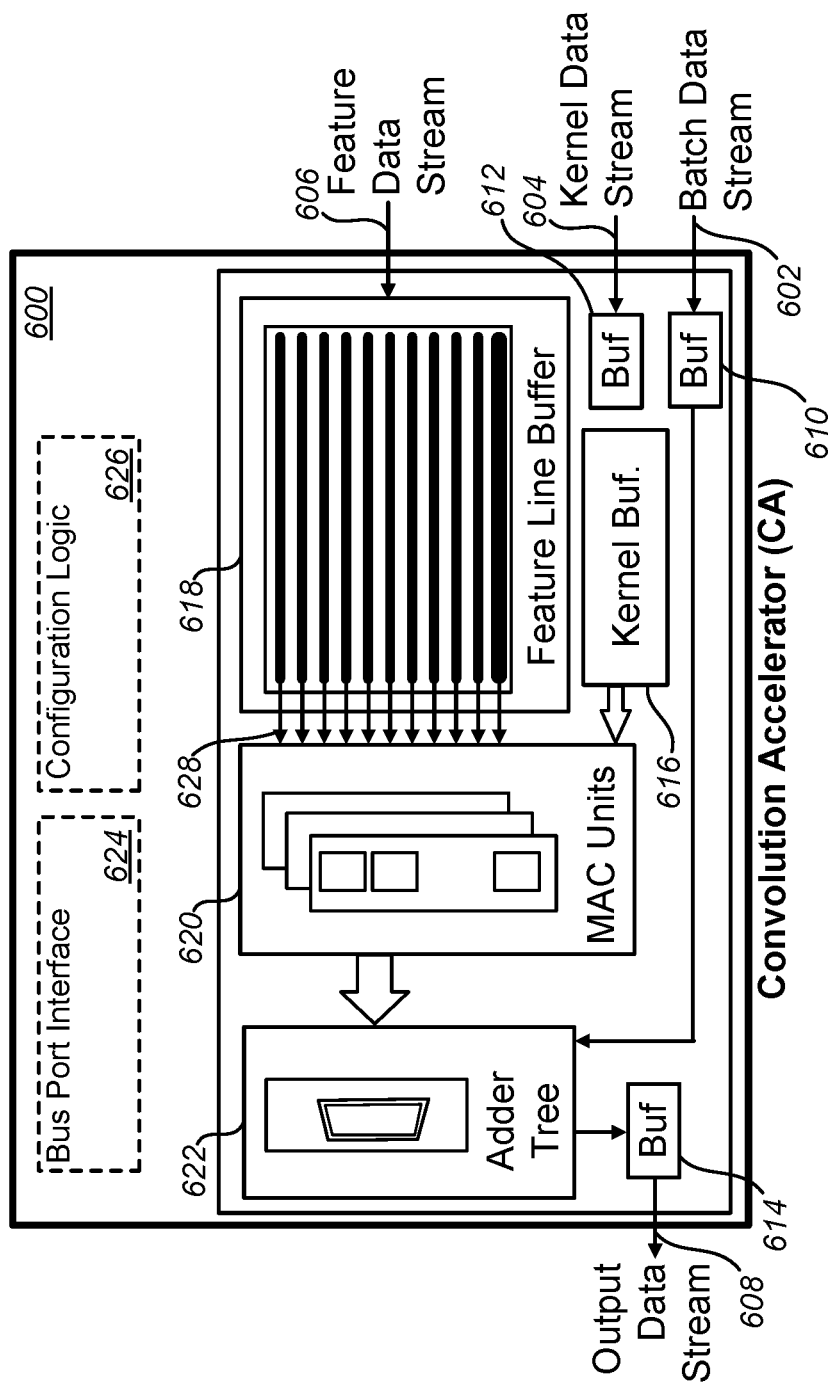
FIG. 6 is a convolution accelerator (CA) embodiment.

FIG. 6 is a convolution accelerator (CA) embodiment 600. The CA 600 may be implemented as any one or more of the convolution accelerators 600 of FIG. 4.

The CA 600 includes three input data interfaces and one output data interface that are each arranged for coupling to a stream switch 500 (FIG. 5). A first CA input data interface 602 is arranged for coupling to a first stream switch output port 516, a second CA input data interface 604 is arranged for coupling to a second stream switch output port 516, and a third CA input data interface 606 is arranged for coupling to a third stream switch output port 516. A CA output data interface 608 is arranged for coupling to a selected stream switch input port 504. The specific stream switch 500 port that each CA input data interface 602, 604, 606 and output data interface 608 is coupled to may be determined by default, at boot time, or at run time, and the specific coupling may be programmatically changed at run time.

In an exemplary embodiment, the first CA input data port 602 is arranged to pass a stream of batch data into the CA 600, the second CA input data port 604 is arranged to pass a stream of kernel data into the CA 600, and the third CA input data port 606 is arranged to pass a stream of feature data into the CA 600. The output data port 608 is arranged to pass an output data stream from the CA 600.

The CA 600 includes several internal memory buffers. The internal memory buffers may share a common memory space in some embodiments. In other embodiments, some or all of the internal memory buffers may be separate and distinct from each other. The internal memory buffers may be formed as registers, flip flops, static or dynamic random access memory (SRAM or DRAM), or in some other structural configuration. In some cases, the internal memory buffers may be formed using a multiport architecture that lets, for example, one device perform data "store" operations in the memory while another device performs data "read" operations in the memory.

A first CA internal buffer 610 is physically or virtually arranged in line with the first CA input data interface 602. In this way, batch data streamed into the CA 600 may be automatically stored in the first CA internal buffer 610 until the data is passed to a particular math unit in the CA 600 such as an adder tree 622. The first CA internal buffer 610 may be fixed with a size that is determined at design time. Alternatively, the first CA internal buffer 610 may be defined with a variable size that is determined programmatically at boot time or run time. The first CA internal buffer 610 may be 64 bytes, 128 bytes, 256 bytes, or some other size.

A second CA internal buffer 612 and a third CA internal buffer 614 are formed along the lines of the first CA internal buffer 610. That is, the second and third CA internal buffers 612, 614 may each have their own fixed size that is determined at design time. Alternatively, the second and third CA internal buffers 612, 614 may have a variable size that is determined programmatically at boot time or run time. The second and third CA internal buffers 612, 614 may be 64 bytes, 128 bytes, 256 bytes, or some other size. The second CA internal buffer 612 is physically or virtually arranged in line with the second CA input data interface 604 to automatically store streamed kernel data until the kernel data is passed to a dedicated fourth CA internal buffer 616 that is dedicated to storing kernel buffer data. The third CA internal buffer 614 is physically or virtually arranged in line with the adder tree 622 to automatically store summed data until it can be passed through the CA output interface 604.

The fourth CA internal buffer 616 is a dedicated buffer arranged to desirably store kernel data and apply the stored kernel data to a plurality of CA multiply-accumulate (MAC) units 620.

The fifth CA internal buffer 618 is a feature line buffer that is arranged to receive streamed feature data passed through the third CA input interface 606. Once stored in the feature line buffer, the feature data is applied to the plurality of CA MAC units 620. Feature and kernel buffer data applied to the CA MAC units 620 is mathematically combined according to the convolutional operations described herein, and the resulting output products from the CA MAC units 620 are passed to the CA adder tree 622. The CA adder tree 622 mathematically combines (e.g., sums) the incoming MAC unit data and batch data passed through the first CA input data port.

In some cases, the CA 600 also includes an optional CA bus port interface 624. The CA bus port interface 624, when it is included, may be used to pass data into or out from the CA 600 from SoC global memory 126 or some other location. In some cases, the applications processor 128, a DSP of the DSP cluster 122, or some other processor directs the passage of data, commands, or other information to or from the CA 600. In these cases, the data may be passed through the CA bus port interface 624, which may itself be coupled to the primary communications bus 132, the secondary communication bus 166, or some other communications structure.

In some cases, the CA 600 may also include CA configuration logic 626. The CA configuration logic 626 may be fully resident with the CA 600, partially resident with the CA 600, or remote from the CA 600. The configuration logic 600 may, for example, be fully or partially embodied in the CAF control registers 402, the SoC controllers 120, or some other structures of the SoC 110.

FIG. 7 is a high level block diagram illustrating a data path supported by the data volume sculptor 900 units within a convolution neural network algorithm. As illustrated in the figure, image data having a variety of features and complexity is streamed into a convolutional process, which may be carried out with convolution accelerators 600 (FIG. 6) in a configurable accelerator framework (CAF) 400 (FIG. 4), formed in an SoC 110 (FIG. 3) of a mobile device 100 (FIG. 3). Input data 902, which may, for example, be or include feature map data, is streamed into the data volume sculptor 900. Sculpted output data 904 generated according to the data volume sculptor 900 unit is streamed out from the data volume sculptor 900.

In the convolution processes, a stream of input images is passed into the neural network. In order to predict, detect, or otherwise identify a particular feature (e.g., an action, a scene, an object, or some other feature), a region-of-interest is isolated in each image, and the region-of-interest is linked through the depth of a plurality of images to produce a three-dimensional (3D) volume. Kernels are convolved through the width and height of each image, through the depth of a plurality of images, and through the 3D volumes to produce sets, or "stacks," of feature maps. Pooling layers perform sub-sampling operations and combine the outputs of feature clusters at one layer into a single feature in a subsequent layer, One or more additional sculpting, convolution, and pooling layers further filter the input data, and one or more full connection operations are performed throughout the layers to relate features in one layer to corresponding features in other layers. After the full connection operations, classifications/predictions emerge from the data.

By forming the hardware-based data volume sculptor 900 units, and coupling these sculptors to the stream switch 500, the convolution processes of a convolutional neural network or other machine learning device that processes data in a region-of-interest across a sequence of data planes can execute with improved flexibility, data locality, and speed.

FIGS. 8A-8C may collectively be referred to herein as FIG. 8. These figures illustrate and present various sculpted three-dimensional (3D) volumes within a region-of-interest, which are used in a machine learning algorithm such as one that predicts or classifies a selected action or scene in a video stream.

In FIG. 8A, a feature map is formed from a plurality of two-dimensional (2D) data planes 908A, 908B, 908N. Three data planes, which may also be referred to as "frames," are shown, however the feature map may include any number of two or more data planes. In many cases, but not all, consecutive data frames represent a timed sequence or series of data frames. For example, if each data plane represents a single image of video data captured at 30 frames-per-second, then a feature map formed from a series of 75 frames represents a continuous stream of two and one-half (2.5) seconds of video data. In other cases, the data plane is not image data at all, and adjacent frames may be related temporally or based on one or more different characteristics.

In a first 2D data frame 908A, it is desired to extract (e.g., isolate, set apart, distinguish, label, or the like) information from within an enclosed 2D volume in the 2D data plane. The information defining the region-of-interest may be streamed with the data of the 2D data plane, passed in from the machine algorithm or another source, stored in a data repository (e.g., control registers 402 in FIG. 4), or the information may come from somewhere else. The information in many embodiments will include at least one first coordinate of the region-of-interest and further information sufficient to form an enclosed 2D volume in the 2D data plane. In FIG. 8A, a first coordinate may include 2D (e.g., x-y) information defining a top-left coordinate 910TL of the rectangular 2D region-of-interest 910A. A second coordinate may include 2D (e.g., x-y) information defining a bottom-right coordinate 910BR of the rectangular 2D region-of-interest 910A. Using these two coordinates, the entire enclosed 2D volume 910A can be determined. For each datum included in the 2D data plane 908A, it can be determined whether or not the datum, which has its own specific coordinate (e.g., x-y), falls inside the enclosed 2D volume 910A or outside the enclosed 2D volume 910A. Because the enclosed 2D volume 910A is rectangular, the perimeter boundaries of the 2D volume 910A are quickly and efficiently determined with linear math operations.

In a second 2D data frame, 908B, a second 2D volume 910B is desired for extraction. The second 2D volume 910B corresponds to the first 2D volume 910A, though the second 2D volume 910B may have a one or more different dimensions, different rotational orientations, different data, or other differences. Nevertheless, in the sculpting of a 3D volume, it is desirable to link the first and second 2D volumes 910A, 910B together. As in the case of the first region-of-interest in the first data plane 908A, the information defining the second region-of-interest may be streamed with the data of the second 2D data plane 908B, passed in from the machine algorithm or another source, stored in a data repository (e.g., control registers 402 in FIG. 4), or the information may come from a different source. To simplify the drawing, upper-left and lower-right coordinates are not shown in the second 2D volume 910B, but these coordinates may be determined, or the boundaries of the second 2D volume 910B may be determined in a different way.

Along the lines of the first and second 2D volumes 910A, 910B, any number of additional 2D volumes can also be isolated. An "Nth" 2D volume 910N is shown in the Nth 2D data plane 908N of FIG. 8A. From the representation of FIG. 8A, it is clear that a 2D volume in each of a sequence of 2D data planes can be isolated. The information from one 2D data plane to another can also be linked. In at least one case, isolating the plurality, or "stack," of 2D volumes in a region-of-interest includes generating an ordered data structure. The ordered data structure may be arranged in many ways. For example, the ordered data structure may store each datum of the 2D data plane that is determined to be within the enclosed 2D volume or information sufficient to represent that the datum is within the region-of-interest. In some cases, a tuple is formed that includes a region-of-interest identifier and at least one linked list or portions thereof that correspond to the 2D region-of-interest. As in a linked-list, a plurality of tuples can point to forward and backward tuples of adjacent 2D data planes. In this way, a single ordered data structure can present a 3D volume enclosing a region of interest across a feature map. More specifically, to illustrate but not limit the principle, the ordered data structure can represent the combination of rectangular 2D regions-of-interest 910A, 910B, 910N in the set of 2D data frames 908A, 908B, 908N.

One or more regions-of-interest can be isolated in each 2D data plane. In FIG. 8A, two regions-of-interest are shown, but in some cases, dozens, hundreds, or even more regions-of-interest are selected for isolation and further convolutional neural network processing.

A second region-of-interest 912A, 912B, 912N is represented in the 2D data planes (e.g., frames) of FIG. 8A. The second region-of-interest is shown as an ellipse, however, any region of interest having a curved portion may be desired, and the principles of operation of the data volume sculptor 900 will be evident to one of skill in the art.

A "Detail A" portion of FIG. 8A represents one technique to mathematically determine the bounds of the 2D region-of-interest having curved portion. For example, an ellipse may be analyzed as a curve on a plane that surrounds two particular focal points. The focal points are selectable, or can otherwise be interpreted, such that when the distances to the two focal points from any and every point on the curve are summed, the result will be a constant value. Accordingly, linear or other more complex math calculations can be used to determine the bounds of any curved area in a selected 2D region-of-interest.

Summarizing some of what is shown in FIG. 8A, a stream of feature map data is received in a data volume sculptor 900 unit. The stream of feature map data forms a three-dimensional (3D) feature map as a plurality of two-dimensional (2D) data planes. Three 2D data planes 908A, 908B, 908N are shown, however the feature map may include any number of data planes. Two 3D volumes are identified within the 3D feature map; each of the 3D volumes is dimensionally smaller than the 3D feature map. The first 3D volume is generally rectangular and includes a rectangular 2D region-of-interest in a first 2D data plane of a feature map 910A, a rectangular 2D region-of-interest in a second 2D data plane of a feature map 910B, and a rectangular 2D region-of-interest in an Nth 2D data plane of a feature map 910N. The second 3D volume is curved (i.e., generally elliptical) and includes a 2D region-of-interest in a first 2D data plane of a feature map having a curved portion 912A, a 2D region-of-interest in a second 2D data plane of a feature map having a curved portion 912B, and a 2D region-of-interest in an Nth 2D data plane of a feature map having a curved portion 912N. The isolated data of the 3D feature map that falls within either of the 3D volumes in the regions-of-interest is isolated for processing in a deep learning algorithm.

FIG. 8B is along the lines of FIG. 8A. Any number of 3D volumes within the 3D feature map could be defined, however, to simplify the figure, only two different 3D volumes are shown.

In FIG. 8B, a first 3D volume is defined by a non-symmetrical four-sided 2D region-of-interest in a first 2D data plane of a feature map 914A, a non-symmetrical four-sided 2D region-of-interest in a second 2D data plane of a feature map 914B, and a non-symmetrical four-sided 2D region-of-interest in an Nth 2D data plane of a feature map 914N.

In FIG. 8B, a second 3D volume is defined by a polygonal 2D region-of-interest in a first 2D data plane of a feature map 916A, a polygonal 2D region-of-interest in a second 2D data plane of a feature map 916B, and a polygonal 2D region-of-interest in an Nth 2D data plane of a feature map 916N.

FIG. 8C is a different view of the first 2D data plane 908A of FIG. 8B. Additional information is added in FIG. 8C. Particularly, a set of data points are shown. The data points are non-limiting, and represent the concept that including information to define an enclosed 2D region-of-interest can be carried out in many ways. In at least some embodiments, the 2D region-of-interest can be defined using one or more first coordinates of the region-of-interest along with further information sufficient to form an enclosed 2D volume in the 2D data plane.

In FIG. 8C, an upper left point of origin (0, 0) in the 2D data frame 908A is shown as if indicating two axes, X and Y. Other coordinate systems are of course definable, and the X-Y coordinate system of FIGS. 8A-8C is not limiting. Nevertheless, using such a coordinate system permits an efficient identification of any number of points to define an enclosed 2D volume in a 2D data plane.

Data points defined for the first 2D volume include a top-left coordinate 914TL of the non-symmetrical four-sided 2D region-of-interest 914A, a top-right coordinate 914TR of the non-symmetrical four-sided 2D region-of-interest 914A, a bottom-left coordinate 914BL of the non-symmetrical four-sided 2D region-of-interest 914A, and a bottom-right coordinate 914TBR of the non-symmetrical four-sided 2D region-of-interest 914A.

Data points defined for another 2D volume include a first coordinate 916P1 of the polygonal 2D region-of-interest 916A, a second coordinate 916P2 of the polygonal 2D region-of-interest 916A, a third coordinate 916P3 of the polygonal 2D region-of-interest 916A, a fourth coordinate 916P4 of the polygonal 2D region-of-interest 916A, a fifth coordinate 916P5 of the polygonal 2D region-of-interest 916A, and a sixth coordinate 916P6 of the polygonal 2D region-of-interest 916A.

FIG. 9 is an embodiment of a data volume sculptor 900 unit integrated with the hardware accelerated DCNN processor of FIGS. 3-6. The embodiment represents the data volume sculptor 900 unit in dashed lines to indicate that portions of the data volume sculptor 900 may optionally standalone from the stream switch 500 or be integrated with the stream switch, and to this end, the data volume sculptor 900 unit may also share features with other structures of the configurable acceleration framework 400 (FIG. 4). The location of any particular structure of the data volume sculptor 900 or the location of one structure relative to any other structure may be suitably arranged by a system semiconductor practitioner.

The data volume sculptor 900 unit includes a counter bank 918, a comparator unit 920, a calculation unit 922 and a control unit 924. Other structures of the data volume sculptor 900 are not shown to avoid unnecessarily obfuscating certain features of the data volume sculptor 900.

Particularly illustrated in FIG. 9 to assist in the discussion of the data volume sculptor 900 unit is the stream switch 500, which may be further understood with reference to FIG. 5 and the associated discussion of FIG. 5. Input data 902 is passed into the stream switch via at least one input interface. The input data may include vector data, scalar data, or data of some other format. For example, the input data 902 may include a stream of image data that, in aggregate, forms a feature map as described in the present disclosure.

Output data 904A, 904B, 904C, 904N, is passed out from the stream switch. The output data may include feature map data, three-dimensional (3D) feature volume data, data determined to fall within a 3D feature volume, an ordered data structure data that represents data within a 3D feature volume, null data, or some other data.

An optional control information communication path 926 is included in FIG. 9. The control information communication path 926 may be used to pass control information into the stream switch. The control information may be, for example, control information defining a region-of-interest in a 2D data plane, dimensional information associated with a feature map, a 2D or 3D region-of-interest, or for some other purpose.

The counter bank 918 may include any desirable number of counters. The counters may be integer counters, count-up counters, count-down counters, shift-counters, or the like. The counters may include predetermined initialization parameters, auto-reset functions, auto-load functions, alarm functions, interrupt trigger functions, or the like. In some cases, one or more counters may be cascaded such that when a first counter reaches a threshold, a second counter executes a count and the first counter resets. In such a way, for example, one or more counters can be used to produce index values to access each datum in a 2D data plane. What is more, in such a system, each individual datum in a 2D data plane, 3D data volume, or some other structure can be uniquely identified based on values from one or more counters of the counter bank 918.

The comparator unit 920 is arranged as a means to compare one datum (e.g., data value) with another datum or a plurality of other data values. The comparator unit 920 may include any number of comparators. Each comparator may be arranged to accept vector data, scalar data, or data in another form. Some data that is compared may be stored as constant data, reprogrammable data, or some other type of information in a volatile or non-volatile data repository. Comparators of the comparator unit may be arranged to output a single signal as a result of a comparison. The single value may be asserted high or low, positive or negative, or in some other way. The single value may be asserted based on any desirable comparison result, such as, for example, greater than, less than, equal to, or the like. In some cases, rather than a single value, one or more comparators may be arranged to output a difference value that represents the difference between a first value being compared and a second value being compared.

The calculation unit 922 may be arranged as a processor, a controller, a state machine, or some other such calculator. The calculation unit 922 may be arranged to perform simple, linear math operations such as addition and subtraction. The calculation may, in addition or in the alternative, be arranged to perform more complex math operations such as multiplication, trigonometric functions, floating point operations, or the like. In some cases, the calculation unit may be employed to calculate boundaries of an enclosed 2D volume as with respect to FIGS. 8A-8C. In some cases, the calculation unit 922 may be arranged to quickly and efficiently determine whether or not a particular datum of a 2D data plane in a feature volume falls within an region-of-interest.

The control unit 924 may be arranged to determine coordinates for one or more points on an enclosed 2D data volume. The control unit may draw information from a data repository (e.g., CAF control registers 402, FIG. 4), from input data 902, from feedback data, from a machine learning algorithm, or from some other source. The control unit may be further arranged to produce information passed on the optional control information communication path 926 or to produce other signaling information.

As is evident from the description of the FIG. 9 and the structures represented therein, the data volume sculptor 900 units disclosed herein are very flexible and can be configured in many ways. For example, in some cases, the data volume sculptor 900 unit is used for 2D region-of-interest extraction, and in other cases, the data volume sculptor unit 900 is used for 3D region-of-interest extraction. Since it is known that in some cases, object detection machine learning algorithms generate 200 to 300 regions-of-interest per frame, and since these regions-of-interest are, in some cases, max-pooled, average-pooled, and have other operations performed, having a fast, flexible hardware-based unit provides immense value. Because the 2D and 3D feature volume extraction is performed cooperatively with other data operations that use the stream switch, these data extraction/isolation features provide speed increase, data processing efficiency, and power reduction benefits not available in any other known way. What is more, the various configurations can be established or pre-established by saving parameters in a data repository such as CAF control registers 402 (FIG. 4), by control of a machine learning algorithm, by information embedded or otherwise included in a stream of input data, or by other means.

The enclosed volumes that are extracted by the data volume sculptor 900 units described herein are selected from any number of sources. In some cases, the characteristics (e.g., size, shape, orientation, and other features) of the enclosed 2D or 3D volume are programmed via values in registers (e.g., CAF control registers 402 of FIG. 4). In some cases, the characteristics are embedded in the input data. In still other cases, the characteristics are determined by a machine learning algorithm, or by some other means. In exemplary though not limiting cases, the characteristics include a geometry of the feature map (e.g., height H, width W, depth D), a geometry of the feature or region of interest (e.g., height h, width w, depth d), an identifier of the input data from which to extract the feature, an indicator of whether the region-of-interest is to be extracted from each data plane of a feature map (i.e., continuous volume) or whether the region-of-interest is to be extracted from a selected set of data planes of a feature map (i.e., discontinuous volume), and other characteristic. In these or in yet other cases, the characteristics may also direct a format for the output data.

In some cases, the data volume sculptor 900 unit will output actual feature map data that is determined to be within the defined region-of-interest. In other cases, the data volume sculptor 900 will output an ordered data structure that simply identifies feature map data determined to be within or outside the defined region-of-interest. In some different cases, the data volume sculptor 900 will output all of the data of the feature map, but some of the data will be tagged or otherwise indicated as within the defined region-of-interest, and the rest of the data will be tagged or otherwise indicated as outside of the defined region-of-interest. In still other cases, the data volume sculptor 900 will output, one-for-one, data representing the entire feature map, but data that is within the defined region-of-interest will be actual data, and data that is outside of the defined region-of-interest will be null data (e.g., zero, a constant, a determined null value, or some other selected indicator).

Some exemplary embodiments of the data volume sculptor 900 and exemplary methods to use the embodiments are now described. The embodiments are not limiting. Instead, the embodiments are described to illuminate to those of skill in the art the flexibility and power of the data volume sculptor 900 disclosed herein to advance the convolutional neural network arts, particularly in implementations that classify, predict, or otherwise recognize features (e.g., scenes, objects, actions, or the like) in a stream of video data.

The data volume sculptor 900 embodied in FIG. 9 has at least one stream input interface and one or a plurality of stream output interfaces. In some embodiments the input stream interface receives as input data 902 a series of 2D data structures. The data structures may be, for example, image frames composed of single pixel values. In the context of convolutional neural networks, the input frames can also be feature data structures within the network. These feature data structures can include image data, but they do not necessarily need to be image data or related to image data in any way.

In some cases, data received at the input stream interface of the data volume sculptor 900 is a "raw" data stream. In some cases, the raw data stream has a start tag, a stop tag, or both a start tag and a stop tag. In still some other cases, the input data stream is a raster scan structure and the input data 902 is arranged as a sequence of individual "lines" staged with a start indicator, a stop indicator, and a type identifier. In this context, the data volume sculptor 900 is arranged to "crop out" an individual region of interest for each frame in the frame sequence. These regions-of-interest can be overlapped, but they do not have to be overlapped. In addition, one or more data volume sculptor 900 units can be arranged to isolate, extract, or otherwise crop out one, two, or dozens of regions-of-interest from each frame.

To perform the functionality described herein, the data volume sculptor 900 unit is made aware of the geometry (e.g., dimensions) of each frame and made aware of the geometry (e.g., position, size, orientation, and the like) of the region-of-interest to be extracted. The geometry of each input frame can be automatically extracted if the input data stream 902 embeds or otherwise includes such data (e.g., in a raster scan fashion). Alternatively, for example, if the input data stream 902 includes only raw data frames, the geometry can be pre-programmed to configuration registers (e.g., control unit 924, CAF control registers 402 in FIG. 4, or the like), programmed as part of a machine learning algorithm, or disseminated to the data volume sculptor 900 unit in another way.

With respect to the flexibility of the data volume sculptor 900 unit, it is recognized that many convolutional neural network operations that extract or otherwise process 2D and 3D data volumes will extract a volume having one geometry in one frame and a different geometry in another frame. Thus, the data volume sculptor 900 is flexible enough to permit the geometry of the region-of-interest that is extracted to vary for each input frame or for a plurality of input frames that is less than all of the input frames.

In an exemplary case of a rectangular region-of-interest (e.g., FIG. 8A, rectangular region-of-interest 910A, 910B, 910N), at least two two-dimensional (2D) coordinates are provided. While the data volume sculptor 900 units described herein can extract data from regions-of-interest of any shape, the rectangular region-of-interest is now described to simplify the present disclosure.

In this case, the two coordinate pairs represent the top-left coordinate 910TL and the bottom-right coordinate 910BR of the rectangular 2D region-of-interest in the first 2D data plane of a feature map. For each new data frame (e.g., the rectangular 2D regions-of-interest in the second and Nth 2D data planes of the feature map 910B, 910N), updated pairs of top-left coordinate and bottom-right coordinate must be received, loaded, or otherwise known to the data volume sculptor 900. These updated coordinate pairs distinguish a standard "crop" function wherein the extracted area does cannot change from frame to frame, and wherein such different regions-of-interest are not linked together to form a 3D volume.

In some cases, the machine learning algorithm will instantiate multiple output data streams 904A, 904B, 904C, 904N. In some of these cases, the same data stream with the extracted region- or regions-of-interest can be passed through a plurality of output interfaces. In others of these cases, regions-of-interest having different geometry are passed through the plurality of output interfaces.

Considering the present exemplary case of a rectangular 2D region-of-interest case, two counters of the counter bank 918 can be employed to track the actual position of the current input pixel received in the input data stream 902 at the input interface. For the sake of the present exemplary case, a first of the two counters is referred to as "x_cnt" and second of the two counters is referred to as "y_cnt." For each input pixel processed, the x_cnt value can be incremented until the size of the associated "line" is reached. The size of the associated line may be derived from an internal configuration register (e.g., control unit 924, CAF control registers 402 in FIG. 4, or the like), by retrieving a line tag in the input data, as directed by a machine learning algorithm, or by some other means. Upon processing each input pixel, when it is determined that the end of a line is reached, the x_cnt counter is reset to zero, and the y_cnt counter is incremented by one. After each pixel of each line is processed, when it is determined that the end of the frame is reached, both the x_cnt counter and the y_cnt counter are reset to zero, and processing for a next 2D frame in the feature map can begin.

As each and every pixel is processed, the coordinates of the pixel under consideration are analyzed. The analysis in the present example can include comparing the x_cnt counter value and y_cnt counter value with "top-left TLx, TLy" and "bottom-right BRx, BRy" corner coordinates of the determined region-of-interest for the current frame. If Equation 1 turns out to be true, the pixel is determined to be within the region-of-interest. Else, if Equation 1 turns out to be false, then the pixel is determined to be outside the region-of-interest.

$$TLx(N) \geq x\_cnt \geq BRx(N) \text{ AND } TLy(N) \geq y\_cnt \geq BRy(N) \quad (1)$$

In some cases, when a pixel is determined to be within the region of interest, the pixel is forwarded to the output interface as valid data within the region-of-interest. In these cases, the pixel may or may not be tagged or in some other way identified as being within the region-of-interest. In other cases, an ordered structure is created or updated to include information indicating that the pixel is within the region-of-interest In some cases, when the pixel is determined to be outside the region of interest, the pixel is simply dropped. In other cases, the pixel is forwarded to the output interface but tagged or in some other way identified as being outside of the region-of-interest. In other cases, null data, which can be a zero value, a constant, or any other representation of null data, is forwarded to the output interface. In still other cases, the same ordered structure is updated, or a different ordered structure is created, to include information indicating that the pixel is outside the region-of-interest.

In view of Equation 1 and the processing just described, the flexibility of the data volume sculptor 900 unit is further recognized. In these cases, the optional control information communication path 926 may be asserted, loaded, or otherwise employed to pass the information regarding the pixel's status as within or outside the region-of-interest.

In this present example, the data volume sculptor 900 analyzes region-of-interest data for each frame, and the region-of-interest geometry may or may not change with each frame. The region-of-interest geometry, which may include at least one first coordinate and additional information sufficient to form the enclosed 2D volume within the frame, is updated or updatable for each frame. The region-of-interest geometry information can be stored locally in the control unit 924, in the initialization parameters of the counter bank 918, or in some other area associated with the data volume sculptor 900. Alternatively, or in addition, such geometry parameters or associated data can be passed in the input data 902 and retrieved or otherwise calculated (e.g., linear math, a ray-casting algorithm, integral equations, or the like) via the calculation unit 922, control unit 924, or some other means. Further, it can be defined that some external unit or portion of the machine learning algorithm provides coordinate information (e.g., corner coordinates, region center coordinates, a plurality of sequential point coordinates, or the like) together with frame geometry or separate from frame geometry. These parameters can be provided on-the-fly (i.e., at run-time), in advance (e.g., at build-time, at initialization time, or the like), as pre-programmed information, as hardware-determined information, or by some other means.

In some cases of the present example, regardless of whether the region-of-interest is a rectangle, some other polygon, a curved feature, or some other complex region-of-interest, the output frames may again be made rectangular regions. If this is the case, for example, the dimensions of the output feature can be set according to Equation 2 for each pixel determined to be in the polygonal region-of-interest.

$$(MAX(x_{coord})-MIN(x_{coord}))\times(MAX(y_{coord})-MIN(y_{coord})) \quad (2)$$

The advantages of the flexible data volume sculptor 900 are not provided in any other known devices, systems, or methods except those described in the present disclosure. At best, the functionality of defining a 2D or 3D volume in an feature map is loosely accomplished with one or more direct memory access (DMA) engines that provide necessary information via source address, destination address, source stride, number of lines and line width in bytes. These solutions, in addition to being very different from the integrated data volume sculptor 900 units of the present disclosure, require loading and storing of a feature volume and extracted regions-of-interest in memory as well as intervention by a host microcontroller to generate linked addressing information. Thus, any previous work-arounds are not capable of directly streaming region-of-interest information contemporaneously with feature volume data from a preceding unit that may produce the region-of-interest information and feature volume without temporarily storing and retrieving the vast amounts of data to and from memory. Naturally, it is clear to one of skill in the art that these work-arounds are slower, less-efficient, and very power hungry.

Figure 10:
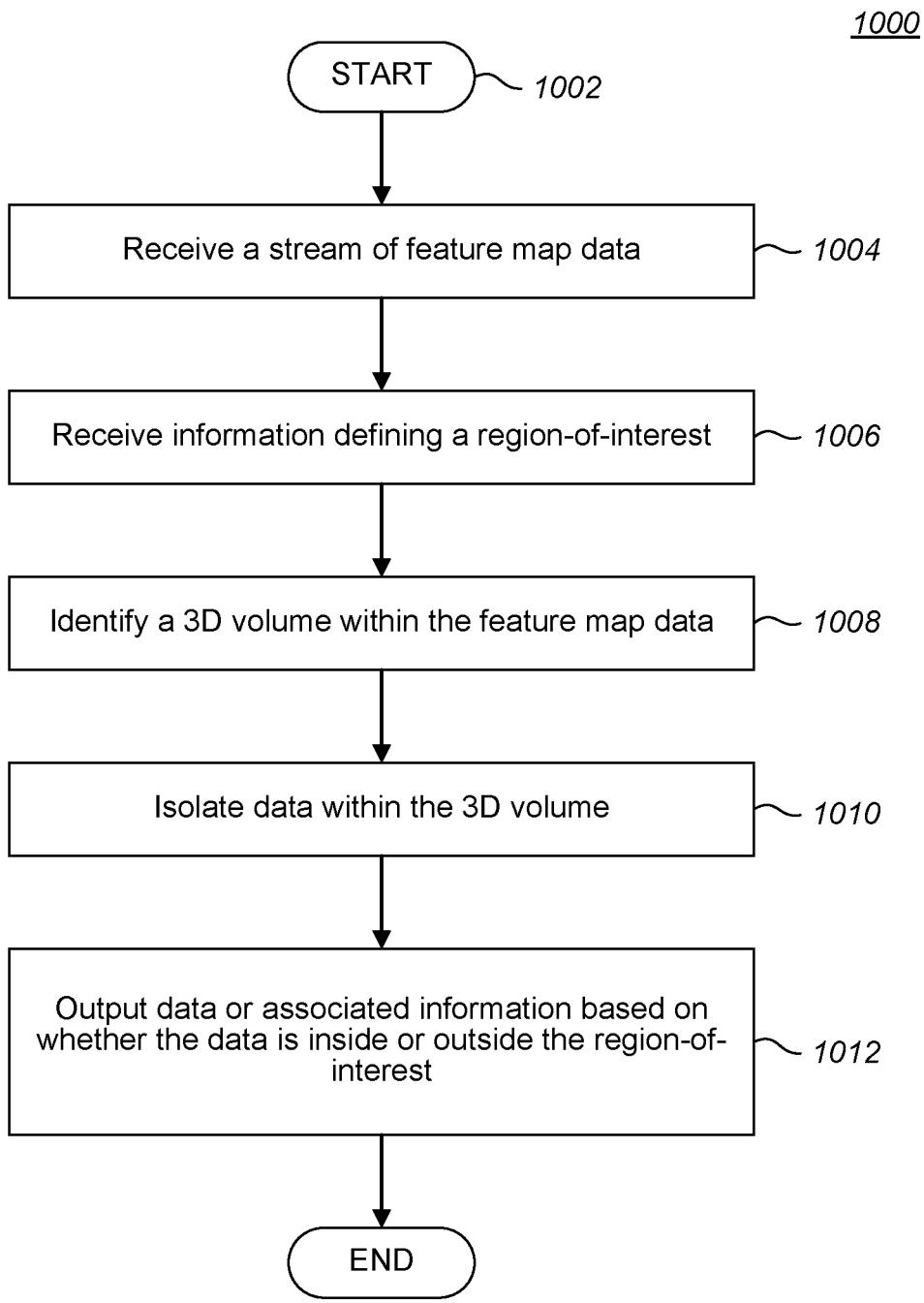
FIG. 10 is a data flow diagram illustrating at least one data volume sculpting method.

FIG. 10 is a data flow diagram illustrating at least one data volume sculpting method. In some cases, the method is arranged to generate an ordered data structure defining a three-dimensional (3D) volume within a 3D feature map. In other cases, the method is arranged to process each datum in the two-dimensional (2D) data planes of the feature map and output each datum that is determined to be within a determined region-of-interest. For the sake of example, the method of FIG. 10 is described herein within the context of a convolutional neural network processing 3D data blocks/volumes called feature maps, which consists of individual 2D data planes called "features" stacked together to form a 3D "feature map." Here a data volume sculptor 900 unit, as illustrated in FIG. 9 and described herein, is employed to isolate, "sculpt," or otherwise extract a determined "volume" from within the input feature map.

Some known convolutional neural network applications demand access to arbitrary regions-of-interest, which may even be limited to a single, planar (i.e., 2D) region-of-interest. Other known applications, for example those disclosed in the T-CNN paper, demand access to arbitrary 3D regions-of-interest. The data volume sculptor 900 units described herein provide these capabilities in ways that no other structures or methods can. The data volume sculptor 900 unit described herein is arranged as one or more hardware blocks that can extract a determined 3D volume region-of-interest from an existing feature map that is stored in memory, streamed directly from an image or other sensor, passed from a convolutional accelerator 600 (FIG. 6), or passed into the data volume sculptor 900 from some other source.

The exemplary method of FIG. 10 is performed with an exemplary data volume sculptor 900 as depicted in FIG. 9.

In at least one case, the method of FIG. 10 is performed in an integrated circuit of a mobile device 100 (FIG. 3). The integrated circuit may be formed as a system on chip 110 (FIG. 3) or in some other package, die, chip, controller, computing device, or the like. The integrated circuit includes on-board random access memory (RAM) 126 (FIG. 3), an applications processor 128 (FIG. 3), a digital signal processor (DSP) cluster 138 (FIG. 3), a configurable accelerator framework (CAF) 400 (FIGS. 3, 4), and at least one communication bus architecture 166, 132 (FIG. 3) communicatively coupling the applications processor 128, the DSP cluster 138, and the CAF 400 to the RAM 126. The CAF 400, in at least one case, includes a reconfigurable stream switch 500 (FIGS. 4, 5) and a data volume sculpting unit 900 (FIGS. 4, 9) having an input coupled to the reconfigurable stream switch 500 and an output coupled to the reconfigurable stream switch 500 (FIG. 9).

The data volume sculptor 900 unit in the method has a counter bank 918, a comparator unit 920, and a control unit 924, among other structures. The data volume sculptor 900 is formed as a hardware block that executes and accelerates the extraction of 3D volumes having a determined geometry from a given feature map that is under process in a convolutional neural network deep machine learning algorithm.

The data volume sculptor 900 receives at its input an input feature map, and the data volume sculptor 900 produces at an output information representing the one or more extracted 3D volumes. Also provided to the data volume sculptor 900 unit is a set of configuration parameters for each 2D data plane in the feature map. The parameters include any one or more of the geometry of the feature map (e.g., Height, Width and Depth (H, W, D)), a series of values defining the geometry of a region-of-interest (e.g., a linked list corresponding to the top-left and bottom right coordinates of each region-of-interest within a feature specified as a tuple consisting of a region-of-interest identifier one or more coordinates corresponding to particular points of the region-of-interest, etc.), parameters identifying the start and end of the feature or feature map as the case may be (e.g., standalone start and end indices to form continuous 3D volumes or a linked list of start and end indices to enable extraction of discontinuous 3D volumes), and any other parameters. In the case of 3D volumes, the output of the data volume sculptor 900 may include region-of-interest identifiers to "string together," concatenate, or otherwise associate individual 2D regions-of-interest together to form the desired extracted output 3D volume.

The data volume sculpting method 1000 of FIG. 10 includes acts of the data volume sculptor 900, and processing begins at 1002.

At 1004, a stream of feature map data is received. In some cases, the stream of feature map data is formed as a three-dimensional (3D) feature map, and the 3D feature map is formed as a plurality of two-dimensional (2D) data planes.

Processing continues to 1006 where input information defining a region-of-interest is received. The input information may be defined in a 2D data plane. In some cases, the input information includes at least one first coordinate of the region-of-interest and further information sufficient to form an enclosed 2D volume in the 2D data plane. Upon receiving the region-of-interest information, one or more counters may be loaded and sequenced so that each datum in the 2D data plane is analyzed in a selected order. In some cases, a plurality of enclosed 2D volumes are defined in each 2D data plane of the 3D feature. In some cases, certain ones of the plurality of enclosed 2D volumes in a selected 2D data plane are non-overlapping, and in other cases, certain ones of the 2D volumes in a selected 2D data plane do overlap.

At 1008, a 3D volume within the 3D feature map is identified. The 3D volume is dimensionally smaller than the 3D feature map.

And at 1010, processing continues. Here, data from the 3D feature map that is within the 3D volume is isolated for processing in a deep learning algorithm. The act of isolating the data may employ the comparator unit 920, which is arranged to determine whether or not each datum analyzed is within the enclosed 2D volume.

During or after the isolation, at 1012, or at some other time, each datum or information associated therewith may be output from the data volume sculptor 900 that is determined to be within the enclosed 2D volume. In other cases, rather than outputting the datum, the data volume sculptor 900 unit may instead generate and output an ordered data structure that includes each datum that is determined to be within the enclosed 2D volume. Here, data within a plurality of enclosed 2D volumes of the 3D feature map may be included in the ordered data structure. Each 2D data plane may be defined by its respective enclosed 2D volume, and each respective enclosed 2D volume can be associated in the ordered structure with at least one other enclosed 2D volume defined in an adjacent 2D data plane.

Processing in the method of FIG. 10 ends at 1014.

Considering another implementation of the method of FIG. 10, processing at 1004 includes receiving information at an input stream interface of a data volume sculpting 900 unit. The information includes a series of frames, and each frame is formed as a two dimensional (2D) data structure. In some cases, the series of 2D data structures includes image frames composed of single pixel values. Alternatively in some cases, or in addition, the series of two dimensional data structures includes non-image feature data structures within a convolutional neural network. The series of frames can be received as a raw data stream having a start tag and a stop tag. Alternatively, or in addition, the series of frames can be received as a raster scan structure, wherein each individual line of the raster scan structure is staged with a start tag, a stop tag, and a type identifier.

At 1006, a first dimension and a second dimension of each one of the frames is determined, and based on the first and second dimensions, a position and a size of a region-of-interest to be extracted from the respective frame is determined for each frame. Sometime, a plurality of regions-of-interest to be extracted from each frame is determined. And in these cases, ones of the plurality of regions-of-interest to be extracted from each frame can be overlapping or non-overlapping. The data volume sculptor 900 may, in some cases, automatically extract the position and the size of the region-of-interest from each frame using the information received at the input stream interface. Alternatively, or in addition, the data volume sculptor 900 may retrieve the position and the size of the region-of-interest from a parameter repository. At least one of the position and the size of the region-of-interest to be extracted from a first frame can be different from a corresponding position or size of the region-of-interest to be extracted from a second frame.

In some cases at 1008, a pair of two-dimensional coordinates is analyzed to determine the position and the size of the region-of-interest to be extracted from the respective frame. Here, sometimes, the pair of two-dimensional coordinates includes a top-left coordinate and a bottom-right coordinate of the region-of-interest to be extracted from the respective frame.

In some cases at 1008, a single point and a radius about the single point are analyzed to determine the position and the size of the region-of-interest to be extracted from the respective frame.

In still other cases at 1008, one or more pluralities of points that define a polygon are analyzed to determine the position and the size of the region-of-interest to be extracted from the respective frame. Here, or in other cases, determining the position and the size of the region-of-interest to be extracted from the respective frame includes analyzing a plurality of points and a distance between at least two of the plurality of points.

Processing at 1010 and 1012 includes extracting, from each frame, data in the frame that is within the region of interest. To implement this act, the extracting includes: 1) for each datum in each frame that is outside the respective region-of-interest to be extracted from the respective frame, passing a null datum through an output interface of the data volume sculpting unit; and 2) for each datum in each frame that is within the respective region-of-interest to be extracted from the respective frame, passing the datum through the output interface of the data volume sculpting unit.

In some cases at 1010, isolation of data (i.e., the extracting) includes initializing a first counter and a second counter. The first and second counters are arranged to track a position of each datum of a frame received at the input stream interface. Tracking the position of each datum in this case includes using count values from the first and second counters as coordinates of the datum within the frame. The isolation also includes comparing the coordinates of the datum to limit values defining the region-of-interest and determining from the comparing whether or not the datum is outside or within the region-of-interest.

In still other cases at 1010 and 1012, where for example, a plurality of regions-of-interest to be extracted from the respective frame are determined, the isolation and output of data may include concurrently passing separate and distinct null data or frame data out from the data volume sculpting unit for each one of the plurality of regions-of-interest. In some of these cases, passing the null datum through the output interface of the data volume sculpting unit is performed by passing the datum from the frame and asserting a signal indicating that the datum is outside the respective region-of-interest to be extracted from the respective frame.

Considering yet one more implementation of the method of FIG. 10, processing at 1010 includes receiving streaming data into the data volume sculptor 900 unit passed from a reconfigurable stream switch 500 formed in an integrated circuit. The integrated circuit may be particularly configured for convolutional neural network operations. The streaming data defines a three-dimensional (3D) feature map formed as a series of two-dimensional (2D) data planes. In some cases, the 3D feature map includes image data under analysis in a convolutional neural network. The geometry of the 3D feature map can be defined by height, width, and depth (H, W, D).

At 1010, the data volume sculptor 900 unit generates an ordered data structure defining a 3D volume within the 3D feature map. The 3D volume is dimensionally smaller than the 3D feature map. The geometry of the sculpted 3D volume can be defined by height, width, and depth (h, w, d). Generating the ordered data structure can in some cases include forming at least one linked list with a series of values corresponding to coordinates of a two-dimensional (2D) region-of-interest. In other cases, generating the ordered data structure can include forming at least one tuple. The at least one tuple can include a region-of-interest identifier and at least one linked list or portions thereof that correspond to the 2D region-of-interest. In still other cases, generating the ordered data structure can include selecting a start index corresponding to a first 2D data plane of the feature map, selecting an end index corresponding to a last 2D data plane of the feature map, and including with the at least one linked list in the ordered data structure, the selected start and end indices such that the 3D volume is defined between the first and last 2D data planes of the feature map. And in some of these cases, generating the ordered data structure can include associating together a series of the 2D data planes between the start index and the end index based on a common region-of-interest identifier.

Sometimes, at 1010 where the data volume sculptor 900 unit generates an ordered data structure by forming at least one linked list with a series of values corresponding to coordinates of a two-dimensional (2D) region-of-interest, the coordinates include a top-left coordinate and a bottom-right coordinate of the 2D region-of-interest. In cases where the 2D region-of-interest is circular, the coordinates of the 2D region-of-interest can include coordinates corresponding to a single point and a radius about the single point. In cases where the 2D region-of-interest is a polygon, the coordinates of the 2D region-of-interest can include point coordinates corresponding to a plurality of points that define the polygon. And in cases where the 2D region-of-interest includes as least one curve, the coordinates of the 2D region-of-interest can include coordinates corresponding to a plurality of points and a distance between at least two of the plurality of points.

At 1012, the ordered data structure, once generated, is passed through the reconfigurable stream switch 500.

The present disclosure refers to a "semiconductor practitioner." A semiconductor practitioner is generally one of ordinary skill in the semiconductor design and fabrication arts. The semiconductor practitioner may be a degreed engineer or another technical person or system having such skill as to direct and balance particular features of a semiconductor fabrication project such as geometry, layout, power use, included intellectual property (IP) modules, and the like. The semiconductor practitioner may or may not understand each detail of the fabrication process carried out to form a die, an integrated circuit, or other such device.

FIG. 10 is a plurality of non-limiting processes that may be used by embodiments of the mobile computing device 100. In this regard, each described process may represent a module, segment, or portion of software code, which comprises one or more executable instructions for implementing the specified logical function(s). It should also be noted that in some implementations, the functions noted in the process may occur in a different order, may include additional functions, may occur concurrently, and/or may be omitted.

The figures in the present disclosure illustrate portions of one or more non-limiting computing device embodiments such as mobile device 100. The computing devices may include operative hardware found in conventional computing device apparatuses such as one or more processors, volatile and non-volatile memory, serial and parallel input/output (I/O) circuitry compliant with various standards and protocols, wired and/or wireless networking circuitry (e.g., a communications transceiver), one or more user interface (UI) modules, logic, and other electronic circuitry.

Amongst other things, the exemplary mobile devices of the present disclosure (e.g., mobile device 100 of FIG. 3) may be configured in any type of mobile computing device such as a smartphone, a tablet, a laptop computer, a wearable device (e.g., eyeglasses, jacket, shirt, pants, socks, shoes, other clothing, hat, helmet, other headwear, wristwatch, bracelet, pendant, other jewelry), vehicle-mounted device (e.g., train, plane, helicopter, unmanned aerial vehicle, unmanned underwater vehicle, unmanned land-based vehicle, automobile, motorcycle, bicycle, scooter, hoverboard, other personal or commercial transportation device), industrial device, or the like. Accordingly, the mobile devices include other components and circuitry that is not illustrated, such as, for example, a display, a network interface, memory, one or more central processors, camera interfaces, audio interfaces, and other input/output interfaces. In some cases, the exemplary mobile devices may also be configured in a different type of low-power device such as a mounted video camera, an Internet-of-Things (IoT) device, a multimedia device, a motion detection device, an intruder detection device, a security device, a crowd monitoring device, or some other device.

Processors, as described herein, include central processing units (CPU's), microprocessors, microcontrollers (MCU), digital signal processors (DSP), application specific integrated circuits (ASIC), state machines, and the like. Accordingly, a processor as described herein includes any device, system, or part thereof that controls at least one operation, and such a device may be implemented in hardware, firmware, or software, or some combination of at least two of the same. The functionality associated with any particular processor may be centralized or distributed, whether locally or remotely. A processors may interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, one or more embodiments describe software executable by the processor, which when executed, carries out one or more of the method acts.

In some cases, the processor or processors described in the present disclosure, and additionally more or fewer circuits of the exemplary mobile devices described in the present disclosure, may be provided in an integrated circuit. In some embodiments, all of the elements shown in the processors of the present figures (e.g., SoC 110) may be provided in an integrated circuit. In alternative embodiments, one or more of the arrangements depicted in the present figures (e.g., SoC 110) 6 may be provided by two or more integrated circuits. Some embodiments may be implemented by one or more dies. The one or more dies may be packaged in the same or different packages. Some of the depicted components may be provided outside of an integrated circuit or die.

The processors shown in the present figures and described herein may be fixed at design time in terms of one or more of topology, maximum available bandwidth, maximum available operations per unit time, maximum parallel execution units, and other such parameters. Some embodiments of the processors may provide re-programmable functionality (e.g., reconfiguration of SoC modules and features to implement a DCNN) at run-time. Some or all of the re-programmable functionality may be configured during one or more initialization stages. Some or all of the re-programmable functionality may be configured on the fly with no latency, maskable latency, or an acceptable level of latency.

As known by one skilled in the art, a computing device as described in the present disclosure, and mobile device 100 being such a computing device, has one or more memories, and each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk, a flash memory device, and/or the like. In some cases, a particular memory is separated virtually or physically into separate areas, such as a first memory, a second memory, a third memory, etc. In these cases, it is understood that the different divisions of memory may be in different devices or embodied in a single memory. The memory in some cases is a non-transitory computer medium configured to store software instructions arranged to be executed by a processor.

In the present disclosure, memory may be used in one configuration or another. The memory may be configured to store data. In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

The computing devices illustrated and described herein, of which mobile device 100 is one example, may further include operative software found in a conventional computing device such as an operating system or task loop, software drivers to direct operations through I/O circuitry, networking circuitry, and other peripheral component circuitry. In addition, the computing devices may include operative application software such as network software for communicating with other computing devices, database software for building and maintaining databases, and task management software where appropriate for distributing the communication and/or operational workload amongst various processors. In some cases, the computing device is a single hardware machine having at least some of the hardware and software listed herein, and in other cases, the computing device is a networked collection of hardware and software machines working together in a server farm to execute the functions of one or more embodiments described herein. Some aspects of the conventional hardware and software of the computing device are not shown in the figures for simplicity, but are well understood by skilled practitioners.

When so arranged as described herein, each computing device may be transformed from a generic and unspecific computing device to a combination device comprising hardware and software configured for a specific and particular purpose. Along these lines, the features of the combination device bring improvements to the technological computing arts heretofore unseen and unknown.

Database structures, if any are present in the mobile devices or supporting network devices described herein, may be formed in a single database or multiple databases. In some cases hardware or software storage repositories are shared amongst various functions of the particular system or systems to which they are associated. A database may be formed as part of a local system or local area network. Alternatively, or in addition, a database may be formed remotely, such as within a "cloud" computing system, which would be accessible via a wide area network or some other network.

In at least one embodiment, mobile devices described herein may communicate with other devices via communication over a network. The network may involve an Internet connection or some other type of local area network (LAN) or wide area network (WAN). Non-limiting examples of structures that enable or form parts of a network include, but are not limited to, an Ethernet, twisted pair Ethernet, digital subscriber loop (DSL) devices, wireless LAN, WiFi, cellular-based networks, or the like.

Buttons, keypads, computer mice, memory cards, serial ports, bio-sensor readers, touch screens, and the like may individually or in cooperation be useful to an operator of the mobile device or other such devices as described herein. The devices may, for example, input control information into the system. Displays, printers, memory cards, LED indicators, temperature sensors, audio devices (e.g., speakers, piezo device, etc.), vibrators, and the like are all useful to present output information to the operator of these mobile devices. In some cases, the input and output devices are directly coupled to the control systems described herein and electronically coupled to a processor or other operative circuitry.

In other cases, the input and output devices pass information via one or more communication ports (e.g., RS-232, RS-485, infrared, USB, etc.)

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

In the foregoing description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks, have not been shown or described in detail to avoid unnecessarily obscuring descriptions of the embodiments.

Unless the context requires otherwise, throughout the specification and claims which follow, the word "comprise," and variations thereof, such as "comprises" and "comprising," are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

The headings and Abstract of the Disclosure provided herein are for convenience only and do not limit or interpret the scope or meaning of the embodiments.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
receiving information at an input stream interface of a data volume sculpting circuit, the information including a series of frames, each frame formed as a two dimensional (2D) data structure;
determining a first dimension and a second dimension of each frame of the series of frames;
based on the first and second dimensions, determining for each frame a position and a size of a region-of-interest to be extracted from the respective frame; and
extracting from each frame, data in the frame that is within the region-of-interest.

2. The method of claim 1, wherein the extracting includes:
for each datum in each frame that is outside the respective region-of-interest to be extracted from the respective frame, passing a null datum through an output interface of the data volume sculpting circuit.

3. The method according to claim 1, wherein at least some frames of the series of frames have 2D data structures that include non-image feature data structures.

4. The method according to claim 1, wherein the series of frames are received as a raw data stream having a start tag and a stop tag.

5. The method according to claim 1, comprising:
analyzing a pair of two-dimensional coordinates to determine the position and the size of the region-of-interest to be extracted from the respective frame.

6. The method according to claim 1, wherein determining the position and the size of the region-of-interest to be extracted from the respective frame includes analyzing a single point and a radius about the single point.

7. The method according to claim 1, wherein determining the position and the size of the region-of-interest to be extracted from the respective frame includes analyzing a plurality of points and a distance between at least two of the plurality of points.

8. An integrated circuit, comprising:
on-board memory;
an applications processor;
a configurable accelerator framework (CAF); and
at least one communication bus architecture communicatively coupling the applications processor, and the CAF to the on-board memory, wherein the CAF includes:
a reconfigurable stream switch; and
data volume sculpting circuitry having an input interface coupled to the reconfigurable stream switch and an output interface coupled to the reconfigurable stream switch, wherein the data volume sculpting circuitry, in operation:
receives information at the input interface, the information including a series of frames, each frame formed as a two dimensional (2D) data structure;
determines a first dimension and a second dimension of each frame of the series of frames;
based on the first and second dimensions, determines for each frame a position and a size of a region-of-interest to be extracted from the respective frame; and
extracts from each frame, data in the frame that is within the region-of-interest.

9. The integrated circuit of claim 8, wherein the data volume sculpting circuitry, in operation, for each datum in each frame that is outside the respective region-of-interest to be extracted from the respective frame, passes a null datum through the output interface of the data volume sculpting circuitry.

10. The integrated circuit according to claim 8, wherein the data volume sculpting circuitry, in operation:
   extracts the position and the size of the region-of-interest from each frame using the information received at the input stream interface.

11. The integrated circuit according to claim 8, wherein the data volume sculpting circuitry comprises:
   calculation circuitry, which, in operation, performs mathematical operations associated with determining the position and size of the respective regions of interest.

12. The integrated circuit according to claim 8, wherein the data volume sculpting circuitry comprises:
   a state machine, which, in operation, determines boundaries of the respective regions of interest.

13. A configurable accelerator framework (CAF), comprising:
   a reconfigurable stream switch; and
   data volume sculpting circuitry having an input interface coupled to the reconfigurable stream switch and an output interface coupled to the reconfigurable stream switch, wherein the data volume sculpting circuitry, in operation:
      receives information at the input interface, the information including a series of frames, each frame formed as a two dimensional (2D) data structure;
      determines a first dimension and a second dimension of each frame of the series of frames;
      based on the first and second dimensions, determines for each frame a position and a size of a region-of-interest to be extracted from the respective frame; and
      extracts from each frame, data in the frame that is within the region-of-interest.

14. The configurable accelerator framework of claim 13, wherein the data volume sculpting circuitry, in operation, for each datum in each frame that is outside the respective region-of-interest to be extracted from the respective frame, passes a null datum through the output interface of the data volume sculpting circuitry.

15. The configurable accelerator framework of claim 13, wherein the data volume sculpting circuitry, in operation:
   extracts the position and the size of the region-of-interest from each frame using the information received at the input stream interface.

16. A non-transitory computer-readable medium having contents which configure configurable accelerator framework (CAF) circuitry to perform a method, the method comprising:
   receiving information at an input stream interface of the CAF circuitry, the information including a series of frames, each frame formed as a two dimensional (2D) data structure;
   determining a first dimension and a second dimension of each frame of the series of frames;
   based on the first and second dimensions, determining for each frame a position and a size of a region-of-interest to be extracted from the respective frame; and
   extracting from each frame, data in the frame that is within the region-of-interest.

17. The non-transitory computer-readable medium of claim 16, wherein the extracting includes:
   for each datum in each frame that is outside the respective region-of-interest to be extracted from the respective frame, passing a null datum through an output interface of the CAF circuitry.

18. The non-transitory computer-readable medium of claim 16, wherein the series of frames are received as a raw data stream having a start tag and a stop tag.

19. The non-transitory computer-readable medium of claim 16, wherein the method comprises:
   extracting the position and the size of the region-of-interest from each frame using the information received at the input stream interface.

20. The non-transitory computer-readable medium of claim 16, wherein the contents comprise instructions executed by the CAF circuitry.

* * * * *